(12) United States Patent
Penilla et al.

(10) Patent No.: US 12,197,710 B2
(45) Date of Patent: *Jan. 14, 2025

(54) VEHICLE PASSENGER CONTROLS VIA MOBILE DEVICES

(71) Applicant: Emerging Automotive, LLC, Los Altos, CA (US)

(72) Inventors: Angel A. Penilla, Sacramento, CA (US); Albert S. Penilla, Santa Cruz, CA (US)

(73) Assignee: Emerging Automotive, LLC, Scotts Valley, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/713,216

(22) Filed: Apr. 4, 2022

(65) Prior Publication Data

US 2022/0229541 A1  Jul. 21, 2022

Related U.S. Application Data

(63) Continuation of application No. 16/785,629, filed on Feb. 9, 2020, now Pat. No. 11,294,551, which is a
(Continued)

(51) Int. Cl.
*H02J 7/00* (2006.01)
*B60N 2/00* (2006.01)
(Continued)

(52) U.S. Cl.
CPC ....... *G06F 3/04842* (2013.01); *B60N 2/0025* (2023.08); *B60N 2/003* (2023.08);
(Continued)

(58) Field of Classification Search
CPC . H01M 10/0525; H01M 10/052; H01M 10/48
See application file for complete search history.

(56) References Cited

U.S. PATENT DOCUMENTS 9,348,492 B1 *  5/2016  Penilla .............. G06F 3/04842
9,622,159 B2 *  4/2017  Buttolo .............. H04W 48/16
(Continued)

*Primary Examiner* — Alexis B Pacheco

(57) ABSTRACT

Systems and methods of a vehicle for sharing vehicle controls are provided. One example is a vehicle including a system for sharing vehicle system control of the vehicle with a passenger. The system uses an on-board computer and communications circuitry of the vehicle. The communications circuitry is configured to use a wireless network for accessing the Internet, and the on-board computer is configured to enable the communications circuitry to provide a wireless connection to a portable device of the passenger of the vehicle. The on-board computer has access to one or more vehicle sub-systems, and via the wireless connection, the on-board computer provides the portable device access to at least one graphical user interface. The graphical user interface includes input options that enable control of settings or functions of one or more of said vehicle sub-systems. The on-board computer is configured to process data associated with a wireless signal of the portable device, and the processing of the data is used to identify the portable device inside the vehicle. The identified portable device is utilized to identify a passenger seat of the vehicle and enable said control of settings or functions that relate to an area proximate to the passenger seat that was identified.

20 Claims, 36 Drawing Sheets

Related U.S. Application Data continuation of application No. 16/411,525, filed on May 14, 2019, now Pat. No. 10,572,123, which is a continuation of application No. 15/788,419, filed on Oct. 19, 2017, now Pat. No. 10,289,288, which is a continuation of application No. 15/723,790, filed on Oct. 3, 2017, now Pat. No. 9,916,071, which is a continuation of application No. 14/677,341, filed on Apr. 2, 2015, now Pat. No. 9,778,831, which is a continuation of application No. 14/222,670, filed on Mar. 23, 2014, now Pat. No. 9,348,492, which is a continuation-in-part of application No. 13/784,823, filed on Mar. 5, 2013, now Pat. No. 9,285,944, and a continuation-in-part of application No. 13/842,158, filed on Mar. 15, 2013, now Pat. No. 9,229,905, said application No. 14/222,670 is a continuation-in-part of application No. 13/452,882, filed on Apr. 22, 2012, now Pat. No. 9,123,035.

(60) Provisional application No. 61/745,729, filed on Dec. 24, 2012, provisional application No. 61/478,436, filed on Apr. 22, 2011.

(51) Int. Cl.

| | | |
|---|---|---|
| *B60N 2/02* | (2006.01) | |
| *B60R 25/24* | (2013.01) | |
| *B60W 40/08* | (2012.01) | |
| *G06F 3/04842* | (2022.01) | |
| *G07C 5/00* | (2006.01) | |
| *G07C 5/08* | (2006.01) | |
| *H02J 7/14* | (2006.01) | |
| *H04L 9/40* | (2022.01) | |
| *H04L 67/12* | (2022.01) | |
| *H04W 4/44* | (2018.01) | |
| *H04W 4/48* | (2018.01) | |
| *H04W 12/06* | (2021.01) | |
| *H04W 12/08* | (2021.01) | |
| *B60R 16/037* | (2006.01) | |
| *H01M 10/052* | (2010.01) | |
| *H01M 10/0525* | (2010.01) | |
| *H01M 10/48* | (2006.01) | |

(52) U.S. Cl.
CPC ......... *B60N 2/0228* (2013.01); *B60N 2/0237* (2023.08); *B60R 25/241* (2013.01); *B60W 40/08* (2013.01); *G07C 5/008* (2013.01); *G07C 5/085* (2013.01); *H04L 63/083* (2013.01); *H04L 63/0861* (2013.01); *H04L 63/104* (2013.01); *H04L 63/105* (2013.01); *H04L 63/107* (2013.01); *H04L 67/12* (2013.01); *H04W 4/44* (2018.02); *H04W 4/48* (2018.02); *H04W 12/06* (2013.01); *H04W 12/08* (2013.01); *B60N 2230/20* (2023.08); *B60R 16/037* (2013.01); *B60W 2530/00* (2013.01); *H01M 10/052* (2013.01); *H01M 10/0525* (2013.01); *H01M 10/48* (2013.01); *H01M 2220/20* (2013.01)

(56) References Cited

U.S. PATENT DOCUMENTS

| | | | |
|---|---|---|---|
| 11,294,551 B2* | 4/2022 | Penilla | H04W 12/06 |
| 2014/0172727 A1* | 6/2014 | Abhyanker | G06Q 50/40 |
| | | | 705/307 |
| 2014/0179353 A1* | 6/2014 | Simon | H04W 4/40 |
| | | | 455/456.2 |
| 2014/0203077 A1* | 7/2014 | Gadh | B60L 53/30 |
| | | | 235/382 |
| 2014/0218189 A1* | 8/2014 | Fleming | G08B 21/0275 |
| | | | 340/457 |
| 2014/0236463 A1* | 8/2014 | Zhang | G06V 20/584 |
| | | | 701/117 |
| 2014/0300739 A1* | 10/2014 | Mimar | G06Q 30/0283 |
| | | | 348/148 |

* cited by examiner

User 1

| User 1 Logins | User 1 Roles | User 1 Vehicles |
|---|---|---|
| • Administrator(edit)<br>Add New | • Owner(edit)<br>• Weekend driving(edit)<br>• Commute driving(edit)<br>Add New | • Ford SUV(edit)<br>• Honda Hybrid(edit)<br>Add New |

User 2

| User 2 Logins | User 2 Roles | User 2 Vehicles |
|---|---|---|
| • Child(edit) | • School commute(edit)<br>• Errands(edit) | • Honda Hybrid |

User 1

| User 2 Logins | User 2 Roles | User 2 Vehicles |
|---|---|---|
| • Child(edit)<br>Add New | • School commute(edit)<br>• Errands(edit)<br>Add New | • Honda Hybrid<br>Add New |

FIG. 2

User 2

| User 2's login settings for login: CHILD | |
|---|---|
| Fuel use settings | • Electric battery<br>• Plug in<br>• Fuel<br>• Hybrid |
| Driving characteristics | • Speed restrictions<br>• Fuel use restrictions |
| Location based settings | • GPS aided travel restrictions<br>• Map restrictions<br>• Travel radius boundaries<br>• Dynamically load maps<br>• Dynamically load directions<br>• Dynamically load fuel<br>• Dynamically load charge<br>• Dynamically load battery<br>• Fuel purchase location restrictions |
| Time based use and restrictions | • Day driving<br>• Night driving<br>• Time specific driving |
| Automatic purchase settings | • Financial institution linking<br>• Fuel purchase settings<br>• Charge time purchase settings<br>• Battery purchase settings<br>• Car wash purchase settings |

| User editable |
|---|
| Admin or restricted |

FIG. 4

User 2

| User 1's login settings for login: CHILD | |
|---|---|
| Tracking & metrics | • Vehicle cameras<br>• Vehicle event recording<br>• Mileage usage characteristics<br>• Top & average speeds<br>• Driving history maps and graphs<br>• Fuel efficiency<br>• Wear and tear notifications |
| Comfort | • Climate<br>• Seats positions<br>• Seat heater / cooler<br>• Suspension/ride settings<br>• Entry lighting<br>• Remote start / stop |
| Entertainment | • Radio Memory<br>• Internet access settings<br>• Streaming services |
| Driving Modes | • Sport<br>• Comfortable<br>• Soft<br>• Off-road<br>• High performance<br>• Economy |
| Refueling routing and purchase | • Incentive based fuel finder<br>• Refueling availability maps<br>• Offers<br>• History<br>• Metrics |

User editable

Admin or restricted

FIG. 5

| Cameras | Record Settings | Remote Access |
|---|---|---|
| Front Camera<br><br>Rear Camera<br><br>Side Cameras<br><br>Inside Cameras<br><br>⋮ | ☐ Record when driving<br>☐ Record circular buffer<br>☐ Save cloud<br>☐ Save cloud and share<br>☐ Social network share<br>☐ Save after accident<br>☐ Access to video conference<br>☐ Save clip to cloud<br>☐ Record after accident to save for insurance<br>☐ Record selected cameras on demand<br>☐ Record when panic button is hit, and sound panic horn while recording<br>☐ Record when car break-in is detected | ☐ Access via any device<br>☐ Access after alert or panic button detected<br>☐ Access history clips on cloud<br>☐ Share clips with friends<br>☐ Provide link to police to view video after panic event<br>☐ Notification sent to car owner with video/ images of car when break-in alert is set off |

480 — Cameras; 482 — Record Settings; 484 — Remote Access

FIG. 11

Manufacturer API  130
Class:
HVAC

1954 — Data declarations:  ← 1950
currentTempLeft = 60
currentTempRight = 70
StatusAC = True
isAuto = True
isDual = True
displaySkin = modern
scheduleAMtemp(time)
learnedTemp1 = 74
learnedTemp1Time = 803am
learnedTemp1Days = MTWTHF
learnedTemp2 = 60
learnedTemp2Time = 513pm
learnedTemp2Days = MTWTHF
learnedTemp2AC = on
IcePresent = false
fastefrostMode = off
Errors = false 1956 — Function Declarations
updateTemp(left,right);
getTempRight(temp);
getTempLeft(temp);
setTempLeft(temp);
setTempLeft(temp);
toggleAC();
toggleAuto();
toggleDual();
toggleSkin(skinID);
scheduleAMTemp(temp, time, date, frequency);
schedulePMTemp(temp,time,date,frequency);
learnTempBackgroundRoutine(temp, time, date, frequency);
updateDisplay()

104
⬊ EZ FUN HVAC APP
1972
⬊ updateTemp(80,76);
{
    setLeftTo = 80;
    setRightTo = 76;
    theCurrentTempR = getTempRight(temp);
    theCurrenTempL = getTempLeft(temp);
    if setLeftTo != theCurrentTempL
    {
        setTempLeft(left);
    }
    if setRightTo != theCurrentTempR
    {
        setTempRight(right);
    }
    updateDisplay()

If isError()
    {
        return isError();
    }

Learned Behavior Vehicle Application

Past Actions Data

Average for a Monday in December
Engine start: 803am
Fuel level range: 50 miles
Temp in vehicle at start: 32F
Heat set to after vehicle start: 75F
Ice present on windshield: yes
Defrost activated: yes
How long between defrost process and vehicle moving: 7 minutes
Vehicle depart time: 810am
AC set to after vehicle start: NA
Miles driven at vehicle shut off: 15 miles
Engine start: 505PM
Fuel level range: 35 miles
Temp in vehicle at start: 76F
Heat Set to after vehicle start: NA
AC set to after vehicle start: 65F
Time to reach 65F: 4 minutes
Miles Driven at vehicle shut off: 15 miles

Average for a Tuesday in December
Engine start: 805am
Fuel level range: 20 miles
Temp in vehicle at start: 30F
Heat set to after vehicle start: 80F
Ice present on windshield: yes
Defrost activated: yes
How long between defrost process and vehicle moving: 7 minutes
Vehicle depart time: 812am
AC set to after vehicle start: NA
Miles driven at vehicle shut off: 18 miles
Engine start: 510PM
Fuel level range: 5 miles
Temp in vehicle at start: 78F
Heat Set to after vehicle start: NA
AC set to after vehicle start: 65F
Time to reach 65F: 5 minutes
Miles Driven at vehicle shut off: 15 miles

Past Actions Data

Average for a Saturday in December
Engine start: 12:15PM
Fuel level range: 40 miles
Temp in vehicle at start: 65F
Heat set to after vehicle start: NA
Ice present on windshield: no
Defrost activated: no
How long between defrost process and vehicle moving: NA
Vehicle depart time: 12:16PM
AC set to after vehicle start: NA
Miles driven at vehicle shut off: 5 miles
Engine start: 12:28PM
Fuel level range: 35 miles
Temp in vehicle at start: 65F
Heat Set to after vehicle start: NA
AC set to after vehicle start: NA
Time to reach NAF: NA
Miles Driven at vehicle shut off: 5 miles

Learned Behavior Vehicle Application

> Learned Behavior Logic Assumptions and Deductive Reasoning
>
> Check the user's calendar and adjust assumptions based on when the first meeting is, the meeting's location, how long it will take to get the vehicle's temperature and defrosting if applicable completed and if the user needs to re-fuel before arriving at work.
>
> User most likely will start the engine between 803am and 805am
>
> If the temperature is in the 30s inside the vehicle, the user will most likely heat the vehicle to the mid 70s to 80 degrees. Also the user is not likely to use the AC.
>
> If there is ice present on the windshield, the user will most likely activate defrosting measures for 7 minutes before departure.
>
> User usually drives between 15 and 18 miles
>
> The user usually starts the vehicle in the afternoon between 5:05 and 5:10PM
>
> If the temperature is in the mid 70s, the user usually activates the AC to achieve a temperature of 65 degrees
>
> The user is normally comfortable on Saturdays when the temperature in the vehicle is 65 degrees. No advance cooling or heating required. The usually makes frequent stops on Saturday and may benefit from route prioritization apps and Gas/Time saving routes, fuel stations, sponsored paths etc.

Learned Behavior Vehicle Application

Potential Actions using Logic & Past Data

Vehicle Learning App Decisions:

Tuesday PM:
The user will most likely need to drive ~16.5 miles on Wednesday morning but only has a range of 5 miles. Email and or text the user that they will need extra time to get to work in the morning due to re-fueling and that the vehicle will be auto starting 12 minutes earlier than usual. Confirm decision is ok with the user.

Wednesday AM:
Vehicle is usually started at ~804am and defrosted for 7 minutes when ice is present and usually departs at 811am, but the user needs 12 minutes to refuel. Start vehicle at 752am and defrost until 759am while heating to 77F because when the temperature is 34F like today inside the vehicle, the user likes the temperature to be about 77F. Set the user's ratio station to 102.5, the most commonly listened to station at this time. Display stock information for the most commonly queries stocks at this time. Check most common commute route in and make sure there aren't delays, else suggest a new route in advance. The user typically goes to coffee on the way to work. Launch the nearest Starbucks coffee location APP. The user usually "one button touch" orders and pays for a medium coffee. Directly from the app.

Friday PM:
Tell the user Saturdays are normally full of errands. Suggest the user send tomorrow's itinerary to the vehicle's app on the network or directly on the vehicle to report if and when the user should get started due to traffic, road construction, suggest fuel locations and ask if 65F degrees is still ok or adjust to a different temperature before the user enters the car around 12pm. Ask the user what time they will most likely depart if its not at 12pm like usual. Download specials and coupons for locations the user typically frequents on Saturdays and display to the user on the vehicle's interface on the user's mobile device.

Saturday PM:
The user said they would like to get started at 10am today but the vehicle interior is more than 20% lower than the user usually likes it. Turn the vehicle on at 955am and heat to 65F since 65F seems to be the user's most commonly used temperature. Display the specials for the nearest dry cleaner since the user typically gets dry cleaning done on Saturdays based on GPS data. Show the user lunch specials nearby and deals to claim since the user usually stops for lunch while out on errands on Saturday.

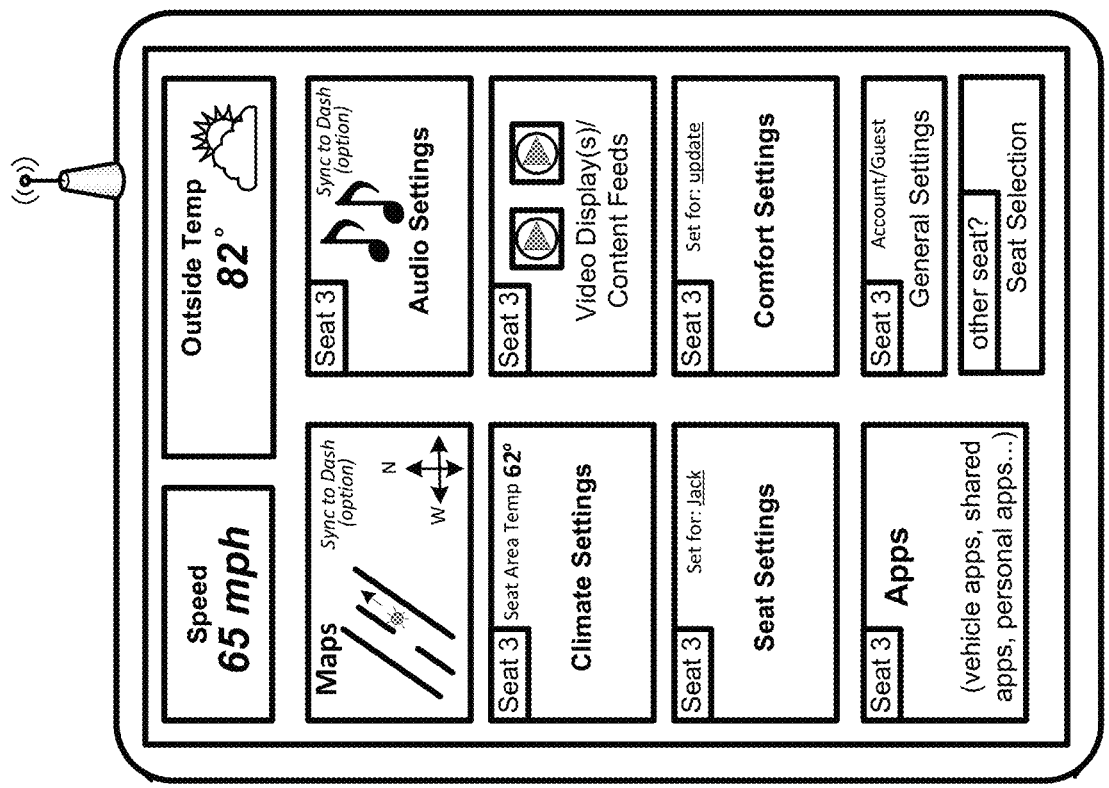
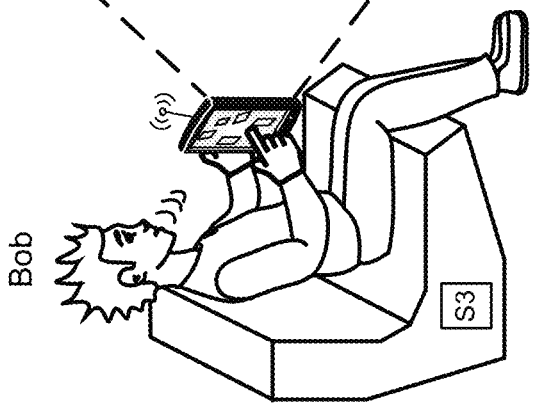
FIG. 20

VEHICLE PASSENGER CONTROLS VIA MOBILE DEVICES

CLAIM OF PRIORITY

This is continuation of U.S. application Ser. No. 16/785,629, filed on Feb. 9, 2020, and entitled "VEHICLE PASSENGER CONTROLS VIA MOBILE DEVICES", which is a continuation of U.S. application Ser. No. 16/411,525, filed on May 14, 2019, (now U.S. Pat. No. 11,294,551, issued on Apr. 4, 2022) and entitled "VEHICLE PASSENGER CONTROLS VIA MOBILE DEVICES," which is continuation of U.S. application Ser. No. 15/788,419, filed on Oct. 19, 2017, (now U.S. Pat. No. 10,289,288, issued on May 14, 2019) and entitled "VEHICLE SYSTEMS FOR PROVIDING ACCESS TO VEHICLE CONTROLS, FUNCTIONS, ENVIRONMENT AND APPLICATIONS TO GUESTS/PASSENGERS VIA MOBILE DEVICES," which is a continuation of U.S. application Ser. No. 15/723,790, filed on Oct. 3, 2017 (now U.S. Pat. No. 9,916,071, issued on Mar. 13, 2018) and entitled "VEHICLES AND VEHICLE SYSTEMS FOR PROVIDING ACCESS TO VEHICLE CONTROLS, FUNCTIONS, ENVIRONMENT AND APPLICATIONS TO GUESTS/PASSENGERS VIA MOBILE DEVICES," which is a continuation of U.S. application Ser. No. 14/677,341, filed on Apr. 2, 2015, (now U.S. Pat. No. 9,778,831, issued on Oct. 3, 2017) and entitled "VEHICLES AND VEHICLE SYSTEMS FOR PROVIDING ACCESS TO VEHICLE CONTROLS, FUNCTIONS, ENVIRONMENT AND APPLICATIONS TO GUESTS/PASSENGERS VIA MOBILE DEVICES," which is a continuation of U.S. application Ser. No. 14/222,670, filed on Mar. 23, 2014, (now U.S. Pat. No. 9,348,492, issued on May 24, 2016), entitled "METHODS AND SYSTEMS FOR PROVIDING ACCESS TO SPECIFIC VEHICLE CONTROLS, FUNCTIONS, ENVIRONMENT AND APPLICATIONS TO GUESTS/PASSENGERS VIA PERSONAL MOBILE DEVICES", which is a continuation in part of U.S. application Ser. No. 13/784,823, filed on Mar. 5, 2013, (now U.S. Pat. No. 9,285,944, issued on Mar. 15, 2016) entitled "METHODS AND SYSTEMS FOR DEFINING CUSTOM VEHICLE USER INTERFACE CONFIGURATIONS AND CLOUD SERVICES FOR MANAGING APPLICATIONS FOR THE USER INTERFACE AND LEARNED SETTING FUNCTIONS," which are herein incorporated by reference.

U.S. application Ser. No. 14/222,670 is a continuation in part of U.S. application Ser. No. 13/842,158, filed on Mar. 15, 2013, (now U.S. Pat. No. 9,229,905 issued on Jan. 5, 2016) entitled "METHODS AND SYSTEMS FOR DEFINING VEHICLE USER PROFILES AND MANAGING USER PROFILES VIA CLOUD SYSTEMS AND APPLYING LEARNED SETTINGS TO USER PROFILES" which is herein incorporated by reference.

U.S. application Ser. No. 13/784,823 claims priority to U.S. Provisional Patent Application No. 61/745,729, filed on Dec. 24, 2012, and entitled "METHODS AND SYSTEMS FOR ELECTRIC VEHICLE (EV) CHARGING, CHARGING SYSTEMS, INTERNET APPLICATIONS AND USER NOTIFICATIONS," which are herein incorporated by reference.

U.S. application Ser. No. 14/222,670 is a continuation-in-part of U.S. application Ser. No. 13/452,882, filed Apr. 22, 2012, (now U.S. Pat. No. 9,123,035, issued on Sep. 1, 2015) and entitled "ELECTRIC VEHICLE (EV) RANGE EXTENDING CHARGE SYSTEMS, DISTRIBUTED NETWORKS OF CHARGE KIOSKS, AND CHARGE LOCATING MOBILE APPS", which claims priority to U.S. Provisional Application No. 61/478,436, filed on Apr. 22, 2011, all of which are incorporated herein by reference.

FIELD OF THE EMBODIMENTS

The present invention relates to systems and methods for enabling passengers of vehicles to connect with electronics of the vehicle via mobile devices to access specific vehicle controls and cloud-based processing systems.

BACKGROUND

Vehicles, such as motorized vehicles and electric vehicles have been around for some time. Vehicles provide a means that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles, yet improvements are still needed.

It is in this context that embodiments of the invention arise.

SUMMARY

The methods, systems and apparatus that enable vehicles to share data with mobile devices of passengers or guests which may be in the vehicle. The methods are configured to provide passenger devices with access to vehicle electronics, which can share vehicle controls, settings, and environment settings with the passengers.

In one embodiment, a vehicle for sharing vehicle controls is provided. The system includes an on-board computer that is part of the vehicle and communications circuitry of the vehicle usable by the on-board computer. The communications circuitry is configured to make connections with a wireless network for accessing a server. The on-board computer is configured to execute instructions for enabling portable devices that enter the vehicle to make a wireless connection with the vehicle. Vehicle electronics are interfaced with one or more vehicle systems and the on-board computer. The on-board computer is configured to provide access to at least one graphical user interface viewable via the portable device using the wireless connection. The at least one graphical user interface includes input options that enable control for features of said vehicle systems of the vehicle. A location for the portable device within the vehicle is identified. The location is associated with select ones of the vehicle systems for an environment zone of the location, and vehicles systems that are not for the environment zone are not provided as input options via the graphical user interface provided for the portable device. The graphical user interface provides preferences associated with a user account when the portable device transfers credentials to the vehicle when making the wireless connection with the vehicle.

In one embodiment, a system of a vehicle for sharing vehicle controls is provided. The system includes an on-board computer that is part of the vehicle and communications circuitry having connection to the on-board computer. The communications circuitry is configured to interface with a wireless network for accessing the Internet. The on-board computer is configured to execute instructions for enabling wireless connection to portable devices that enter the vehicle and are provided with access to said wireless connection. Vehicle electronics are interfaced with one or more vehicle systems and the on-board computer. The on-board computer is configured to provide access to at least one graphical user interface to the portable device via the wireless connection. The at least one graphical user interface includes input options that enable control for features of a vehicle system of the vehicle. A wireless signal of the wireless connection with the portable device is processed by the on-board computer to identify a location of the portable device within the vehicle. The location of the portable device is utilized to identify a seating location in the vehicle and provide the portable device with access said vehicle system that pertains to an environment area associated with the seat location that was identified.

In one embodiment, a vehicle including one or more computers to interface with electronics of the vehicle to access status data for systems of the vehicle and to make input settings to one or more of the systems, are disclosed. The vehicle includes wireless communication circuitry for providing connection to the Internet and to one or more wireless devices when paired with the vehicle. An occupancy sensor of the vehicle is configured to interface with the one or more computers of the vehicle to identify occupancy of seats of the vehicle. A processor of the one or more computers of the vehicle is configured to execute instructions to receive data from a wireless device that is paired with the vehicle. The data is used to identify a seat in the vehicle that is associated with a passenger. The processor executes instructions to provide data to a user interface accessed by the wireless device to expose a plurality of systems of the vehicle. The plurality of systems includes one or more features that relate to an environment zone in which the seat is located in the vehicle. The user interface further includes controls to enable input of settings to one or more of the plurality of vehicle systems to make changes to the one or more of the plurality of vehicle systems. The changes made relate to one or more of the plurality of systems that relate to the environment zone of the seat.

In one embodiment, passengers are provided access to vehicle electronics locally within the vehicle using applications provided by the vehicle and delivered to the passenger using an in-vehicle network provided by an in-vehicle network access point. Alternatively, passengers are provided access to vehicle electronics settings remotely using a network cloud or remote network connection to pre-configure vehicle settings. In still another alternate configuration, passengers can install apps on their devices, which allow connection to a vehicle, for obtaining access to the vehicle data and receiving controls for settings, e.g., for the seat and/or zone around where the passenger may be occupying in the vehicle.

Vehicles may therefore provide granular access to specific sharable vehicle systems including, without limitation, climate, seat temperature controls, seat position controls, audio controls, video controls, master control systems affecting the entire vehicle, etc. The controls may be predefined by an admin of the vehicle or driver, and privileges may be managed locally in the vehicle or from a cloud account or the user/vehicle. Along these lines, users may have user accounts on cloud services that allow management of more than one vehicle, and privileges for passengers can be assigned or curtailed on the cloud site. On the cloud site, the vehicle owner can pre-assign credentials to friends that may be passengers, and the friends may get advanced notifications of the assigned credentials, so that when the friend arrives to the vehicle the mobile device of the friend will automatically connect or connect upon entering a code, password or some other verifying data.

Along these same lines, other types of vehicles, including commercial vehicles (e.g., buses, planes, trains, boats, etc.) can assign privileges to passengers at the time of boarding or in advance when reservations are made. In this commercial embodiment, passengers may be provided with more or less services of the vehicle and access to more or less of the data and apps of the vehicle depending on payment fees or charge structures. Management of the privileges assigned to the user may be made remotely on a server, e.g., cloud services, and the passengers can also access an account to pre-set settings for their trip in the vehicle. For instance, from a remote location and by access to the cloud system, a user can login and pre-set the settings for the vehicle he/she is provided with access to. In this manner, many of the custom settings can be dialed in before the passengers arrive to the vehicle. In some cases, the passenger may pre-set select profiles of comfort, so that when the passenger arrives to the vehicle, the passenger can have settings set for his liking, for the trip, for the day, for the circumstances, etc.

In one embodiment, advanced custom access to settings can be made for any vehicle (e.g., private or commercial), and these settings made via a cloud service can be saved to user accounts. In one embodiment, if a friend shares access to his vehicle that is Brand X and Model Y, the cloud services can identify the vehicle from a manufacturer website or service and obtained the settings package for that vehicle, so that the settings provided for custom setting can be configured as if the passenger were already in the vehicle. In further configurations, if the settings are custom in the particular vehicle, e.g., type of applications loaded on the vehicle, the cloud service would be able to get updates from time to time from the vehicle, so that cloud programming of settings by passengers would be facilitated with a close or identical one-to-one correspondence to what the owner/admin of the vehicle has loaded/configured therein. Passengers can therefore freely access settings, including select the settings in advance of being a passenger, and can also select the seat they may be sitting. In one configuration, the passenger can pre-set settings for all seats in the vehicle, so that when the passenger arrives to the vehicle and actually sits in a particular seat, the pre-set saved settings can be activated.

In one embodiment, settings can be curtailed for granted privileges and set with limits to systems, which may be in a sphere of influence of a given passenger.

The term vehicle should be broadly construed to include any type of vehicle that can or may transport people, things, and/or objects. Vehicles, without limitation, are sometimes referred to as transportation. In a specific example sense, vehicles may be defined by cars, trucks, vans, rental cars, ride share cars, taxies, limousines, busses, trains, planes, boats, bikes, scooters, etc. Consequently, it should be understood that the passenger privileges to settings and access to vehicle systems can set for any period or duration. If the passenger is a repeat passenger, such as a passenger of a family vehicle, then the privileges may have longer duration. If the passenger is taking a ride in a taxi, then the privileges may be for a short duration, such as only for the duration of the ride.

In one embodiment, passengers in a vehicle are provided with access to a filtered set of vehicle controls, settings, environment settings and vehicle applications, based on where the passenger is sitting. For example, if a passenger sits in a particular seat of a vehicle, the settings shared or made accessible to the passenger via his or her device may include settings and controls that relate to where the passenger is sitting. In one implementation, some settings and controls may include, for instance, controls for the seat the passenger is sitting in, air conditioning for vents that are proximate to where the passenger is sitting, heating controls for the seat.

In another implementation, the passenger may be provided with access to the radio/audio system of the vehicle, speaker controls for speakers of the whole vehicle or speakers that are proximate to the seat of the user. If, for example, the user wishes to lower the volume for speakers located near the seat he or she is sitting, the controls shared or made accessible to the user may enable such control. In another embodiment, when the passenger sits in another seat, different controls will be automatically provided to the passenger, such as those controls that relate to the environment or zone that relates or affects the current seat.

In one embodiment, a method is provided that includes receiving a request to access a vehicle computer of a vehicle using a mobile device of a passenger of the vehicle. The method also includes identifying a seat in the vehicle that is associated with the passenger and providing a user interface to the mobile device. The user interface exposing a plurality of vehicle systems that are interfaced with the vehicle computer. The plurality of vehicle systems include systems that relate to an environment zone in which the seat is located in the vehicle, and the user interface further includes controls for enabling setting inputs to one or more of the plurality of vehicle systems. The method further includes receiving setting inputs from the user interface of the mobile device of the passenger, such that the setting inputs instruct the vehicle computer to make changes to the one or more of the plurality of vehicle systems.

In some implementations, the request to access the vehicle computer includes an exchange of credential information to enable the access, the credential information identifying a user account for the access via the mobile device, wherein the credential information includes one of a user name, or a password, or biometric data of the passenger, or a pin, or code, or a name, or a word, or combinations of two or more thereof.

In some implementations, the user account is registered with cloud services that include servers and storage accessible over the Internet, the cloud services configured to store the setting inputs from time to time from the vehicle or the mobile device, the setting inputs usable to recall previous settings for later recall and use, and usable to identify patterns of setting inputs made, the patterns used to predict one or more future settings and to generate recommendations for the user account.

In some implementations, the exposed plurality of vehicle systems that relate to the environment zone in which the seat is located in the vehicle filter out vehicle systems that relate to other environment zones of other seats located in the vehicle.

In some implementations, the provided user interface, is generated from data served by a web server of the vehicle computer, such that a browser of the mobile device is configured to render the user interface in a form of one or more web pages that provide that include the controls for enabling receipt of the setting inputs to one or more of the plurality of vehicle settings; or is generated by an application of the mobile device.

In some implementations, the method includes, before receiving the request to access the vehicle computer, the vehicle computer is configured to identify the mobile device in proximity of the vehicle or within the vehicle; and sending a message to the mobile device that identifies availability to access the vehicle.

In some implementations, the method includes, before receiving the request to access the vehicle, exchanging information with the mobile device to determine whether the access is registered access via a user account or guest access, wherein guest access includes limits to functionality of the user interface provided to the mobile device; wherein registered access has more functionality relative to guest access; wherein registered access includes one or more levels of access as defined by privilege settings made by an administrator of the vehicle.

In some implementations, the method includes, the environment zone in which the seat is located in the vehicle includes systems for controlling positions of the seat, or systems for controlling air and heat from vents proximate to the seat, or systems for controlling lighting proximate to the seat, or systems for controlling volume of speakers proximate to the seat, or systems for controlling video to be displayed proximate to the seat, or systems for controlling heat of the seat, or systems for controlling window operation proximate to the seat, or systems for controlling digital glare of a window proximate to the seat, or systems for controlling a select set of global setting of the vehicle beyond the environment zone, or systems for controlling applications of the vehicle, or systems for sharing applications of the vehicle to the mobile device.

In some implementations, the method includes, the plurality of vehicle systems further include systems that enable access to applications of the vehicle on the mobile device, wherein the applications of the vehicle are rendered on vehicle computer and content of the applications is displayed on the mobile device or on the mobile device and one or more displays of the vehicle, or the mobile device and one or more mobile devices that are accessing the vehicle computer for other passengers.

In some implementations, the method includes, the changes to the one or more of the plurality of vehicle systems remain for a period of time while the passenger is associated with the seat of the vehicle, such that the settings revert to a standard state after the passenger is no longer associated with the seat of the vehicle; wherein the user interface enables selection of a new seat in the vehicle, the selection of the new seat for the passenger associates a new environment zone for the location of the new seat, and the user interface updates the controls for enabling setting inputs to one or more of the plurality of vehicle systems associated with the new environment zone for the new seat.

In some implementations, the method includes, providing a user interface to other mobile devices that are associated with other passengers seated in other seats of the vehicle, wherein the user interface provided to each of the other passengers exposes systems that relate to other environmental zones of the respective other seats.

In some implementations, the controls of the user interface further enable setting inputs to applications of the vehicle that are shared to the mobile device, display of content for the applications being rendered on the mobile device and for particular actions also rendering content of the applications on one or more displays of the vehicle; wherein access to certain of the applications of the vehicle and features of the applications of the vehicle being limited by privileges as set an administrator of the vehicle, the setting of the privileges being by way of interfaces on of the vehicle, interfaces on devices that have access to cloud services, wherein cloud services includes a user account for the administrator and the user account of the administrator including one or more of an identification of the vehicle and the settings and privileges managed by the administrator, or prior settings made by the mobile device, or a history of settings made by a plurality of mobile devices over time, or combinations thereof.

In some implementations, the method further includes obtaining data from sensors of the vehicle; and providing information regarding the data to the user interface that is to be displayed on the mobile device; wherein the sensor data includes information associated with one of speed of the vehicle, or location of the vehicle, or temperature of the vehicle, or health of engine or operations of the vehicle, or metrics of use of the vehicle, or seat sensor data identifying presence of occupancy, or sensors for locating mobile devices within the vehicle, or sensors for detecting position of the passenger within the vehicle, or sensors for triggering image capture or video capture in or around the vehicle, or combinations of two or more thereof.

In some implementations, the access to the systems is a restricted access to a granular set of systems, including seat controls, climate controls, audio controls, heating and cooling controls, window glare control, window controls, and controls to select applications of the vehicle, wherein the granular set of systems are limited to systems in a sphere of influence of the passenger, depending on provided privileges of the passenger.

In one embodiment, a method is provided, which includes receiving a request from a wireless device to access a computing system of a vehicle; verifying credentials for the wireless device; sending data for rendering on a user interface of the wireless device upon successful verification of the credentials associated with a user, the user interface identifying one or more passenger seats of the vehicle, the user interface including an option for selection of a passenger seat for the user of the wireless device; and sending data to the user interface providing access to a subset of vehicle metrics and control settings, the control settings being for an environment associated with the selected passenger seat of the vehicle, wherein the method is executed by a processor.

In some implementations, the method further includes sending data for rendering on the user interface that indicates occupancy of selected ones of the one or more passenger seats of the vehicle as determined by sensors of the vehicle; wherein selection of the passenger seat is for one of the passenger seats that is indicated to be occupied.

In some implementations, the sensors include one of a weight sensor, a heat sensor, a motion sensor, a sound sensor, an inertial sensor, a compression sensor, a camera sensor, a proximity sensor, or combinations of two or more thereof.

In some implementations, the request is received from instructions processed by an application executing on the wireless device, the application being associated with a model of the vehicle and is obtained by the wireless device for the vehicle.

In some implementations, the control settings provided to the wireless device are filtered controls that pertain to and are proximate to the environment associated with the selected passenger seat; wherein the control settings include one or more of seat positioning controls of the selected passenger seat, or an air conditioning outlet proximate to the selected passenger seat, or a speaker proximate to the selected passenger seat, or a heating or cooling of the selected passenger seat, or a window tinting of the selected passenger seat, or lumbar support of the selected passenger seat, or a video output proximate to the selected passenger seat, or audio settings for the vehicle, or cooling settings for the vehicle, or heating settings for the vehicle, or communication systems of the vehicle, or wireless connections of the vehicle, or combinations thereof, and wherein the subset of vehicle metrics include operational metrics of the vehicle, data from sensors of the vehicle, speed data of the vehicle, fluid levels of the vehicle, tire health data of the vehicle, brakes data of the vehicle, mechanical component data of the vehicle, diagnostics data of the vehicle, data from applications of the vehicle, communications systems data of the vehicle, altitude of the vehicle, temperature of the vehicle, real-time data of components of the vehicle, or combinations thereof.

In some implementations, the computing system of the vehicle is configured to receive an access request from a second wireless device; wherein upon verifying credentials of the second wireless device, presenting a user interface to the second wireless device to enable selection of a second passenger seat in the vehicle and sending data to a user interface of the second wireless device providing access to a subset of vehicle metrics and control settings, the control settings being for a second environment associated with the second passenger seat of the vehicle, wherein the second wireless device and the wireless device are enabled to communicate between each other and with the computer system of the vehicle.

In some implementations, the method further includes processing a wireless signal of the wireless device to identify a location of the wireless device in or around the vehicle, the location of the wireless device being utilized to identify a proximity of the wireless device to the selected passenger seat and proximity of the wireless device to a driver seat of the vehicle, wherein one or more functions provided by the user interface of the wireless device are disabled when the wireless device is determined to be within the proximity of the driver seat; wherein the location of the wireless device is determined by one of identifying a distance of the wireless device to a vehicle sensor or sensors, or identifying a time of flight of the wireless signal to one of the sensors of the vehicle, or a triangulation detection of the wireless signal of the wireless device by three or more of the sensors of the vehicle, or a strength of the wireless signal as measured by one or more of the sensors of the vehicle.

In some implementations, the credentials associated with the user enable saving of data for control settings to a user account of the user, the saved data for control settings being accessible for implementation in the vehicle from time to time; wherein the user account includes a history of when the control settings were implemented in the vehicle.

In some implementations, the history of when the control settings were implemented in the vehicle include one or more of a time of day of when the control settings are implemented, or a day of week or month of when the control settings are implemented, or a weather condition or environment condition when the control settings are implemented, or a geo-location of when the controls settings are implemented, or an identification of others in the vehicle when the control settings are implemented, or which one of a plurality of applications or programs are running or open or accessed when the control settings are implemented, or a combination of two or more of the forgoing conditions of when the control setting are implemented.

In some implementations, the history of when the control settings are implemented is accessed to identify learned patterns, the learned patterns being used to identify one or more recommended settings to implement in the vehicle via the wireless device from time to time, wherein the one or more recommendations are provided to the user interface of the wireless device.

In some implementations, an access code for the vehicle is shareable to one or more wireless devices over a network, the sharing of the access code enables a recipient of the access code to connect to the vehicle, the access code having predefined privileges that define a length of use of the access code and a definition of particular functions that are enabled for the access code, wherein a valid access code enables successful verification of credentials; or wherein the shared access code can be provided to guests of the vehicle, wherein utilization of the access code enables saving of functions utilized in the vehicle to one or both of cloud storage and storage of the vehicle; or wherein access to the subset of vehicle metrics and control settings is automatically disabled upon detecting that the wireless device is beyond a proximity of the vehicle where access is usable from at least one of the passenger seats.

Methods and systems provide access to cloud services over the Internet for managing a user profile of a vehicle on a cloud processing system connected to the Internet. One example method includes receiving requests to access the user profile to define settings for one or more vehicles. The method includes receiving input for user settings at the vehicle using the cloud processing system. The method includes processing the input over time to learn behavior associated with the input to the use settings. The method includes transmitting settings to the vehicle to be automatically implemented based on the learned behavior. In one example, the profile is associated with a plurality of vehicle types and the method includes detecting a violation of a setting or an incompatible setting in the profile that is user defined via the user account. The method can then automatically send a notification to a predefined administrator of the profile. The method being executed by a processor.

The profile can be transferred to one or more vehicles, can be set for a temporary period of time, can be set with wireless payment systems, and is accessible over the Internet to accept changes or updates.

In another embodiment, an application can be downloaded from a vehicle manufacturer, which provides an interface for accessing features of the vehicle. In such applications, passengers are able to identify their seat location within the vehicle, such that vehicle system controls for that particular seat are made accessible for control and for receiving setting from the user, while the user is a passenger. Once the user leaves the vehicle, the settings may revert back to a normal starting setting. In some embodiments, passengers can move around and select different seats, which can function to automatically change the settings available to the current seat ID.

In one embodiment, mobile devices located within the vehicle can be sensed by location detectors in the vehicle. In one such example, sensors can identify when a device has entered a zone of the driver. In such cases, some or all of the device functions can be disabled for safety purposes. One example of sensors can include sensors disposed on surfaces and/or driving devices, such as steering wheels, levers, gear shifters, and other types of settings and devices used in the vehicle to navigate/drive. These sensors may be used to determine when the device comes too close to the driver's area in the vehicle, so as to disable functional use. If the vehicle is sensed to have come to a stop or is placed in park, or is not operational, then the mobile devices can be enabled.

BRIEF DESCRIPTION OF DRAWINGS

FIG. 2 shows additional role settings for different users, in accordance with one embodiment.

FIGS. 3-5 show additional vehicle profile settings, in accordance with one embodiment.

FIG. 11 illustrates various settings for a profile and adjustments that can be made over the Internet via a device, e.g., using a portable device or the vehicle electronics and displays, and remote controls and settings in accordance with one embodiment.

FIG. 13B describes one example of how stored data and function declarations may be compiled to provide intermediary access to a vehicle's computer controlling vehicle systems, in accordance with one embodiment.

FIG. 13C describes a set of computer readable and executable code that can be compiled together by a third party APP developer in the form of an APP, in accordance with one embodiment.

FIG. 16B describes how one of many types of inputs into an assumption and reasoning logic module can be compiled over time, in accordance with one embodiment.

FIG. 16C describes one example of what an assumption and reasoning logic module may produce using the data points collected on an ongoing basis in FIG. 16B, in accordance with one embodiment.

FIG. 16D describes an example list of decision the decision and action engine may take based on information provided by the assumption and reasoning logic module and sets of assumptions created, in accordance with one embodiment.

FIG. 20 illustrates an example of a user accessing vehicle electronics, so as to access the vehicle controls and settings that pertain to the vehicle, and which may pertain to the seat location in which the passenger is located, in accordance with one embodiment of the present invention.

DETAILED EMBODIMENTS

Figure 1:
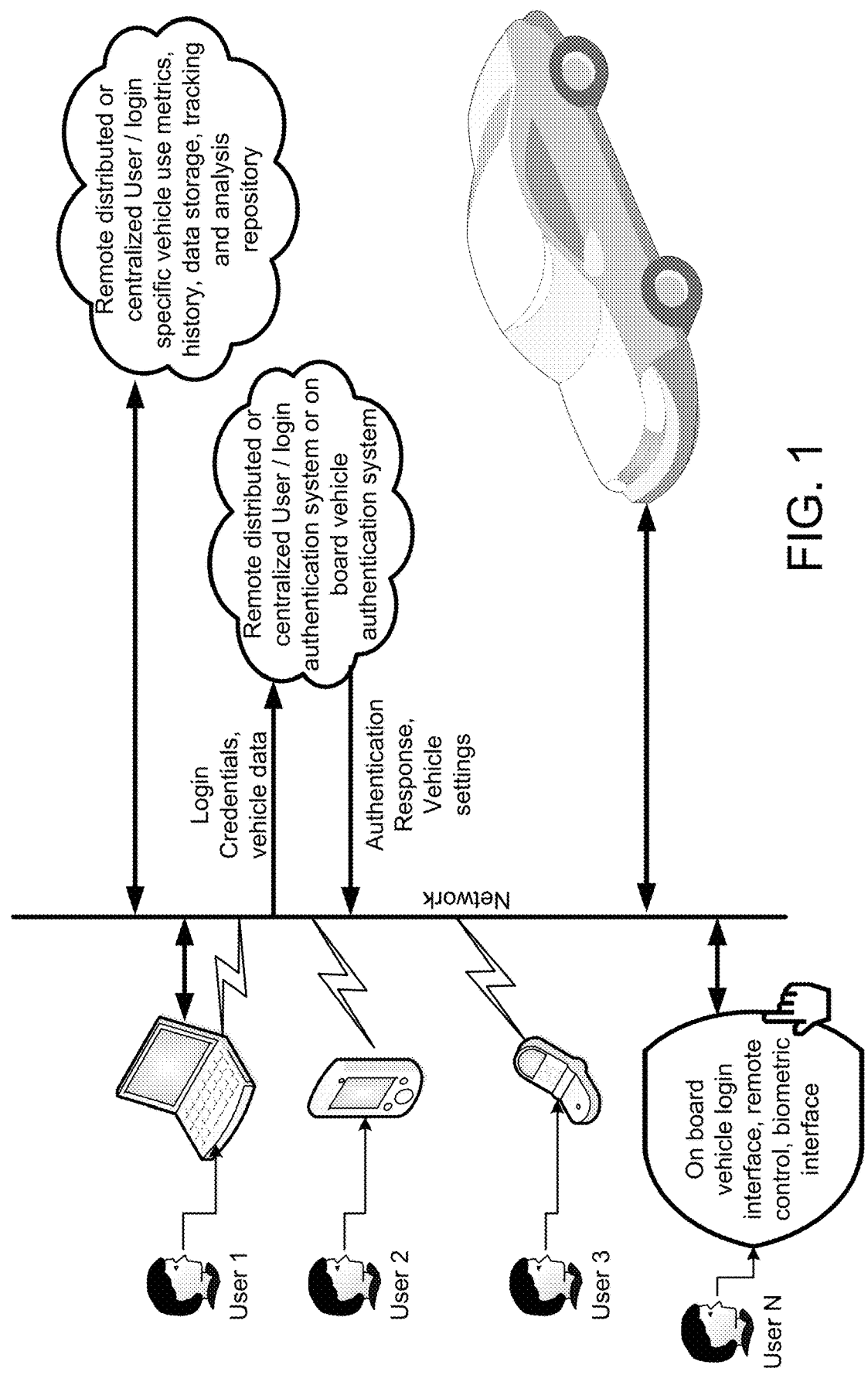
FIG. 1 shows example profiles settings for a vehicle, and association to roles, in accordance with one embodiment.

Embodiments of the present invention define methods, systems and apparatus for use in and with vehicles. The methods, systems and apparatus include electronics of vehicles that drive display devices in vehicles, communicate wirelessly with Internet services, and enable sharing of vehicle systems, controls and settings with devices of passengers of a vehicle.

Certain of the methods, systems and apparatus enable vehicles to share data with mobile devices of passengers or guests which may be riding or may be located in or around the vehicle. The methods are configured to provide passenger devices with access to vehicle electronics, which can share vehicle controls, settings, and environment settings with such passengers. In one embodiment, passengers in a vehicle are provided with access to a filtered set of vehicle controls, settings, environment settings and vehicle applications, based on where the passenger is sitting.

For example, if a passenger sits in a particular seat of a vehicle, the settings shared or made accessible to the passenger via his or her device may include settings and controls that relate to where the passenger is sitting or located. In one implementation, some settings and controls may include, for instance, controls for the seat the passenger is sitting in, air conditioning for vents that are proximate to where the passenger is sitting, heating controls for the seat, etc.

In another implementation, the passenger may be provided with access to the radio/audio system of the vehicle, speaker controls for speakers of the whole vehicle and/or speakers that are proximate to the seat of the user. If, for example, the user wishes to lower the volume for speakers located near the seat he or she is sitting, the controls shared or made accessible to the user may enable such control. In another embodiment, when the passenger sits in another seat, different controls will be automatically provided to the passenger, such as those controls that relate to the environment or zone and/or relates or affects the current seat.

In some embodiments, persons that enter a vehicle as passengers will be allowed to connect to the vehicle electronic by entering credentials (e.g., user names and/or passwords). Credentials can also include biometric data of the user. The biometrics can include face detection; finger print identification, eye retina exam, voice finger prints, and combinations of two or more thereof. The user credentials can be associated to a user account that is managed and/or stored by cloud services. The user account can, in one embodiment, share settings or preferences of the user for when the user is a passenger in a vehicle. For instance, the user preferences may include settings regarding temperature, seat settings, learned settings of when a user likes seats warmed, settings that trigger when environment conditions are at a particular levels (e.g., seat warming is usually set at level 3 when it 25 degrees Fahrenheit outside), settings that are for particular types of cars, settings that are for particular vehicles owned or used by a user, and other settings and controls.

In some embodiments, when a passenger sits in car seat, such as a front passenger seat, the device of the passenger pairs to the vehicle in guest mode. In guest mode, the passenger is provided with access to certain features of the car. For example, the user can select to heat the seat, change the air settings, and adjust the seat to a specific setting (e.g., a GUI may show a subset of settings, pages of settings and/or controls) from which controls can be entered. In one embodiment, a device is allowed to set and recall the settings for future pairings with the vehicle. In some implementations, the settings can be predictive based on settings in past, the current environment (e.g., outside temp, inside temp, season of year, time of day, etc.). The controls, functions and interface abilities provided to each passenger can be based on where the user is sitting in vehicle, or based on privileges, or can be dynamically set or terminated.

In still other embodiments, sensors in the car determine where particular passengers are sitting or located. Sensors can include seat sensors, weight sensors on seats, spring sensors on/in seats, heat sensors on/in seats, motions sensors on/in seats, switches, cameras, heat detectors, or combinations of two or more thereof. Over time, as passengers provide settings to tune conditions of their environment or liking, the settings can be memorized to the user's profile on cloud services or on the vehicle or on the user's device, or combinations thereof. In this manner, when the same passenger returns to the same vehicle (e.g., with the same device or different device with the same credentials), the settings and prior profiles can be recalled and used again.

In some embodiments, accessing data stored in cloud services, users are able to take their profiles and settings to other cars. Access to a particular car may be contingent on the vehicle owner (e.g., admin) providing passengers or guests with access. The access can be for a period of time, or can be until the admin terminates the access to the vehicle. In this manner, users are able to use their devices in various vehicles and the users' settings and preferences can be easily accessed and/or recalled. Some settings will depend on the type of vehicle. Once a user connects to a particular vehicle, the vehicle electronics and software provide the custom settings of the vehicle to the user's device.

The vehicle can provide the settings, for example, by functioning as a web server that can provide pages to a browser of the user's devices. In this manner, users need not download special applications, and connection to the vehicle can be by way of a browser on the device. In other embodiments, an application can be downloaded and installed on the devices to allow communication with the vehicles. The settings provided by the vehicle can be, for example, for certain comfort settings and/or vehicle metrics (e.g., air, radio, seat temp, seat setting, access to vehicle metrics, speed, oil settings, apps of the vehicle, etc.), specific for a seat or seats.

In some embodiments, users are able to pre-pair to a car, by accessing a cloud interface, where the device can be paired to a car. In another example, someone can text, email, share, or provide access to a link or code so that a person can obtain access to a vehicle. For example, a user can send a friend the code or link to log into cloud services so that the friend's device can be pre-paired to the user's car. When the friend is a passenger in the user's car, the friend will be able to auto-link to the car. Along the same example, a user wishing to travel by vehicle (e.g., car, truck, bus, airplane, boat, etc.) can register to pre-pair to the vehicle. Once the user gets to the vehicle, the user's device will auto connect to the vehicle or will connect upon acceptance of the connection (e.g., by way of one or more screens or GUIs). In some examples, the passenger can pre-set certain settings from interfaces provided by cloud services, so that when the user arrives to the vehicle the settings can be implemented automatically, once paired and/or the seat is identified for the passenger.

In one embodiment, a passenger can identify the seat (e.g., seat ID) in which he or she is sitting so that the controls for that seat can be provided. The controls are, in one embodiment, a subset of the vehicle controls that enable the passenger to control settings and access vehicle applications and controls that may pertain to the area or zone proximate or surrounding the seat in which the passenger is assigned.

In some embodiments, seats are pre-assigned, such as in commercial airplane travel. When a user makes a reservation for travel on the airplane, a pairing code, access, password or link to cloud services is obtained. Thus, when the user arrives to be a passenger in the airplane, the user's devices will be provided with filtered access to controls of the airplane, e.g., seat settings, air settings, ordering food for the seat-by pre-paid payment, ordering service for the seat, controlling seat temperature, receiving access to applications of the airplane, for the assigned seat.

In one example, sensors of the airplane can detect other systems information, which may be made available to mobile devices of passengers. Example sensors may include sensors that determine if restroom facilities are open or available. By communicating this information, passengers can determine when to get up from their seats for a restroom break, instead of having to arrive at the restroom and notice that it is occupied. Sensors can also determine if the area outside of the restrooms are crowded with people waiting. This information can also be provided to the mobile devices of the passengers. By providing passengers sensor data regarding services and availability of services directly to a passenger's device, better utilization of services can be provided, which improves customer satisfaction. As noted below, some airplane embodiments will also allow users, via their mobile devices, to access controls associated with their seats, such as air-vent controls, seat position controls, etc. In some embodiments, certain controls can be eliminated, including display screens, which serves to reduce the cost to making airplanes and also reduces flying weight, and improves savings in fuel consumption. In some embodiments, the information provided to passengers in an airplane can also include Internet access, as well as access to select in-flight entertainment (e.g., movies, games (single player and multi-passenger player games), requests for service, etc.).

In still further examples, passengers seated in an airplane can also communicate with each other via inter-seat texting or messaging or communication, using an application of the vehicle (e.g., in this example, an airplane). These airplane embodiments are not limited to airplanes and other types of transportation or vehicles can also utilize similar functionalities.

In some implementations, some of these settings can be pre-made via the cloud, so when the passenger arrives the setting can be implemented. Similar settings and controls can be provided for other types of vehicles, wherein users/passengers can utilize their devices, and controls can be provided to users based on where they sit or are located in the vehicle.

In some embodiments, content and/or applications can be provided to each passenger given access to vehicle electronics. In an example, different content can be fed to each passenger device.

In one example, detecting the location of the device in the vehicle can include requesting that the user identify his or her seat via a user interface, as provided by the vehicle electronics and software. In other examples, sensors in the vehicle identify proximity of the device to certain seats. The sensors can sense the WiFi signal, Bluetooth signal, or wireless cell signal. The detection of where the device is in the vehicle can also include using sensors in the seats themselves, which can identify if a person is seated in the seat. Still further, if certain controls are provided to a device of a passenger, it is possible to detect if the device is shared with the driver. If the device is detected to be close enough to the driver's seat that a driver can access the device and services/controls, the functionality can be disabled. Disabling can, in one embodiment, occur if the vehicle is moving. If the vehicle is in park, then the device would not be disabled, allowing the driver to user features of the device.

In some embodiments, a vehicle may transfer certain controls (e.g., user interface representations of digital and/or analog dials and buttons present in a vehicle dashboard) to a passenger's device. Thus, passengers sitting in seats that are further from the dashboard controls (e.g., back seats, side seats, back of the bus, etc.) can simply use his or her device to control functions and settings of the dashboard. The provided functions and settings are, in one embodiment, a subset of all controls that are normally available to the driver. For instance, passengers may not need access to certain driving controls, and those controls are not provided to passengers. Controls, e.g., such as entertainment controls, may be freely provided to passengers based on one or more predefined settings, templates and/or privileges. Still further, passengers can control certain environmental settings that are closer to where the passenger is sitting, e.g., such as air conditioning vents, speaker volume of nearby speakers, etc.

In some implementations, such as an airplane example, certain controls that are physical on the airplane can be provided to the user's device for setting. One example may be the typical air-vent of an airplane, which from daily continuous use gets dirty and may pass germs and colds to subsequent passengers. Providing these types of functions (to user devices), including seat settings, display settings, service calling buttons, etc., would allow the passenger to avoid touching those physical items in the plane—and avoid a cold or the like. Still further, if controls are provided to passengers via their devices, airplanes and other vehicles can avoid installing expensive buttons, window shades, digital window tinting, toggles, joysticks, switches, backseat display devices, in seat remotes, etc., for each passenger seat—as the passenger can control such features (based on privileges and seat locations) via their mobile device.

In still other embodiments, an application or website may provide pass-through access to applications loaded on the vehicle. The vehicle may have applications already installed on the vehicle computer, such as applications useful for finding a bathroom, a parking spot, a charge unit for electric power, a gas station, etc. Thus, instead of every passenger downloading an app and storing on their personal device, the vehicle may provide access to such applications to the devices of passengers. In this embodiment, the vehicle electronics and software host the applications, and users can access, interact and provide inputs to the app via their devices. In one embodiment, a browser on the device can provide the user interfaces to access and control applications loaded on the vehicle and features of the vehicle. In such cases, the vehicle may function as a webserver, which avoids the need for individual users to download apps to their devices, especially if user will only be a passenger in a particular vehicle for a short duration.

In some embodiments, the vehicle apps are useful to all occupants. Thus, by providing access to such apps to passengers, passengers can assist the driver to interact with the apps, make settings, search for gas, find charging stations, map destinations, set the air conditioning, etc. An advantage of this configuration is that the driver is less distracted, as the passengers are able to provide assistance to the driver, so that the driver can concentrate on driving, and overall safety is improved. It should be appreciated, that passengers sitting in any seat of a vehicle may be provided with access, thus even back seat passengers, for example, can assist the driver in navigation, control of vehicle apps, control of vehicle settings, and the like. In such examples, if the passenger is assisting in navigation, the display screens where maps may be generated on the passenger's device may be synchronized to one or more of the vehicle displays (e.g., the center dashboard). For instance, one passenger finds a map to a theater; the driver then sees the map on the dashboard with directions ready to go. This avoids requiring the driver to set the navigation inputs while driving, if a passenger is present. In some embodiments, the driver may also interact with the same shared application, in a shared mode.

In one embodiment, passenger access to the vehicle apps can be by way of the vehicle's network connection/GPS and/or the passenger's device network connection/GPS. It should be understood that, in some cases, apps of a vehicle may only access on-board components and in other cases the apps access the Internet and cloud services. Access, via passenger mobile devices, therefore, can include a situations where accessing of data/applications occurs via network links of the vehicle and/or the mobile devices.

In still further embodiments, once a user has made selections for particular settings, those settings can be saved to the user's account on cloud services, on the device, locally on the vehicle, at all locations depending on the desired configuration. In one example, if the settings are saved from time to time on the cloud and associated to the user's account, the user's preferred settings can be predicted, based on patterns of prior settings and with contextual analysis of when and where the settings were made. In some examples, the contextual analysis of when, why, how can be analyzed against what else is occurred, happing or other settings. For instance, if a particular type of music is selected, and it is Friday evening at 8 pm, near a theater, and there is another passenger in the vehicle, then when the similar context is presented the type of music setting can be suggested to the passenger/user.

In some embodiments, a passenger is provided with the option to change all or a select group or set of his settings to his previous/prior elections or to his favorite elections/selections based on a match to current environmental circumstances/context, and based on learned behavior. In one example, the computer/system can provide intelligent suggestions to the passenger, wherein what is suggested or recommended is more likely than not to be selected by the user. This intelligent suggestion system works to present certain user interface screens to the user (e.g., with the suggested settings/controls), and the user need not navigate multiple screens to find what he most likely will want or need. Still further, a passenger can elect to move all or some of his settings to his prior choices/settings, e.g., which were made when the passenger last connected or just previously made (e.g., the move back is like a browsing back input, for one or more of select settings).

In still another example, the computer (e.g., with access to the passenger's account and history data—in cloud processing/storage) may notice that the passenger's favorite temperature is 65 degrees, but the computer also notices the passenger likes 60 degrees when the temperature outside the vehicle is above 79 degrees. In another embodiment, the computer may also determine (e.g., predict from learned past events) that the passenger may want a warmer temperature since the exterior temperature is colder than normal and may suggest a new temperature. The computer may also provide the passenger the ability to manually change the temperature (which would be another data point to add to leaned settings, which would continually change and mold to form new predicted settings). Alternatively, the user may wish a relaxed seat position normally but the computer knows that is usually only when the vehicle is traveling at a steady pace (e.g., instead of start and stop city driving). When there are many starts, stops and accelerations, the passenger may prefer a sport seating position and may be suggested when the vehicle is moving aggressively for a threshold period of time, which may be predefined.

The following description regarding FIGS. 1-16D will provide examples of cloud services, user accounts, and privilege management, and custom user access to the vehicle, vehicle controls, application access/control, user interface customizations, and the like. FIGS. 17-26 provide more specific examples of methods, systems, computer readable media and apparatus that enable vehicles to share access of specific vehicle functions, environmental controls, applications, and settings, using mobile devices of users that may be passengers in the vehicles. However, it should be understood that the embodiments defined throughout the specification in each drawing and written description, along with any content incorporated by reference may be combined in various ways, forms and formats to defined specific implementations.

In the various embodiments defined herein, Internet services provide access to cloud services. The cloud services provide access to user accounts and access to settings, configurations, applications and other customization defined by the user. Customization can include user interface customization of a vehicle display or displays. The customization can include the ability to select specific applications (APPS) to be activated by the vehicle and interfaced via the display or displays, voice input, touch input, etc. The customization is also provided with a learning engine that learns use behavior by the user or patterns of behavior of multiple users, and automatically implements settings or programming to aspects of the user interface, or provides recommendations or notifications with recommendations. The programming can include automatic programming at certain times, days, months, years, etc., and can be updated or molded over time as the user continues to use the vehicle UI.

In one embodiment, a user can access cloud services for a vehicle manufacturer and identify the particular vehicle from selected choices. The user can then identify a customization profile for the vehicle by defining the look and feel of a UI display, arrangement of vehicle controls on displays, add and associate third party APPS to the vehicle display, and save the configuration.

The configuration, in one embodiment, is saved to the profile of the user. In one embodiment, the profile is saved on a database of a specific vehicle manufacturer that offers the customization option. In still other embodiments, once a configuration is saved to the profile account of a user, that configuration can be shared to other vehicles of the user. In still other embodiments, when a user buys a new car, the custom configuration can be transferred either entirely or partially to the new vehicle. In some embodiments, if the vehicle has more or less system functions, the customization can be adjusted automatically or the user can be provided with options to update the customization to add or delete features. In one embodiment, the customization will be facilitated via a website. In one embodiment, the website may be of the vehicle manufacturer. In one embodiment, the website of the vehicle manufacturer can allow the user to add APPS that are created by third parties. The third parties can create APPS that communicate with APIs of the system components of specific vehicles of the manufacturer. Once APPS are selected, the user can add them to the custom user interface (UI) display.

The user can also be allowed to arrange the APPS or icons of APPS in a specific custom arrangement that is saved to the user's profile. In one embodiment, the user's profile can also be run on various vehicles, other than those owned by the user. For instance, if the user is renting a vehicle and the vehicle has access to cloud services, the user can enter his user name and password (or other identifiers), which log the user into the cloud services and saved profiles. The saved profiles will then enable logic to build a custom UI for the user based on the vehicle being driven. In one embodiment, the system components and APIs of the system components of the rented vehicle can be paired or linked to the user's saved APP selections.

The user's saved UI configuration may also be transferred to the display of the rented (or other vehicle) vehicle. A best-fit configuration can also be generated using the user's profile selections, so that the configuration provided for the other vehicle will closely resemble or appear as it does for the configured vehicle. In other embodiments, the user's use metrics can be monitored. The use metrics can include use of APPS, use be of system components of the vehicle, use of the vehicle, environment conditions, and historical actions taken by the user via the input/output controls of the vehicle (e.g., buttons, levers, keys, fobs, display selections, display interface actions, communication actions, etc.).

These historical actions can then be used to define learned actions. The learned actions can be analyzed to change configuration settings in the user's saved profile. For instance, if the user uses a particular APP every day at a particular time, that APP icon can be surfaced to the display or preset to start. The APP can then provide information to the user at about the same time the user normally needs the information. Other historical use patterns can be monitored and such data can be saved to the user's profile.

The data can then be used by algorithms that build assumptions based on historical inputs by a user as well as environmental inputs, location inputs, vehicle diagnostic inputs; internet connected marketing deals, the user's calendar, traffic conditions as well as news. The assumptions the algorithm builds are then processed into decisions and actions by an additional algorithmic process to activate local or remote audio and visual alerts, change vehicle systems, display information on a vehicle's displays and request a decision from a user locally or remotely to complete an action.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as cars, buses, vans, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.).

The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smartphones, tablet computers, laptop computers, watches, glasses, general-purpose computers, special purpose computers, devices of any size for form factor, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as 802.11.ac, 802.11ad and subsequent wireless networking protocols, Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

Still further, certain applications can increase in size when being used or decrease in size to enable selection at a later time. For example, selecting the temperature system component may expand the system component to a larger space, thus temporarily removing other displayed components. The user can also select other buttons to access other system controls, other apps, or modify or add applications or system controls. When modifications are made, the modifications are saved to a user database and profile of the user, as managed by cloud services.

Cloud services will therefore allow any future modifications to be made to the custom configuration at any time and from any computer connected to the Internet. Still further, the custom configuration can be transferred to a second vehicle. If the custom configuration is transferred to a second vehicle, the system can select the system components for the second vehicle and attempted do a best match of applications available for the second vehicle that resemble or match the ones used in a first vehicle. Specific settings, arrangements and other features may also be transferred to a second vehicle, by simply transferring the custom configuration to a second vehicle.

In one embodiment, the functions of the specific applications illustrated in the display will be monitored and restricted depending on safety considerations while driving. For example, if the interfacing functionality requires more interactivity with the display, or requires a reading of text or inputting text, those functions will be disabled during operation of the vehicle. Once the vehicle comes to a stop, or is placed in Park, certain of these functions will be activated. In other embodiments, other safety considerations will allow for applications to shift from outputting text to outputting audio or voice. The input can also be changed from touchscreen, button touches, selections, and/or voice input. In still other embodiments, safety considerations can allow certain user interface components to move about the display to provide easier reading while driving or automatic conversion of text to audio.

For example, content being displayed in the center panel display of the vehicle, can be automatically shown in the dashboard display region of the vehicle, such as in front of the steering wheel. In still other embodiments, some content or display data can be moved from the center console or the display in front of the steering wheel to the windshield of the vehicle in a heads-up display area. Accordingly, algorithms executed by the applications and applications of the manufacturer, can cooperate to provide functionality to the application features and interfaces, while maintaining safety parameters defined by rules. The safety parameters will therefore allow content of the user interface to be shifted around to various displays of the vehicle, or translated to voice or audio at certain points in time.

These settings and customizations can be made through the web/cloud services and tools provided by the website of, for example the manufacturer of the vehicle. In one embodiment, the cloud services provided by the manufacturer can be provided by a partner of the manufacturer. The partners of the manufacturer can include software companies that develop, host, or manage certain functionality provided by the vehicle manufacturer. In other embodiments, the partner software companies can integrate tools or components with tools and components of the vehicle manufacturer. This provides for integration with one or more cloud services, software services, Internet services, and services provided by systems of vehicles or systems of the vehicle manufacture. In either case, whether the software and logic is designed and constructed by one or more entities, the cloud services provided by the vehicle manufacturer or the website that provides the tools for customization will appear as a unified simple to use interface for the user. As mentioned above, the cloud services can provide databases for saving the user profile and data associated with the user account.

The user profile can include settings made by the user, customizations made by the user, identification of applications purchased or added to the vehicle customizations, etc. Still further, the user profile data can be part or be associated with the user account. In this manner, the user that customized a user interface can access the Internet at any time, whether through the vehicle or through any other computing device having access to the Internet and make changes, modifications, or access control features of the vehicle remotely. In one embodiment, the profile of the user can be accessed from any vehicle, such as rented vehicles or shared vehicles. Settings and profile data can then be shared for a period of time on any vehicle and use data on that vehicle can be stored.

When the user is not using the vehicle, the custom configuration can be turned off or locked out for another session. Once the user wants to start a new session, the user can log back in and the custom configuration returns. In other embodiments, the custom configuration will automatically turn off when the user is not driving the vehicle or has not logged into the vehicle. In other embodiments, the custom configuration can be automatically turned on when the user is detected. The user can be detected using biometrics, login credentials, image detection of the face, fingerprint detection, retina scans, etc. In some embodiments, biometrics can include data used to identify the user, such as face recognition, fingerprint reading, retina scans, voice detection, or combinations thereof. Still further, the custom configuration can be transferred to other vehicles.

If the user wishes to use his or her custom configuration in another vehicle, the user can login to the custom configuration or user account from another vehicle. If the other vehicle does not have all the system components needed to define the custom configuration, the custom configuration can be supplemented with other similar components automatically. In other embodiments, the custom configuration can be transferred from one vehicle to another, or when the user buys a new vehicle. In another embodiment, the custom configuration can be adjusted based on the driver. The custom configuration can also be preset remotely from the Internet, using the cloud services. The custom configuration can also be configured to provide limited use of certain systems or the vehicle, such as when a guest is driving the vehicle. In other embodiments, restrictions can be placed on the vehicle speed, location of driving, and automatic notifications for the user or the master user of the vehicle. The master user of the vehicle can have a master account with administrator credentials.

In still another embodiment, the vehicle can be loaned to a child of driving age (under 21/18 years of age), and the child can be provided with restricted use of the vehicle. When the child exceeds or does not follow the restrictions of the vehicle, automatic notifications can be provided to the user that is the administrator of the vehicle. The notifications can be by cell phone, smartphone, tablet computer, mobile device, text messages, phone calls, commendations of phone calls and text, audio messages, audible sounds, vibrations, and commendations thereof. History use of the vehicle can also be maintained in cloud services. The history use can provide the user with information as to where the vehicle has been, the speed or events, violations that occurred when use of the vehicle etc. The configuration can also provide messages to the driver warning the driver of when the vehicle has exceeded a restriction, or is approaching a restriction in use, driving area, speed, etc.

The screen displays can have various configurations, placements, sizes, number of pages, tabs, etc., and the user can provide controls for some or all of the interfaces and controls in certain locations. The selection can be enabled for third-party applications. The third-party applications can be selected from the vehicle site, or by providing links to third-party sites. The third-party applications can be pre-identified by the site and displayed to the user if they are compatible with the particular vehicle selected. In another embodiment, the third-party applications can all be shown to the user whether or not they are compatible with the vehicle. Upon binding/pairing or attempting to find application for the vehicle, compliance as to whether the applications operate or comply with the particular vehicle can be made.

In one embodiment, certain third-party applications can be reviewed by vehicle site administrators before they are made available to users for selection. In other embodiments, the third-party applications can be approved or disapproved. In still other embodiments, the third-party applications can be augmented with restrictions made by the vehicle manufacturer, or dictated by law. The restrictions can be applied, based on the anticipated interfacing with the vehicle interfaces, to ensure safety during driving. For instance, if a particular application requires entry of text, navigation of controls, or other activities that would distract the driver during operation of the vehicle, such vehicle controls or application controls for application interfaces can be temporarily disabled, or can be automatically transferred to a heads up display, or can switch to take audio vocal input from the user. In some embodiments, when the vehicle has come to a stop or is place to park, certain controls or interfaces can be re-enabled, or moved back to original display location or converted back from voice input to touch input. In one embodiment, tools provided by the vehicle site or third-party site can provide for customization of the layout of the display screens of the user interface.

The customization can include organizing or laying out system interfaces as well as application interfaces, such as those interfaces provided by 3rd parties. In one embodiment, interface rules are applied to determine if the system interfaces can be replaced with third-party application interfaces, while providing access to the control interfaces via the APIs of the systems. For example, if the user wants to provide a custom speed indicator, the speed indicator must be compliant (via APIs and/or mapping) with the system interfaces so that the speed readings can be populated to the third-party application. In one embodiment, rules can be integrated with or applied to the applications and system user interfaces for when the vehicle is moving. As mentioned above, such rules can limit interactivity with certain user interfaces while the vehicle is moving to prevent unsafe driving. In one embodiment, the custom user interface is saved to the user profile.

The user profile may contain settings, such as selections of the user interface components associated with the system of the vehicle, as well as user interface is provided by third-party applications. In addition, the user profile can contain and store settings provided by the user. The settings provided by the user, as mentioned is this disclosure can also be learned settings based on use. The settings can further include remote access settings, as well as settings allow the user to control vehicle components from a remote location or a remote computer. The setting can also include providing access to the user account to view historical driving patterns, recent driving activities, the performance of the vehicle during specific driving sessions, the performance of specific vehicle components, etc.

In one embodiment, the custom user interface configuration can be transferred to the vehicle. The custom configuration, as mentioned above is stored in the database of the vehicle manufacturer, or a database held by a 3rd party that cooperates with the vehicle manufacturer to provide cloud services. The database, in one embodiment, is a network accessible storage, which allows access to the user to program and modify the user interface using any computer or device having access to the Internet, including the vehicle itself or a third-party vehicle. The method then proceeds to operation where the custom user interface can be activated in managed for Internet connectivity for components of the custom interface. For example, the vehicle's Internet access protocols can be set, or registered with an Internet provider or service provider for the cloud services. The service provider for the cloud services can be the vehicle manufacturer, a company cooperating with the vehicle manufacturer, a third-party company, or combinations thereof.

In one embodiment, the method/logic can also enable local communication with mobile devices that may be in the vehicle. The enablement may be provided by allowing synchronization with the computing system of the vehicle, or with the computing communications of the portable device. For example, the local communication can be paired automatically, based on a preset pairing process where pairing keys are entered. This provides for automatic settings and synchronization when the user enters the vehicle with the portal device. As mentioned above, user interfaces associated with applications loaded on the user's portal device can also synchronize to the display screens of the vehicle, as predefined by the user.

In one embodiment, vehicle settings are saved to either a memory number button on the vehicle or synced to a key fob, or accessible via an interface or voice activation. In one example, a vehicle operator profile is provided to allow users to maintain their individualized profiles, settings and accounts for vehicles from any internet connected device or be able to login to their vehicle physically in or near the vehicle by the use of a fob, thumb print, eye scan and or manual login using an input device that interacts with the vehicle's login system.

In one embodiment, the profile can be managed at a user account saved to a central or cloud distributed system, to manage access. Any vehicle can be abstracted so that any user can log into any vehicle if they have an account that allows access to that vehicle. For instance, a vehicle owner with the role of "administrator" (e.g., an administrator of a user account that has a profile associated therewith or multiple/sub profiles) can create logins for his or her vehicle (s) for additional users such as his or her children, spouse, mechanic, and valet driver among other applications. Logins can be created for individuals or for roles such as the role of "child" where all users with the role "child" would have the same vehicle specifications applied to the vehicle they will be logging into. Similarly, the role of valet can be given and shared by any valet driver.

The purpose of abstracting vehicle operators from the vehicle itself is a shift from the current state of the art in which settings are vehicle specific—each vehicle typically only having the ability to store 1-3 sets of settings, to where vehicle settings are user specific and 1-n logins can be managed through an access management system. The embodiments defined herein allow each user to apply his or her settings to any vehicle based on their login information in which they provide their login and password. When a user logs into a vehicle, the vehicle will determine locally on board and/or communicate remotely with a central or distributed access management system to determine the validity of the login presented to the system. If the user's login is recognized, the system will apply settings and use privileges to the vehicle prescribed by the login.

Logins can have "role" specific settings and privileges or settings and privileges set only by the administrator that cannot be overridden by the user of the login. For instance, an administrator may create a login for "John" their 16-year-old son. The administrator can apply settings to John's login that John cannot override such as the maximum speed the vehicle can travel. For instance, Although the vehicle may have the ability to travel at a speed of 130 mph, John's login will only allow the vehicle to travel at a speed up to 90 mph. Additionally, every login may have settings that the user of the login can toggle to their liking such as the list of radio stations they would like pre-programed every time they log in to any vehicle that accepts their login.

Logins can control all aspects of a vehicle's behavior and can be attributed to individuals or roles. These settings can be toggled via a network connected device such as a computer, web application, smart-phone or directly on the vehicle. Administrators can decide which settings are locked for specific logins or roles, which are open for the login user to toggle and which settings are to be enforced depending on the time of year, or time or day etc., or when a condition or event is detected.

Login settings that can be set and remotely administered include but are not limited to, driving characteristics (rate of speed, fuel consumption guidelines) location based settings (GPS aided travel restrictions, travel radius boundaries, dynamically loading maps, dynamically loading directions, dynamically loading fuel, charge and battery service and purchase locations etc.), time of day based use restrictions (day driving only for example), automatic purchase settings (financial institution linking for automatic purchasing of fuel, charge time, batteries, car washes, etc.), fuel settings (Electric only, fuel only, hybrid only etc.), refueling routing and purchase (incentive based re-fueling maps, incentive based refueling offers etc.) driving characteristic settings (sport, comfortable, soft, off-road, high performance, economy mode), entertainment system settings (radio memory settings, internet access or restriction, streaming services settings), comfort & HVAC settings (climate control, seat positions, seat heater/cooler, suspension/ride settings, entry lighting, remote start, remote stop etc.) tracking/metric settings (camera/video recording guidelines, mileage, top speed, average speed, MPG, wear and tear settings and notifications, historical travel maps).

Automatic purchase settings can be processed in response to requests from the vehicle. The request can be, for example, to transact a payment is for one of a car wash service, a fast food service, a toll road service, a goods purchase service, a rental service, a lease service, or combinations thereof.

Additionally, combinations of settings or setting profiles (such as "sport" where your seat moves to sport position for additional support, suspension stiffens, throttle response becomes aggressive etc.) can be set as well instead of individually setting use characteristics. In one embodiment, logins are user specific, not vehicle specific, so any family member can use their login on any family vehicle and the vehicle will perform based on the metrics and restrictions dictated by the login used to operate the vehicle.

Companies or entities can create and manage logins to company vehicles for delivery drivers, car washers, and mechanics among other applications. Each login can be configured to provide or restrict access based on the user logged into the vehicle. A company may only allow a delivery vehicle to travel at a maximum speed of 80 mph to limit reckless driving. A company may create a role of "local delivery only" where a driver with that login can only drive the vehicle within their territory. Breaches in territory travel will result in a recorded event and notification to the vehicle administrator as well as the vehicle operator. A grace period will be given to re-route back into the driver's territory before more aggressive vehicle disabling mechanisms are deployed. The driver will be given visual and audio cues as to how to avoid vehicle disabling.

A dealership can grant "test drive" logins to potential customers, which allows them to operate less than 100 mph and only within a 5-mile radius. In one embodiment, alerts or notifications can be automatically triggered if violations in the restrictions are detected. A dealership may also grant a "demo" login for instance, which showcases the vehicle's capabilities, available APPS, features and benefits. Variations of the "demo" login can be used on variations of potential buyers. A "18-24 year old demo" may be useful for enticing that demographic and showcases the vehicle's features 18-24 year olds are most receptive to.

A valet can be given a password to login only as "Valet" which will impose restrictions on trunk operation, vehicle speed operation, vehicle location notification settings etc. A recording option can be provided, which can set a recording within and around the vehicle when in the valet mode. This way, the user can login to see what the valet driver did while in possession the car, in case the owner feels that something is not correct when the vehicle is returned to the owner. Additionally, while the valet is driving the car, a notification can be provided to the valet that will alert the valet that recording is in progress, and their face can be shown on the display while the valet parks the car.

A user may set the valet login to alert the user that left the vehicle with a valet that the car has traveled beyond the allowed radius or has reached a speed greater than 100 mph, for example. This alert can be sent wirelessly to an email address, texted via mobile phone number or sent to a mobile device having a login-profile mobile application capable of sharing current vehicle location, speed, fuel status among other metrics. The last logged in user of the vehicle or vehicle administrator can send visual, audio or auto override notifications to the valet letting them know they need their car back, they are traveling too fast or even auto shut down to prevent theft.

A parent can set up a login to the family vehicle for their child that only allows the child to drive within a certain radius. For example the vehicle may only be used to drive between home and school. A map can be outlined on the account management interface by a parent when setting up the child's login to support the home to school restriction intended.

In one embodiment, a parent or company may give a child or company driver a login that also carries a financial allowance connected to one or more financial institutions administered through the access management and/or login management system by administrators. For instance, a child may have the need to re-fuel the vehicle by purchasing either traditional fuel, battery units, and or charging time but a parent does not want to give a general credit card to the child. The parent will set a budget for fuel purchase for the given login and the login will then allow the vehicle will communicate with the fuel, battery, and or charge-dispensing unit automatically using a wired or wireless communication systems funding the purchase automatically up to the allotted budget set in the login of the vehicle.

In one embodiment, these features are useful for fleet vehicles where company vehicle users currently use a corporate credit card to purchase fuel where fraud may exist in the form of using company credit cards, or company fuel accounts to fuel personal vehicles. The new system ensures only the company owned vehicle is approved to purchase the traditional fuel, battery, charging time and also maintains metrics on which logged in user consumed fuel and re-fueled which vehicle.

In one embodiment, a process is created so that some or all manufacturers use the same type of login/access management system. By way of example, any user can log into any vehicle from any brand in so far as they have account creation access or a recognized login. Once logged in, each vehicle will receive and impose the login-based settings as long as the manufacturer supports the login/access system.

FIG. 1 shows various methods a user can interact with a vehicle login system, in accordance with one embodiment. The user may use any network-connected device ranging from a mobile computer, mobile phone, mobile network device all connecting to a remote converged or distributed network cloud system. The user may also interact with the vehicle login system directly on or near the vehicle. The user supplies login credentials to a vehicle login interface which are sent to the remote distributed or centralized user login authentication system or onboard vehicle authentication system. The processing logic receiving the login credentials processes the data and returns an authentication response to the user attempting to log in. If the authentication is a success, the vehicle the user attempted to log into has vehicle settings applied to it and the user is allowed to operate the vehicle. If the authentication is a failure, the user is presented with a failed access notification on the login interface.

FIG. 2 shows two different types of users and an example of how the user is organized, in accordance with one embodiment. In this example, User 1 is an administrator of a vehicle login system over vehicles he or she owns. User 1 has the ability to add or remove logins, roles and vehicles to his login system. Since User 1 is an administrator, he or she can add more logins and or roles to the system to allow a family member to have access to the family vehicles for instance. In this case, a family member "User 2" is shown. The administrator has given this family member a login named User 2 and has granted two roles to User 2. User 1 may only want User 2 to have access to a certain vehicle and to certain roles only. User 1 may only want User 2 to have access to the vehicle for the purposes of traveling between school and home. In this case User 1 has created a role that is applied to User 2, which only allows the vehicle to travel within certain restrictions and geographical locations.

In this example, User 2 does not have the ability to alter his or her login, role or vehicle since they do not have administrator access. However, User 1 can make changes on behalf of User 2. The full range of settings over a vehicle that applies to a given role or login is a super set of settings. User 2 may have access to a subset of settings that User 1 allows changes to by User 2.

Figure 3:
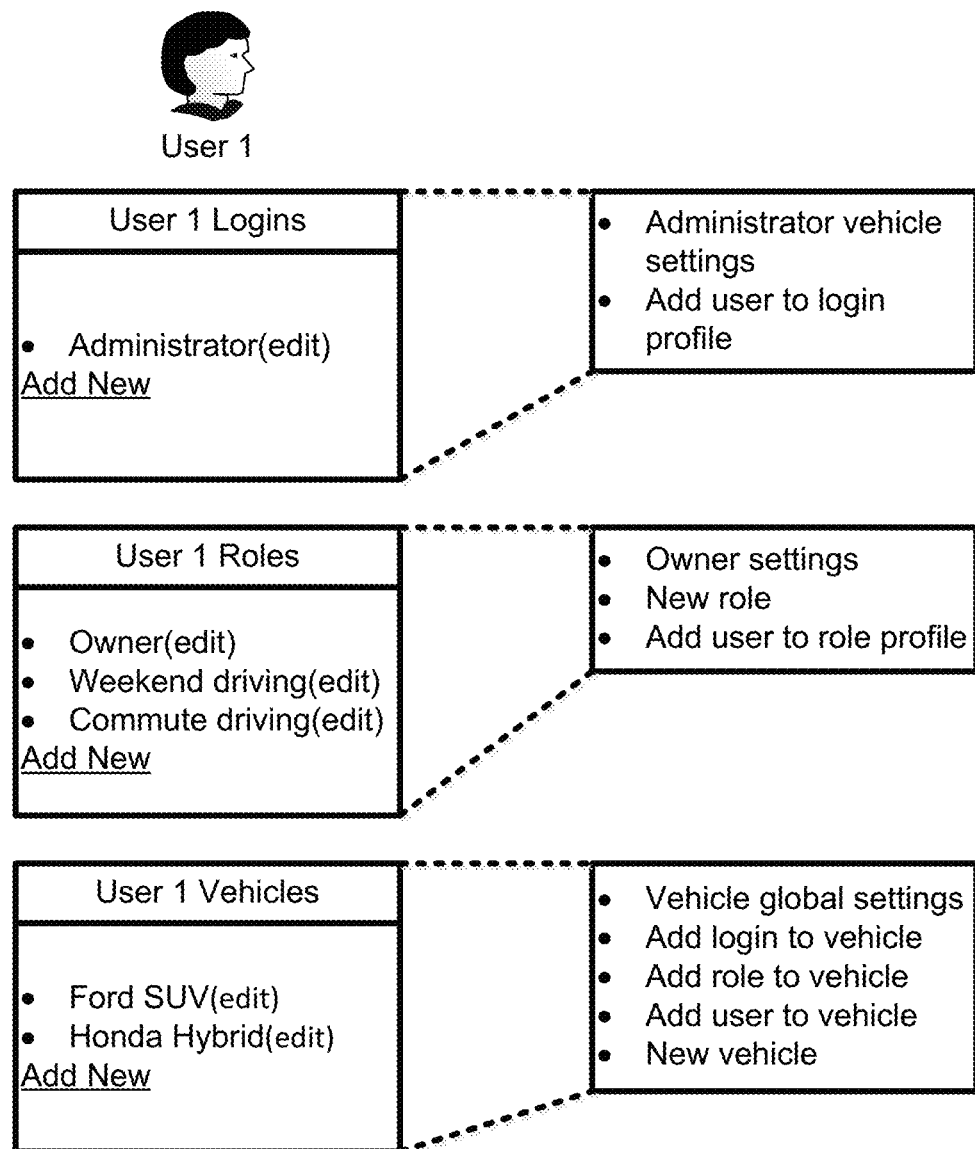

FIG. 3 shows a graphical representation of an example set of settings an administrator such as User 1 may have to administer logins, roles, and vehicles. FIG. 3 further expands the depth of settings, including but not limited to, vehicle administration, adding or deleting users and roles, vehicle global settings that apply to all roles and logins, adding or deleting vehicles among other settings.

FIG. 4 shows one sample of many potential configuration settings for a given vehicle. In this case, User 2 has a login created for him or her named "CHILD". This login contains a set of settings that may or may not be configurable by User 2 since User 2 is not an administrator, only a subset of settings are open to him or her to alter. The drawing illustrates the settings that are user editable and admin only or restricted. The left column lists the type of settings corresponding on the same row on the right column. These settings are examples and may be altered, added to, or subtracted from in different embodiments. For instance, fuel use settings allow an admin in this case to choose what type of fuel the user login CHILD is allowed to use while logged into the vehicle. Similarly, location based settings allows an administrator to draw out a map of the area the user login CHILD is allowed to travel within while logged into the vehicle.

FIG. 5 describes extended settings from FIG. 4. This figure describes additional vehicle settings that are configurable by the user with the login "CHILD" and those that are only configurable by User one being the Administrator. FIG. 5 also describes a subset of settings a user login CHILD in this case is allowed to change. For example, the user login CHILD is allowed to select his or her radio stations, streaming services, and Internet access settings for a unified experience in any vehicle they log into using this log in. Similarly, the user login CHILD can access driving modes and set the vehicle mode to sport for instance. It should be understood that the example "CHILD" profile is just that, an example, and any type of user profile may be set with the defined privileges and/or restrictions.

Figure 6:
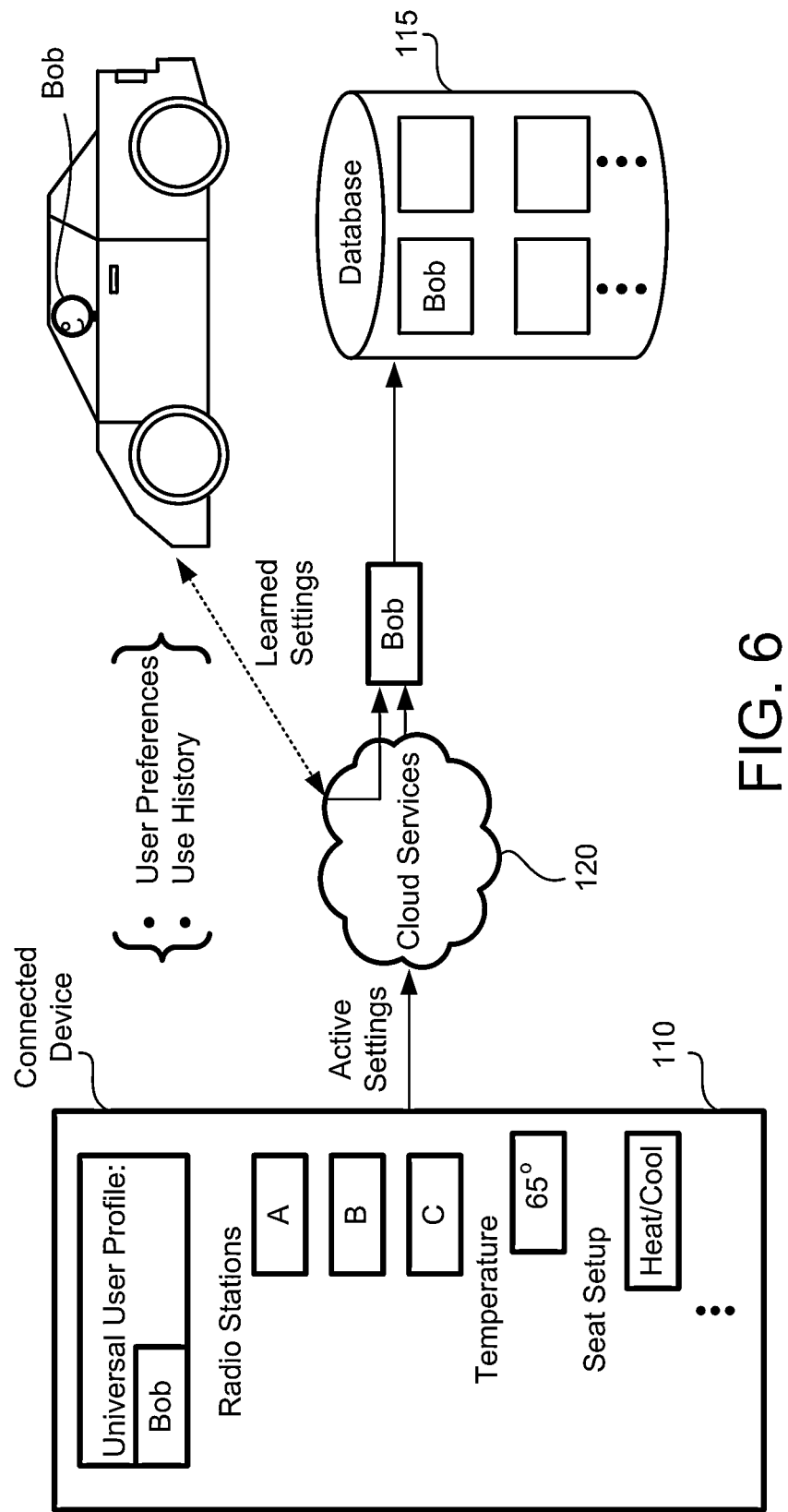
FIGS. 6-9B show example pairing of a vehicle to a user profile, and examples of a shared vehicle transfers of profiles for limited use of the profiles on the shared vehicles, in accordance with one embodiment.

FIG. 6 illustrates an example of utilizing a profile of the user, to access cloud services 120, and a database 115, in accordance with one embodiment of the present invention. In this example, a user may utilize a connected device 110 to access cloud services 120. Using the connected device 110, the user, in this case Bob, is accessing his universal profile settings. His profile settings may include settings that have been selected before in earlier sessions, or default settings implemented by a vehicle manufacturer, or another user such as an administrator. In the example, the user may access particular active settings managed by cloud services 120 which can cause Bob's profile in database 115 to be updated.

In one embodiment, Bob's profile can include specific settings, preferences, use history, and learned settings from earlier uses of one or more vehicles. The profile settings defined by Bob, are then transferred by cloud services 122 one or more vehicles utilized by Bob. For example, if the user wishes to utilize his regular everyday car, the profile settings may already be stored on the vehicle. If the user wishes to utilize a different vehicle, such as a friend's vehicle, a rented vehicle, a shared vehicle, a temporary vehicle, a loaner vehicle, a test drive vehicle, a company vehicle, etc., the user's profiles can also be transferred to that vehicle.

The user profiles can include standard settings that may be set at the various vehicles, or custom settings that can be selected for the user based on learned settings over time by use of various vehicles. In one embodiment, the user profiles are continuously updated and store to a database 115, which is accessible by cloud services 120. Database 115 may include data storage, such as cloud storage, data center databases, distributed databases, local storage on vehicles, network storage, and the like.

Figure 7:
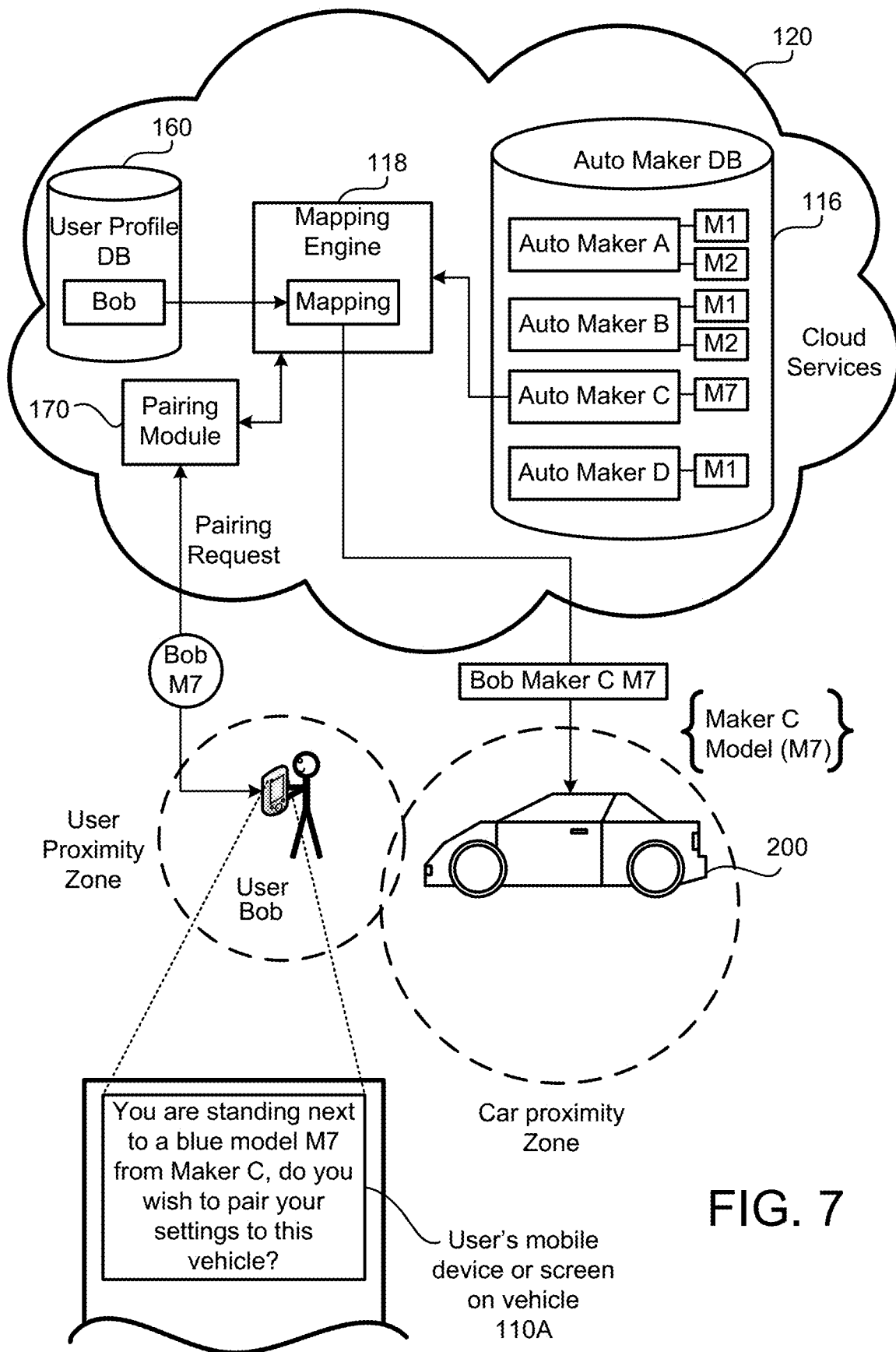

FIG. 7 illustrates an example of a user (Bob) that may wish to utilize a car 200, in accordance with one embodiment of the present invention. For example, the car 200 may be a shared vehicle, such as those commonly shared in urban cities. Shared vehicles are those that belong to a company and where the company provides accounts to users to access the vehicles for specific trips, specific times, periods of time, etc. Users that share those vehicles typically park the vehicles at different locations throughout an urban city. Users wishing to find a vehicle to use can access an application or website having access to an Internet connected application to find the vehicle closest to the particular user.

Once the user has located a proximate vehicle, such as car 200, the user may approach the vehicle so as to utilize the vehicle 200. In one embodiment, when the user approaches the vehicle, and comes in close proximity to the vehicle as detected by the geo-location of the users mobile device, a pairing request can be detected. The pairing request may be triggered once the proximity zone of the car 200 and the proximity zone of the user substantially or partially overlap. The proximity zones may overlap when the user comes in close proximity to the vehicle, such as within a few feet, within a mile, or the user has touched or bumped the vehicle.

The pairing request may be automatically sent by the users device to cloud services 120. The pairing request can include sending the model of the vehicle 200 that may have been obtained by the users mobile device from the vehicle 200 directly. In the illustrated example, the pairing request by the users mobile device can include identification of the vehicle that the user has come in close proximity to. A pairing module 170, can then communicate with a mapping engine 118 that determines information associated with car 200.

An automaker database 116 can include data regarding a plurality of vehicles, including standard user interfaces, configuration interfaces, and other information necessary to provide user Bob with a custom interface for vehicle 200.

The mapping engine 118, in this example includes a map or that communicates with the automakers database to identify the settings, applications, APIs, or modules that allow integration of Bob's user profile from the user profiles database 160 so that Bob's profile can be sent to car 200. In the illustrated example, the mapping engine, the of the mapper, will obtain Bob's profile 160 for cloud services and obtain vehicle information for the user interfaces of the vehicle desired for use by the user.

The mapping engine 118 will transfer Bob's profile to vehicle 200. At this point, the user, Bob, can be provided with an interface on a mobile device to allow access to the vehicle. The user interface can include a plurality of screens with instructions, check information, cost information, billing information, etc. As illustrated in FIG. 7, the users mobile device can provide various notifications, such as identifying to the user that the user standing next to a blue model M7 from maker C. The user interface can ask Bob if Bob wishes to pair settings to the specific vehicle 200. If Bob desires to actually utilize the shared vehicle 200, the pairing request may be initiated as mentioned above.

Figure 8:
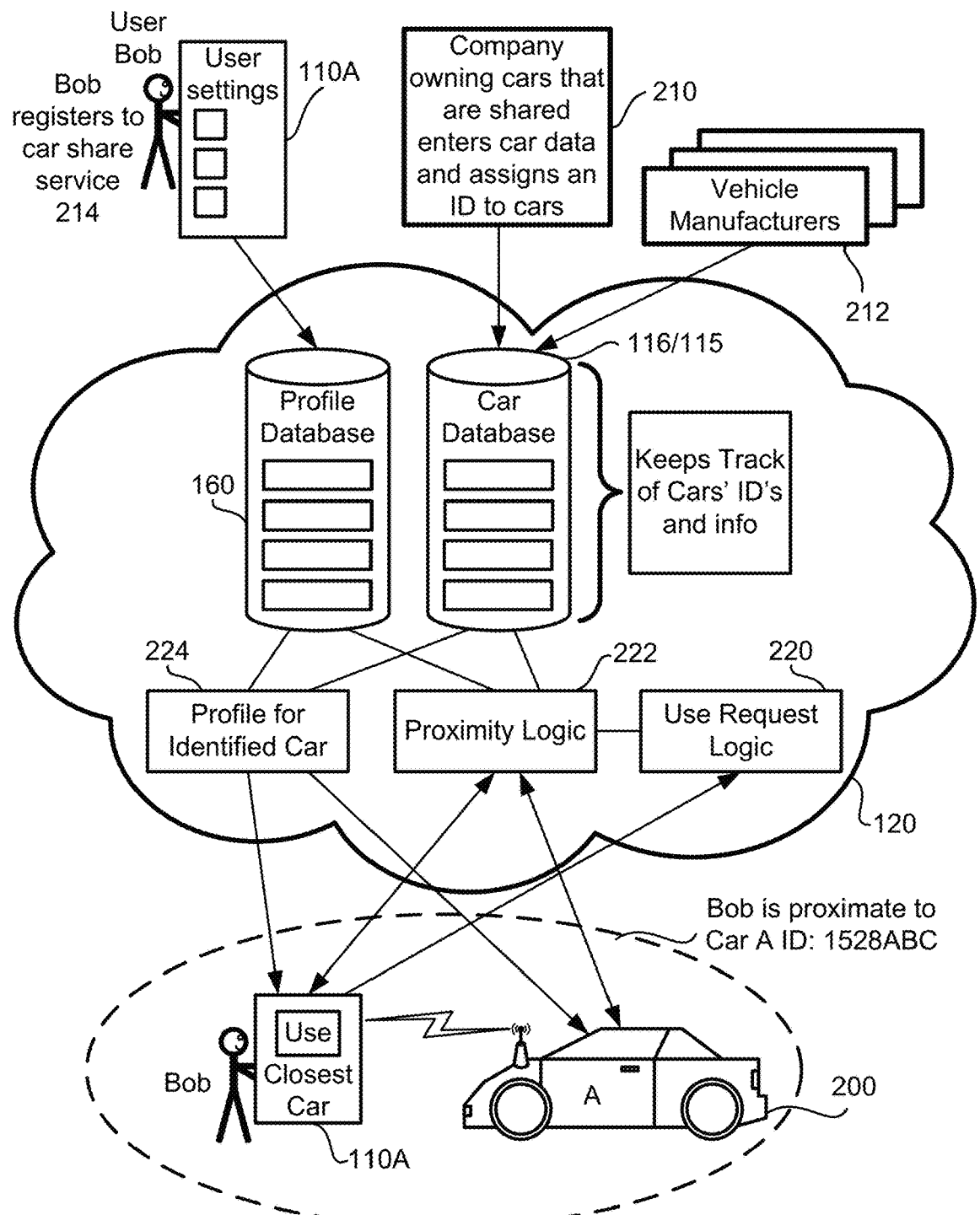

FIG. 8 illustrates another embodiment where the user Bob has utilized his mobile device 100a to define or access a plurality of settings. In one embodiment, the user may register 214 with a car sharing service, such as via a user interface or application having access to the Internet and the company providing the service. Cloud services 120 can then provide access to the profile database 160 where Bob's profile may be stored. The profile 160 may be accessible to 3rd parties, such as car sharing service.

Also shown in cloud services 120 is the car database 116/115. The car database can then be provided with information from the car sharing company 210 that identifies the cars that the company owns and that are shared with the service. The car data including assigned IDs to the vehicles and cars can be stored in the car database 116/115. Additional data can be supplemented from vehicle manufacturers 212. The cloud services 120, in accordance with one embodiment, can include logic for profile identification for vehicles 224, logic for proximity detection 222, user request logic 220, and other managing logic for receiving request from users, managing databases from a car sharing database, managing data from vehicle manufacturers, and receiving request to manage profiles and access vehicles.

As illustrated, when the user Bob approaches the vehicle 200, the Bob's mobile device 110*a* can identify the closest car, which may be car A. In this example, Bob is identified to be proximate to the car having an ID 1528ABC. In one embodiment, when the user comes in proximity to the car 200, the car can beep or light up when enabled, it can open the doors to allow the user to access the vehicle when the logic has paired the user to the vehicle, the profile of the user can be transferred to the vehicle, the use of the vehicle is managed by the user's online account (storing historical use data and any billing information), automatic payment for use can be made from predefined payment arrangements stored in the profile, and use of the vehicle can be restricted to predefined rules, based on the profile. Accordingly, the profile database 160 can include both profiles of the user, such as user settings, as well as profile restrictions that may be set by the car sharing service.

Figure 9A:
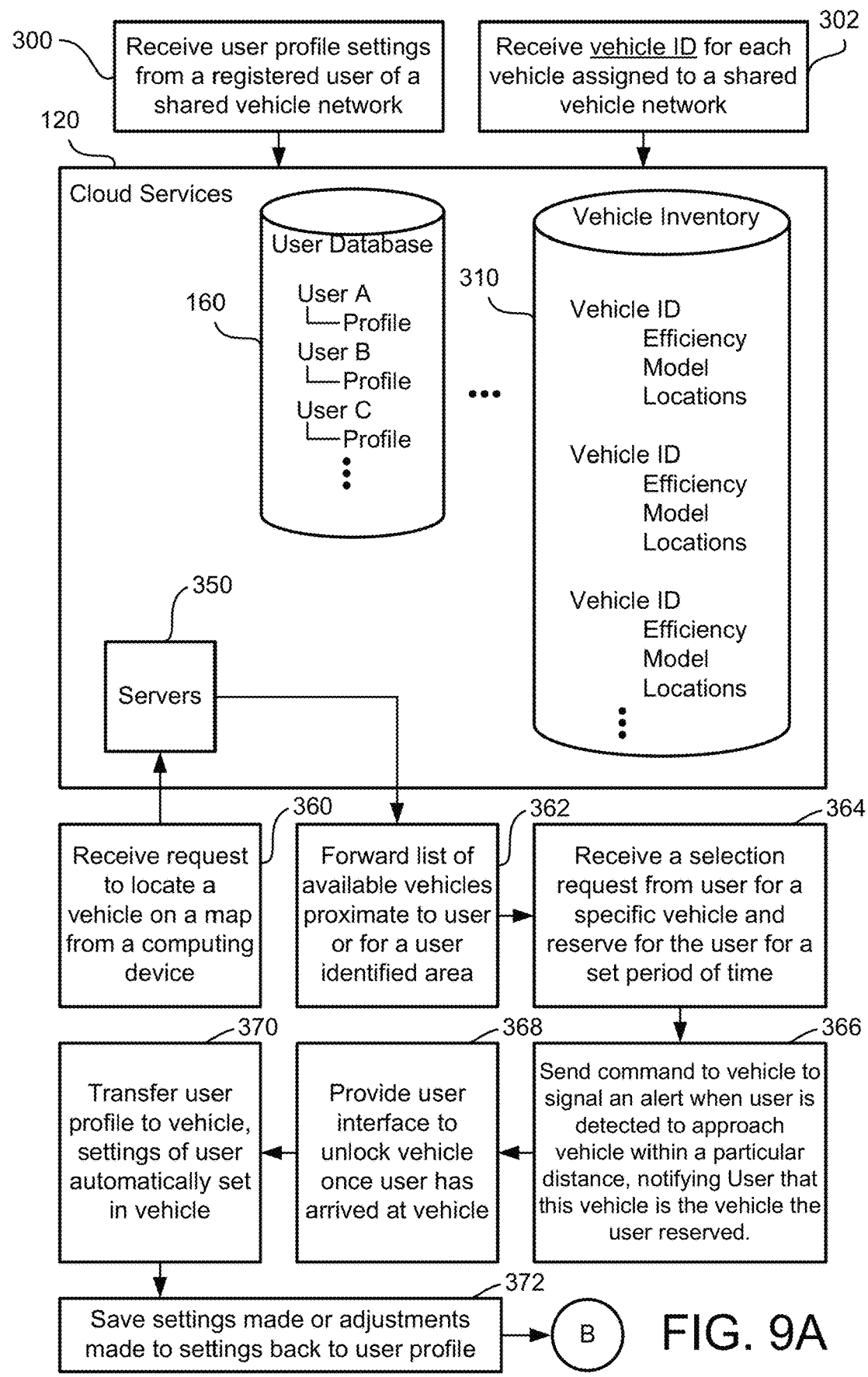
Figure 9B:
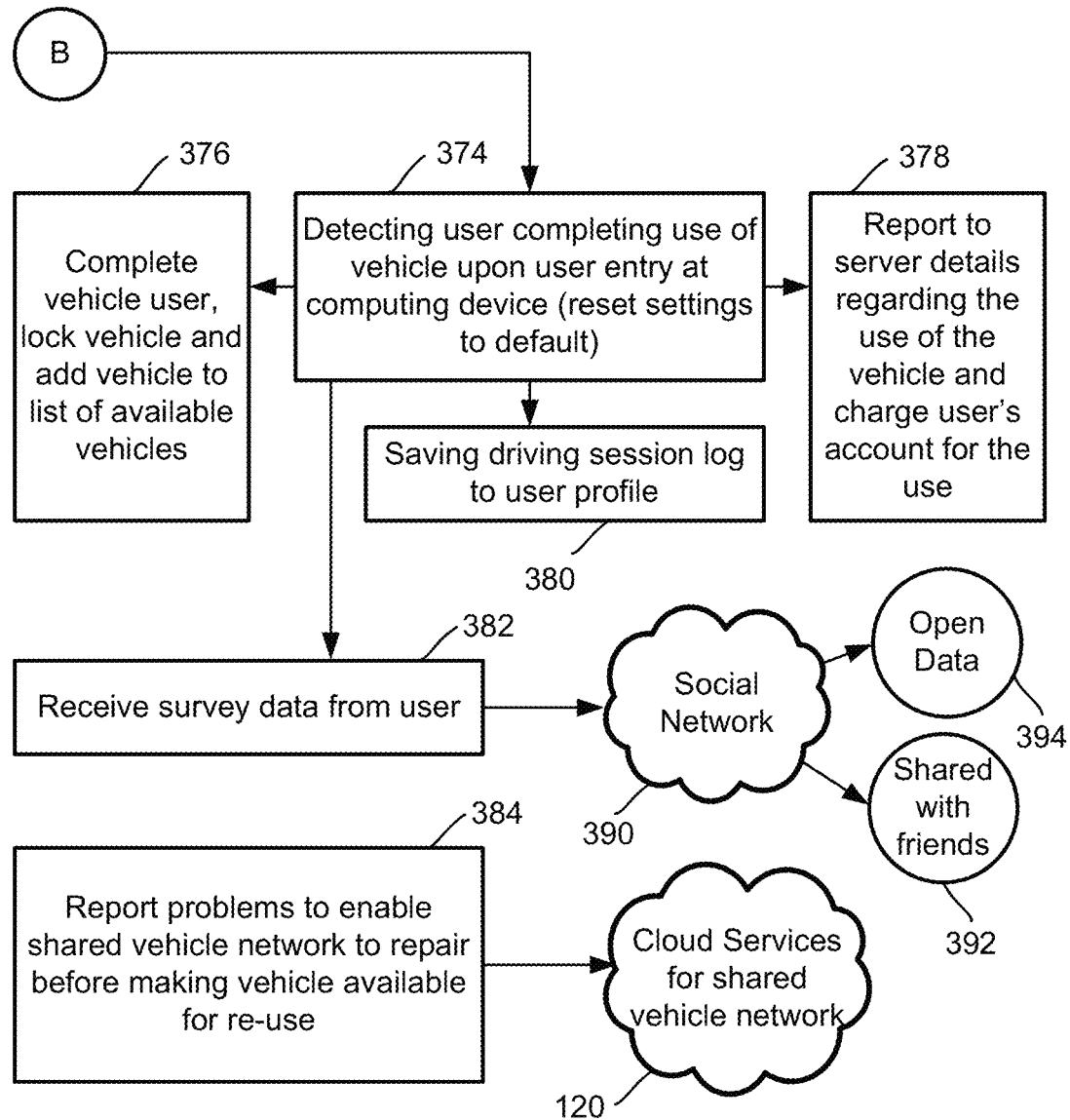

FIG. 9A shows one example process for utilizing user profile settings from a registered user and utilizing settings of a shared vehicle network, in accordance with one embodiment of the present invention. In this illustration, operation 300 receives the user profile settings from a registered user of a shared vehicle network. The registered users profile can be obtained from a cloud services profile, such as the profile used for a number of vehicles, which may be in or outside of the shared vehicle network.

In another embodiment, the profile may be the profile set by the shared vehicle network, based on the service contract entered by the user. In operation 302, vehicle IDs for each vehicle assigned to a shared vehicle network are received by cloud services 120. Cloud services 120 will therefore maintain a user database 160 with a plurality of user profiles.

Cloud services can also maintain a vehicle inventory database 310 for the shared vehicle network. Servers 350, which operate cloud services 120, and therefore managing access database 160 and 310, as well as provide logic for providing access to vehicles, unlocking vehicles, and transferring user profiles to specific vehicles. In operation 360, the servers 350 may receive a request to locate a vehicle on a map from a computing device. The request may be provided with reference to the user's current location, using GPS or the like. The request is then processed by servers 350, and servers 350 communicate and forward a list of available vehicles proximate to the user or for the users identified area in operation 362. In operation 364, a selection request is received from the user for a specific vehicle and a reservation is made for the use of the vehicle for a set period of time.

In operation 366, a command is sent to the vehicle the signal alert when the user is detected to approach the vehicle within a particular distance, notifying the user that the vehicle is the vehicle that the user reserved. This provides for a method of allowing the user to easily identify the vehicle that the user reserved. For example, if the user is instructed to go to a specific parking lot to identify the vehicle that was reserved, the user would have a difficult time identifying which vehicle it is that the user reserved. However, by allowing cloud services to signal to the vehicle to sound the alarm, turn on a light, beep, for make any other identifying gesture, the user can easily identify the vehicle in the parking lot.

In operation 368, a user interface is provided to the user's mobile device that will provide a notification to the user indicating that the person/user has arrived at the vehicle. In operation 370, the users profile is transferred to the vehicle. The transfer of the profile will allow the settings of the user to automatically be set in the vehicle. The settings can include, for example, temperature, radio settings, seat settings, meter settings, air settings, etc.

In operation 372, the settings that are made by the user when in the vehicle or adjustment settings can be sent back to the user profile. Thus, when the user offering the vehicle and making changes to his or her profile, those changes can also be communicated back to the profile database in cloud services 120. This provides for a continuous feedback loop over time, to allow the users profile settings to be managed and maintained current to the users best liked preferences. The operation then proceeds to B in FIG. 9B.

In operation 374, it is detected that the user has completed use of the vehicle upon some user entry at a computing device. The computing device may be computing device of the vehicle, or a mobile device. The entry can be, for example, the user logging out of the vehicle indicating that the user has terminated use of the vehicle. At logout, the vehicle's original profile settings will then be returned, and the users custom profile settings will be terminated.

In operation 378, a report sent back to the server regarding the use of the vehicle and the charges to the users account for the use. In one embodiment, the use reporting can occur continuously while the user is driving vehicle. In operation 380, the driver's session log can be saved user profile, keeping a history of the user's travels. In operation 382, survey data can be requested of the user regarding the vehicle use. Because the user was utilizing a shared vehicle, feedback from the user can be helpful to potential future users that may want to rent or utilize vehicles from the same company.

The user may be provided with options to publish likes and dislikes or commentary to a social network 390. Ratings can also be transferred to rating companies, such as those that allow Internet users to view user comments, reviews, complaints, etc. The social network 390 can allow the data to be open data 394, or data that is shared with friends 392. In operation 384, problems with shared vehicle can be reported to the vehicle network to allow repairs before making the vehicle available for reuse. Cloud services for the shared vehicle network can then be updated in cloud services 120. For example, if the vehicle has been identified as having some mechanical malfunction, the cloud services can update that vehicle as being out of service, so that discovery of that vehicle does not cause users to access that specific vehicle that may be out of commission.

Figure 10:
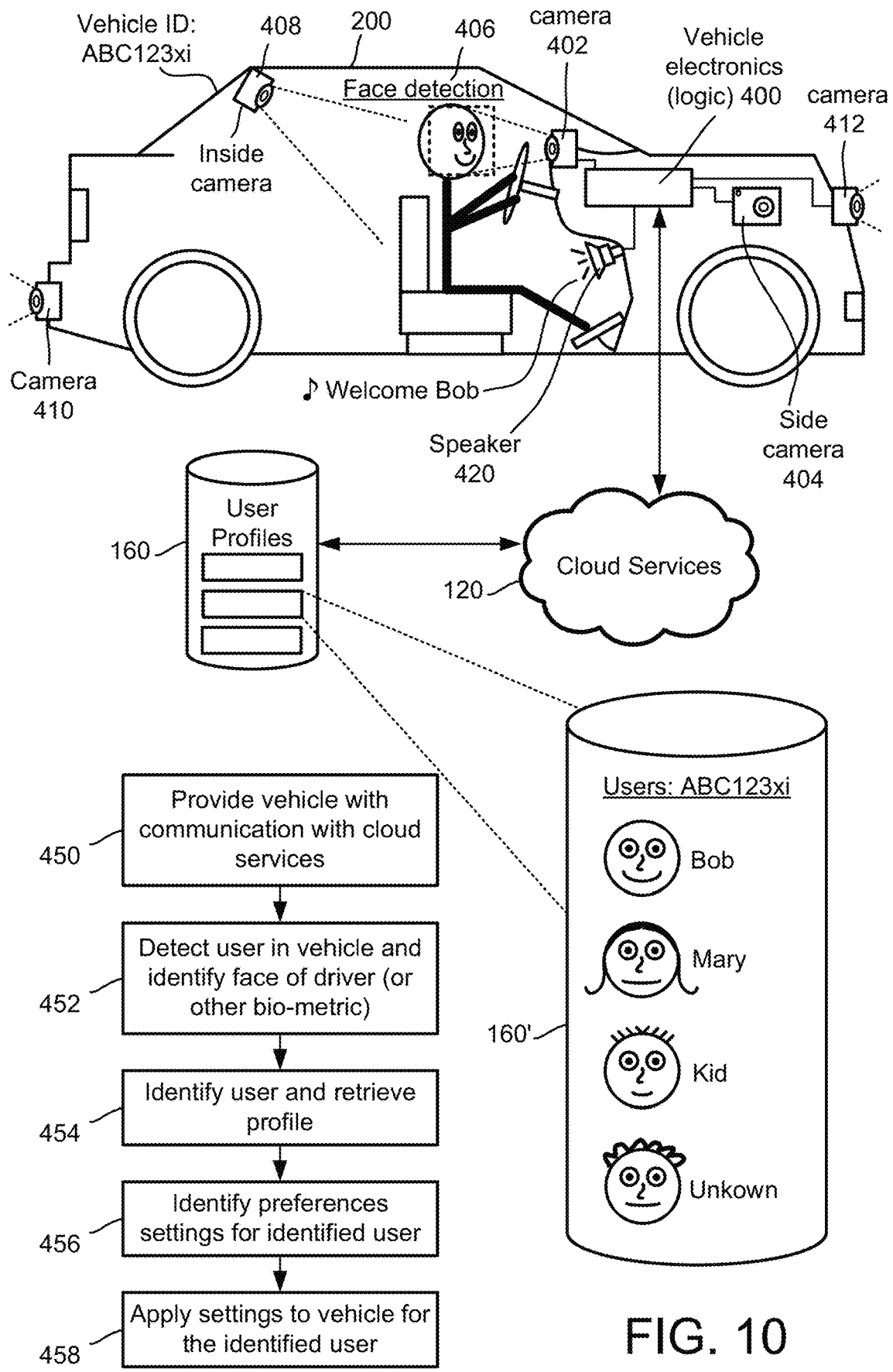
FIG. 10 illustrates validation method for enabling a profile on a vehicle and biometric validation, in accordance with one embodiment.

FIG. 10 illustrates a user (Bob) entering the vehicle, such as a shared vehicle 200, in accordance with one embodiment of the present invention. In this example, the user has been identified by the vehicle, such as using a camera 402. The camera 402 may use face detection 406 to automatically identify the user, and set the users preferences and settings for the vehicle automatically. In some embodiments, this allows verification that the user driving the vehicle 200, from the shared network, is the driver that unlocked the vehicle from a remote location (such as a mobile device). In this example, the vehicle 200 may also include a plurality of cameras, such as cameras 404, 408, 410, 412, 402, etc. Any one of these cameras can be accessed from a remote location, if the user's profile provides access, or the privacy setting allows such access.

These cameras can be used to detect and monitor the exterior portions of the vehicle as the vehicle drives around, as well as interior portions of the vehicle. These cameras can be used by the vehicle sharing company to monitor the status of the vehicle, and the location where the vehicle is parked. In one embodiment, the user who has rented the vehicle can set a privacy setting to disable certain cameras. In one embodiment, a speaker 420 can be activated to allow the vehicle to speak and communicate with the user. Vehicle electronics and logic 400 can be in communication with cloud services 120.

Cloud services 120 can also be in communication with user profiles 160. In one embodiment, the user profiles 160 can also include specific profiles for registered users. In one embodiment, the registered users can include a family of users. A specific family can have a number of drivers or users that have been registered with a service. For example, the database can include users ABC123xi (such code is only an example, and any form of ID/code can be used), and the users can include a particular family or group of people. The group of people can also be a group associate with a company, a sharing service, a group established for a particular event, or other types of groupings. The vehicles can therefore be monitored for use by the specific users in a particular family or group. In one embodiment, the particular family and groups can be associated with their own profile history settings, which include data from their previous uses.

In one embodiment, FIG. 10 illustrates a process utilize to communicate between vehicles, users, and cloud services. In operation 450, a vehicle with communications is provided with cloud services. The cloud services will be in account, software, or interface that allows communication with cloud services 120. In operation 452, the user in the vehicle may be detected, and the face of the driver or other biometric data can be used to identify the specific user sitting in the car. The detection of the user can, in one embodiment be enabled or restricted based on privacy settings desired by the user.

In operation 454, the user may be identified and the users profile can be automatically retrieved from cloud services and the user profile 160. The preferences settings for the user can be identified from the database in operation 456, and the settings can be applied in operation 458. The settings can be applied to the vehicle for the identified user. When the user terminates use of the vehicle, the settings can't be deactivated, or return to a neutral setting.

FIG. 11 illustrates an example of particular types of settings that can be set, or recorded, or accessed, in accordance one embodiment of the present invention. In one example, cameras 480 can be provided as options for access by the user. The cameras can be accessed to view historical uses by the user, or can be access to view current and live video of the vehicle. For example, if the user has rented a vehicle for a period of time, and parked it in a specific location, the user can monitor the vehicle from a remote device connected to the Internet.

Record settings 482 can also be set by the user, the vehicle provider, or cloud services. A plurality of recording options and access can be set or adjusted by the user from a remote location. Remote access 484 also provides the user with options to control specific features of the vehicle. The control the vehicle can be set for a period of time when the users profile is associated with the vehicle.

In a car sharing environment, the remote access of the vehicle can be enabled during the period of time when the user is assigned or the users account is assigned to that vehicle. In examples where the user owns the vehicle or is more tightly connected to the vehicle, the remote access can be provided by entering access control information, credentials, passwords, usernames, and biometric data or combinations of one or more.

In still other embodiments, user interfaces are provided to provision customized data regarding available charge station locations. In one embodiment, users having other devices, such as smartphones or portable electronics can obtain data, which can be shared with other user interfaces. The sharing can be by way of a sync operation, that can be automatic when the user enters the vehicle or on demand by the user. In other embodiments, the application or program running on the user portable electronic device can continue to execute the processing, while allowing the display of the vehicle to show all activity on the display. For example, if the vehicle electronics are not capable for processing an application or access a cloud service, the portable device can act as the agent for the vehicle electronics. In one embodiment, the display and I/O of the EV simply acts as a passive interface, while the processing or accessing to cloud processing is done by the user's portable electronics (e.g., smartphone or the like).

In some embodiments, the user's portable device is already programmed with access codes, passwords, etc., so the user may wish to use the portable electronics instead of having to program the vehicle. This is important when users share a vehicle. If users share a vehicle, one user may have the electronics programmed to their likes or dislikes. By allowing programming, data settings, etc., to be shared or synced (e.g., temporarily or not), users can more easily share vehicles, while keeping the settings that the user is used to having.

In still another embodiment, allowing the user's smart phone or portable electronics to sync with an EV, users of rental cars can more easily step into cars with pre-programmed settings. Thus, users that temporarily use vehicles need not worry about programming the car's settings upon entering the car, but simply sync with the vehicle to allow the vehicle to run display, IO and services based on the custom settings of the user's portable device.

This processing that allows users to sync a vehicle with a user's custom settings stored in the user's portable device can also have application to car sharing environments. In big cities, companies allow users to locate vehicles in a proximity to their current location, and simply enter the vehicle using their membership code. In addition to providing users with access to the vehicle, the user/driver's settings can be synced to the vehicle. This can include settings of the seats, the mirrors, the temperature, the radio stations, and the Internet apps to display on the car's display, etc. Custom information, such as prior uses of the car, cost for driving, etc., can be displayed on the car's display, via the sync data from the user's portable device. The sync data can be obtained at any time, such as by using the user's portable Internet link, etc.

In one embodiment, a user's EV or non-EV vehicle can be in communication with cloud services, and the cloud services can be interfaced with data from various entities that provide power for the grid, provide charging units (CUs), provide discounts to charge at particular CUs, geo location services, mapping services, live traffic data, etc. The user of the EV can communicate with the vehicles electronics via a display unit and its associated electronics, can provide input via touch or voice, can request data regarding routs to local charge stations, cost estimates at the various charge locations, how crowded the charge stations are at the various locations, etc.

The cloud services 120 are also accessible via a computer that has access to the Internet, a smart device (e.g., smart phone, tablet, etc.), etc. Thus, data can be acquired from various sources and data can be consumed by various sources. The data that is acquired, shared or accessed can be launched on the user's device and then transferred to share in real-time with the display and/or electronics of the vehicle. Thus, a unified access display can be customized to the user, regardless of the vehicle that the user chooses to drive. This is in contrast to current models that customize settings for one vehicle owner or owners.

In one embodiment, the user's settings are seamlessly transferred to the vehicle the user chooses to drive. This is especially useful for cases where a user drives many cars, but wishes to keep his settings constant. Settings can include cloud services, or local settings such as seat positions for the size of the user, mirror positions, radio stations, weather stations, history of routs taken, favorite locations to visit, etc. The application that allows syncing of a user's settings on a portable device to the vehicle electronics is especially useful for car sharing applications, which is common in large cities and may expand in the future. As car sharing increases, it is most useful to allow a user to save his/her settings in their mobile device, instead of relying on the fixed settings of the vehicle. In another embodiment, it is also possible for a user to type in their universal login code (e.g., user name/password) into the car display, and all of the user's settings are transferred to the vehicle while the user is driving the EV. Once the user stops using the EV, the car can go back to the normal mode for another user to login. The data regarding the user's settings would, in this embodiment, be saved in the cloud.

In one embodiment, user interfaces of a mobile device can share data with the vehicle's display and native apps. App unification allows EV system to display APPS on the user's smartphone device in an opt-in PAIR mode. In one embodiment, this allows one person to enter another's EV, share apps on the EV display while in the EV, and when the person leaves the EV, the Apps de-pair. This auto-sync facilitates sharing of data and also allows users to unify their settings across any number of vehicles the user may drive.

In one embodiment, the synchronization will enable users to universally transfer settings from portable devices to electronics of a vehicle. In some embodiments, the vehicle that the user wishes to drive is not his vehicle. For instance, the vehicle may be a friend's vehicle, a rented vehicle or a shared vehicle. If the user has programmed settings in his or her device, the settings that are useful for the vehicle will be transferred to the vehicle. Settings can include travel speed restrictions, car seat settings, mirror settings, remote access to home controls (e.g., lighting, garage doors, etc.), radio settings, satellite radio settings, internet settings, etc. In some cases, only some settings are directly transferrable. In other embodiments, a database can be accessed to find a translation metric. The translation metric can include mapping tables that allow for settings to be transferred between functions of one vehicle to other vehicles. In one embodiment, vehicle makers can upload their translation metric for each model and the mapping tables can be used to provide the sync operation.

Figure 12:
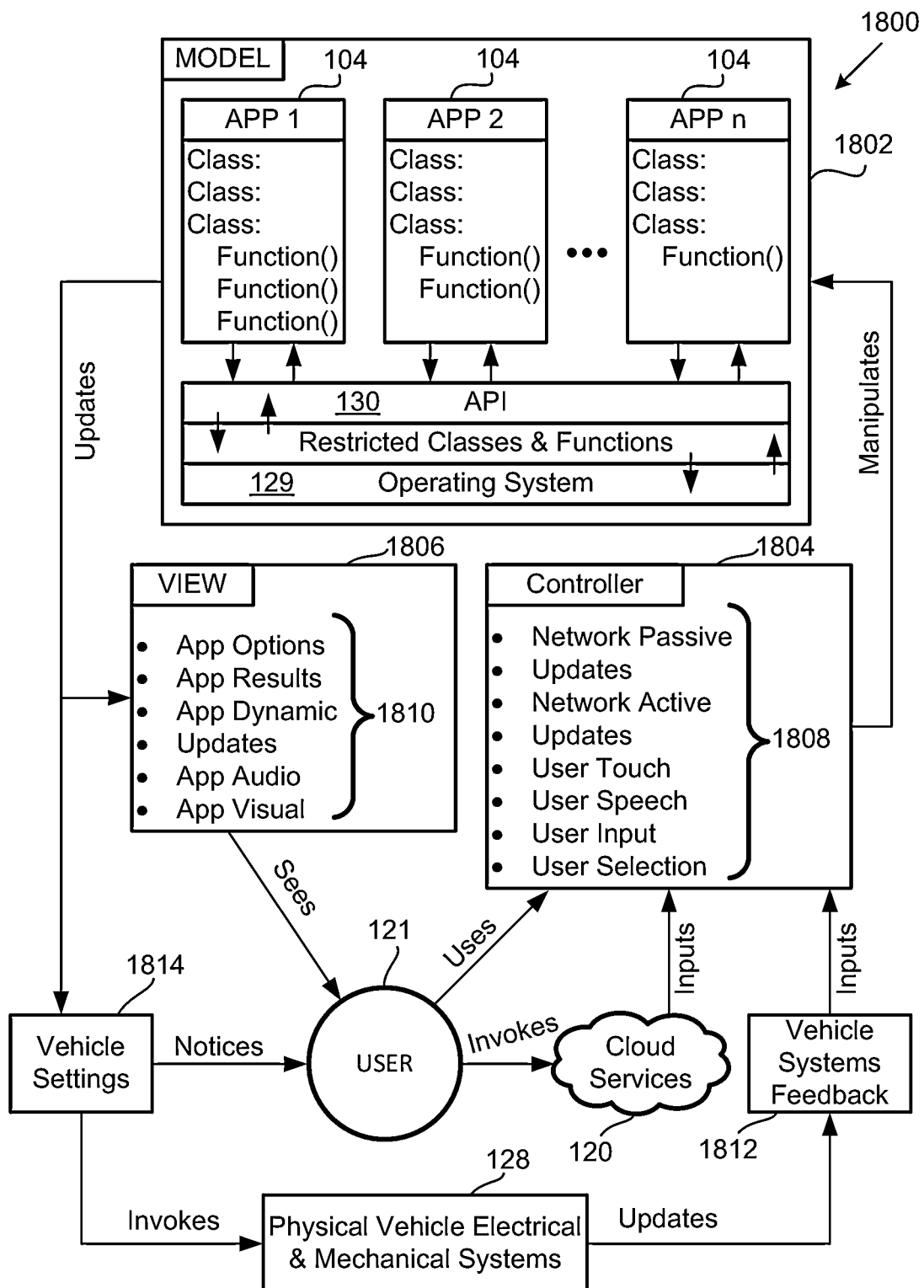
FIG. 12 describes a system in which a user interacts with a model view controller software environment useful for processing APPS using APIs on vehicles with vehicle operating systems capable of processing computer code, in accordance with one embodiment.

FIG. 12 describes a system in which a user interacts with a model view controller software environment 1800 useful for processing APPS using APIs 130 on vehicles with vehicle operating systems 129 capable of processing computer code. The APPS can execute profile retrieval, updates, and sync operations. The model view controller paradigm 1800 shows basic interaction, control, processing, and updating of data useful for manipulating and viewing resulting actions by to vehicle running an APP in such a system. Such a system useful for running APPS on vehicle operating systems will accept inputs by a user 121, cloud services 120 via data streams, vehicle systems feedback and data streams 1812 used by a controller 1804 that may constantly poll electrical, capacitive and physical sensors, and input streams to detect if interactions 1808 such as network passive updates, network active updates, user touch, user speech, user input, user selection among others has been triggered.

Each input 1804 will then trigger manipulation of the system's model 1802 portion of the APP software paradigm thus invoking stored routines within APPS 104 which then in turn interact with the vehicle's API system 130 built upon the vehicle's operating system 129. Depending on the app presented to the user 121, the input may trigger stored routines or functions on APP software or operating system level restricted stored routines or functions.

After the processing of stored procedure code is manipulated with arguments provided by the controller 1804 inputs, visual and or sensory results are presented to the user in the view 1806 portion of the model view controller paradigm. These sensory outputs, data streams, electrical signals may all be translated as additional options, results, dynamic updating, audio or visual graphical user interface changes 1810 on any of the user's connected display devices. The user will notice these results visually or audibly but may also feel or detect changes in the vehicle's mechanical systems. Updates from the model 1802 may also be used to toggle vehicle settings 1814 which in turn may invoke changes in the vehicle's physical, mechanical and electrical systems 128.

Finally, the system controller 1804 may receive additional updates from the vehicle systems affected or additional user 121, cloud services 120, vehicle systems feedback inputs 1812 to re-engage the user in a cyclical fashion. If no inputs are sensed, the system's controller will continue to poll its electrical and data I/O systems for input on a continuous basis.

The model view controller paradigm 1800 described is one example of the software input output lifecycle that may be used to invoke, manipulate, process, update portions of computer readable code such as APPS 104 using an intermediary API 130 to communicate with the vehicle's operating system 130. However, APPS 104 may be run on physically wired, wirelessly connected or remote devices having processing abilities to translate the computer readable code in APPS into actionable invocations on one or more vehicles in order to facilitate or utilize the vehicle's electrical and mechanical systems in prescribed or customizable fashions.

Figure 13A:
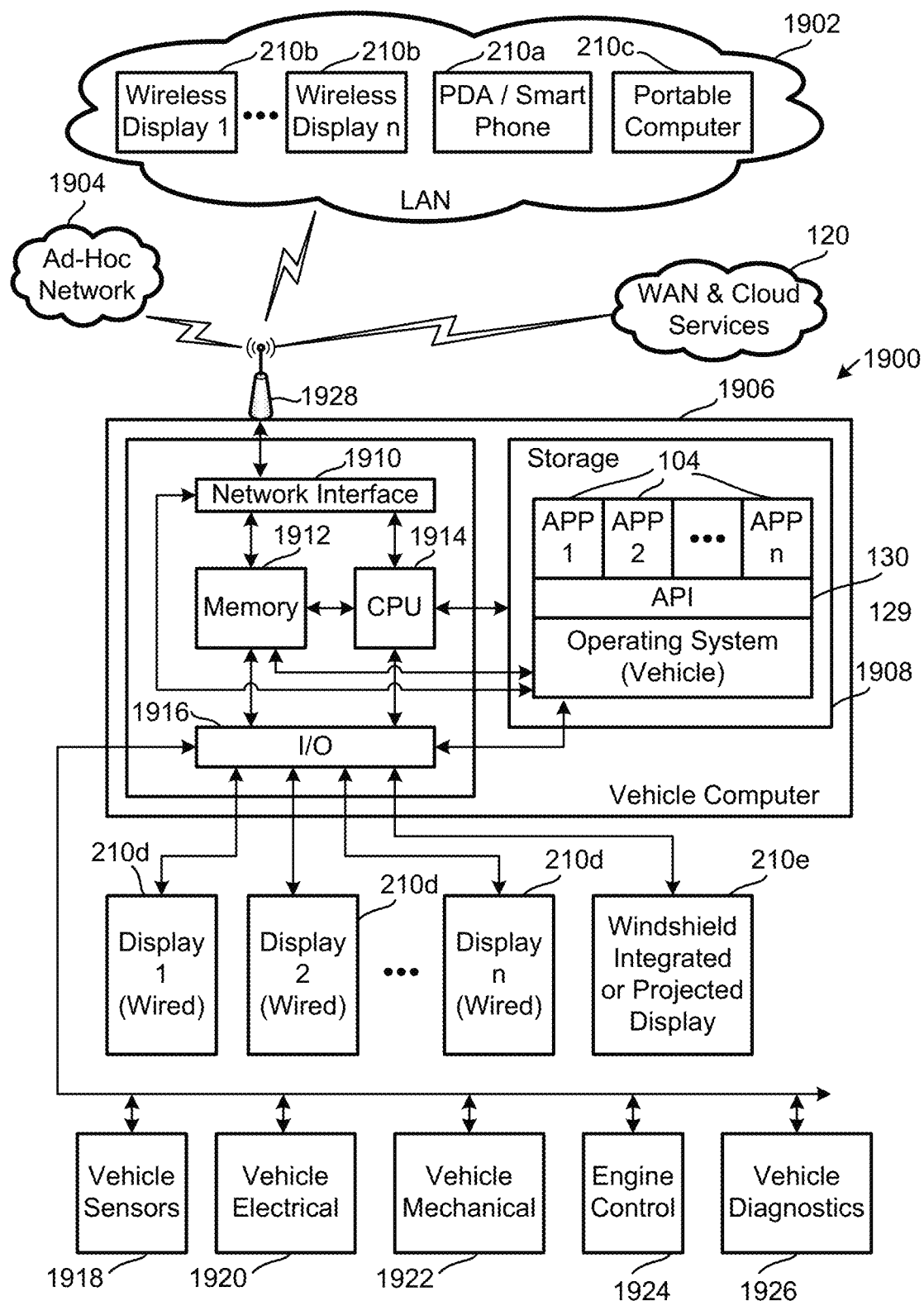
FIG. 13A describes how vehicle on board computer with input output system useful for accepting input, processing input and displaying results in conjunction with stored computer readable programs or functions in the forms of APPs may be structured, in accordance with one embodiment.

FIG. 13A describes how vehicle on board computer with input output system 1900 useful for accepting input, processing input and displaying results in conjunction with stored computer readable programs or functions in the forms of APPs 104 may be structured. Although system 1900 describes one way to provide vehicle on board computing power to run APPs 104, the arrangement of the vehicle computer 1906 may be altered or arranged in differing fashions with differing connection routing in order to achieve the same. In this example, vehicle on board computer 1906 may be comprised of components such as the network interface 1910, memory 1912, a central processing unit 1914, an input output buffer useful for streaming data 1916, storage 1908 having the ability to store computer data in long term or short term fashion useful for stored computer code procedures in the form of an operating system 129, intermediary stored procedure code in the form of APIs 130, stored subsets of computer code procedures APPs 104 interacting with API 130 as an intermediary to the operating system 129.

In this example, the vehicle computer 1906 has the ability to transmit, receive and process information using wired or wireless connections. One such wireless connection is provided by a wireless data sending and receiving antenna 1928 connected to a network interface 1910 useful for pairing with and communicating data with portable or stationary wireless devices which may or may not be part of a network 1902. Such wireless devices include but are not limited to wireless displays 210*b*, portable smart phones 210*a*, portable computers, 210*c* and even stationary objects, structures, buildings, toll bridges, other vehicles etc. The vehicle's network interface 1910 through antenna 1928 may also communicate with cloud services 120 to receive instructions from a remote location that invokes stored programs such as APPs 104 on the vehicle's computer.

The vehicle may also send and receive data wirelessly in order to establish a connection with a peer-to-peer ad-hoc network. Invocations may result in output data streams interpreted by wireless devices 210*b*, 210*a*, 210*c* as well as wired devices such as wired displays 210*d* or vehicle integrated display devices such as windshield heads up projected display or integrated glass displays 210*e*. All data streams generated by APPs 104 stored on the vehicle's computer may also be triggered by wired devices such as vehicle sensors 1918, vehicle electrical systems 1920, vehicle electrical systems 1922, engine control systems 1924, vehicle diagnostics systems 1926, user input as well as environmental input.

A user and or vehicle may find system 1900 useful in one example, where the user drives the vehicle past an electronic toll bridge where a fee is required to pass the toll bridge. The vehicle's computer will communicate wirelessly as it passes the stationary structure transmitting and receiving information with it as it drives by. The user's vehicle may have an APP 104 installed on the vehicle computer 1906 that can process the input using the computer's wireless antenna 1928, network interface 1910, input output system, 1916 automatically responding to the toll bridge with payment information. Once the payment is received and processed, the APP 104 receives information from the stationary wireless toll taking device which is then stored either locally on the vehicle's storage 1908 or remotely using cloud services 120. The results of the transaction are then sent via data stream from the compute code running on the APP 104 to a display device(s) where the user can visually confirm that the toll was paid, accepted and show the user's remaining balance all through the GUI displayed for APP 104.

FIG. 13B describes one example of how stored data and function declarations may be compiled to provide intermediary access to a vehicle's computer controlling vehicle systems 1950. Such routines, data and functions may be arranged in such a way that limited access is given to third party code on APPs 104 to manipulate certain unrestricted operating system functions and vehicle systems. Such a method of providing the intermediary allowed stored function set to third party code can be referred to as an API 130.

In this example of an API 130, computer readable code is arranged in such a fashion that the type of API is described and in this case, an API that allows third party control of the vehicle's HAVC system is declared. A declaration may be useful for reserving the vehicle's computer long term and short-term memory in order to run stored procedures. The shown declaration 1954 describes an example set of data that may reference memory locations and their contents. The contents of these memory locations may be modified by stored procedures 1956 or functions.

This HVAC API 130 has the ability to store data relating to the vehicle's temperature, status, target temperature, split zone temperate, data from electrical and mechanical sensors, calendar dates, and error information among others. Invocable functions 1956 are the methods by which a third party APP 104 may manipulate data 1954 on board a computer. Free access is not given to the restricted data on a vehicle's computer, thus a structured method or methods are described for user by third party APP developers.

These functions 1956 that may or may not take arguments in order to execute may include functions in the example HVAC API that update temperatures for both the left and right or given zones of the vehicle, toggle are conditioning, allow visual skins on the APP GUI, manipulate schedules and displays etc. The HVAC API 130 described is one example of how one API can control one vehicle system. There may be variations of the APIs for multiple vehicle systems or one superset API that allows access to all of the vehicle's systems through stored procedures or methods.

FIG. 13C describes a set of computer readable and executable code 1970 that can be compiled together by a third party APP 104 developer in the form of an APP. The APP 104 uses structured programming languages to execute stored functions allowed by the vehicle's system API 130. In this example, the APP is a third party HVAC app that allows a GUI to be displayed to a user giving them the option to adjust the temperature on the left or right side of the vehicle up or down. In this case, the APP's GUI has provided a data stream to the APP letting it know that the user has selected to set the temperature on the left side of the vehicle to 80 degrees and the right side of the vehicle to 76 degrees.

The APP 104 will then use functions available from the vehicle's API 130 to manipulate the data on the vehicle's storage system which in turn will be electrically polled by sensors, data streams etc. to manipulate the vehicle's electrical and mechanical HVAC systems. The user will notice the result visually by the data provided by the APP to the GUI as well as environmentally as the temperature is changed in the vehicle.

Figure 14:
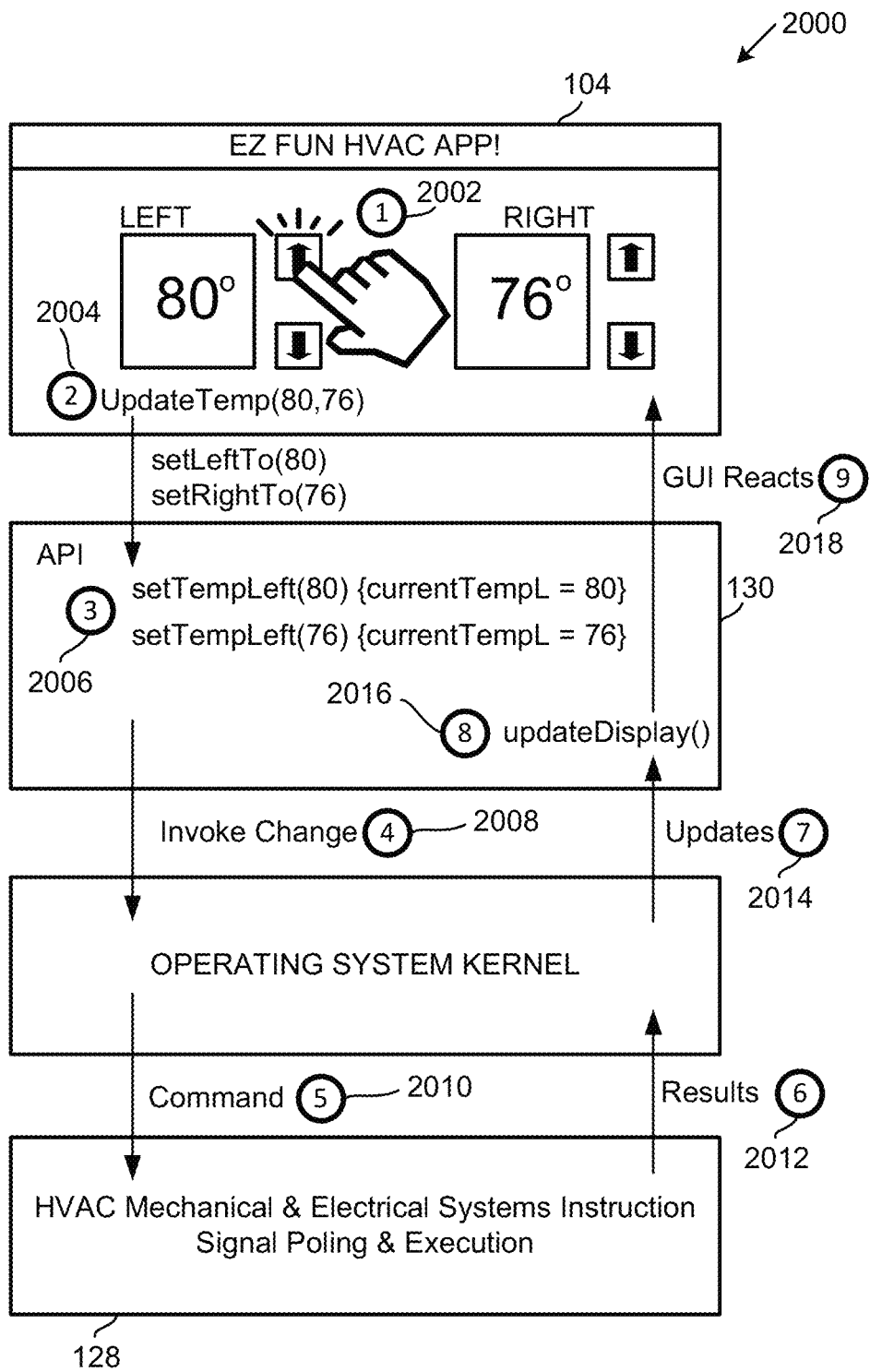
FIG. 14 describes the stepped flow of events as a user interacts with an APP, in this case, an HVAC APP, in accordance with one embodiment.

FIG. 14 describes the stepped flow of events 2000 as a user interacts with an APP 104, in this case, an HVAC APP 104. The GUI shown for APP 104 describes the first step 2002 where a user physically interacts with a sensor, screen, voice system etc. polling to see if an input has been received. The user's input in 2002 has been interpreted by the app to raise the temperature on the left hand side of the vehicle to 80 degrees and maintain the temperature on the right hand side of the vehicle at 76 degrees. This input invokes step 2004, which calls a stored function on the APP 104 that is API 130 allowable with arguments. The stored function may invoke other helper or associate functions within the API 130 in step 2006, which all in turn invokes restricted computer readable code at the operating system and or kernel level in step 2008. These invocations will then in turn command mechanical and or electrical systems in step 2005 in order to achieve the requested response in step 2002.

The results of the commands on the vehicles systems are based back to the vehicle's operating system or kernel level in step 2012 which then updates data on the API 130 in step 2014 that the APP 104 is polling, such as updating the display to show the resulting temperature in step 2016. The results of a function that is invoked at the API 130 level updating the display produces a data stream translatable and displayable by the vehicle's screen showing the APP 104's GUI in 2018.

Figure 15:
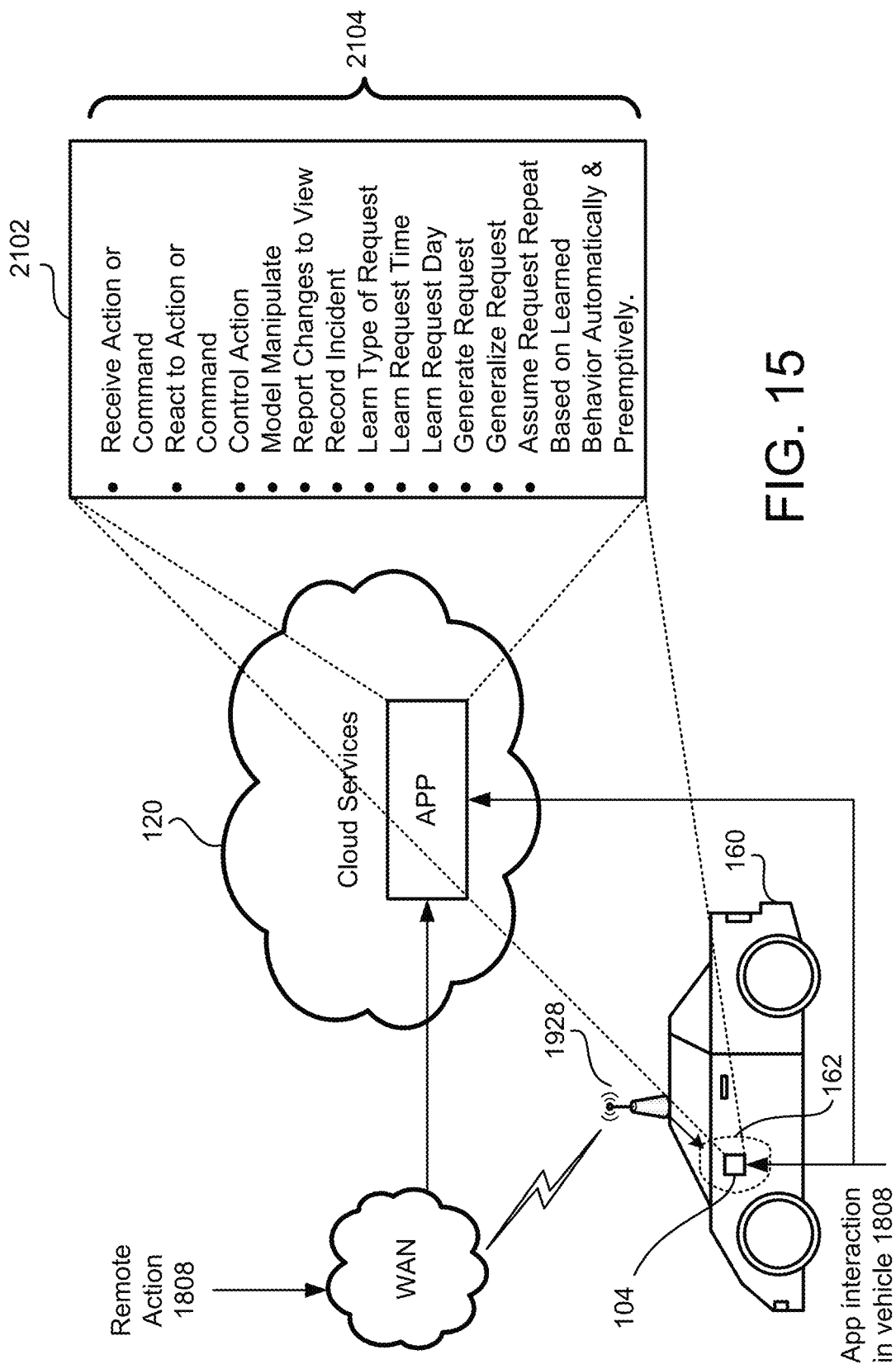
FIG. 15 Describes further ways an APP may take, process and produce results, in accordance with one embodiment.

FIG. 15 describes further example ways an APP 104 may take, process and produce results 2100. FIG. 14 shows a way to interact with an APP 104 locally but a vehicle computer system may relay data, inputs and information to the APP while connected to a wide area network, local area network, cloud process 120 or private cloud. A remote action to invoke change on an APP 1808 may be initiated via a network and pass to the APP running on the vehicle 160 using the vehicle's antenna 1928 or wired interface. An APP 104 running virtually on a network or cloud services 120 may also take input remotely and process the results accordingly.

Some of the inputs and results 2102 that an APP can take and produce locally or remotely include but are not limited to the set 2104 that can receive an action, react to an action, control an action, manipulate data models, report changes to a view or GUI, record events or incidents, learn the types of requests being submitted, learn the times of request being submitted over time, learn the days of the year the requests are being submitted over time, generalize and interpret requests, assume user intent in order to automatically invoke changes, automatically and pre-emptively act on behalf of a user, fine tune learned user behavior etc.

The learned behavior (e.g., learned settings that provide for automatic programming) can be assigned to particular applications, particular sub-features of applications, to particular native system features of the vehicle, or combination of one or more thereof. The learned settings can also be managed via an interface, which shows to the user settings that have been learned and provides the user with options to modify learned settings.

The modifications of the learned settings can be made via the vehicle display or any other device having access to cloud services. The learned settings can also be communicated to the user via notifications. Such as, "We noticed you like your truck temperature at 3 pm to be 60 degrees? Please confirm," or "We noticed you like your car temperature at 8 am to be 75 degrees, this will be preset for you automatically," or "We have detected your favorite settings, please login to your account to see settings we have programmed for you or make updates," or other similar notifications via the vehicle or to any connected device over the Internet.

In other cases, notifications may not be sent. In some cases, the settings will just occur automatically. In some examples, notifications can be provided with a link or access to a user interface of an application. Via the application, the user can manage, set, control or view any aspect of the connected vehicle. In some cases, the settings can be manually adjusted by the user way from the auto settings. In such cases, the manual setting can be learned and can be provided more weighting since the user took the time to correct an auto setting. Thus, various levels of weighting or importance can be given to learned settings. In other embodiments, the learned settings can be compared against learned settings of other vehicle owners having access to cloud processing. Using data from these different user profiles, learned settings can be obtained or generated.

Generation or analysis can be by way of overlap processes, cluster analysis algorithms, Connectivity based clustering, centroid-based clustering, clustering model most closely related to statistics is based on distribution models, cluster validation, density-based clustering, KNN/profile similarity, collaborative filtering, content-based filtering, hybrid recommender systems, mobile recommender systems, cross-sectional analysis, similarities in particular data types or settings, concentration in similar settings by particular demographics, and other similarity analysis calculators and aggregators. These settings can then be recommended to the user or can be automatically added to the profile. Recommender systems can the user the analyzed data to generate the custom recommendations for settings to users' profiles.

Figure 16A:
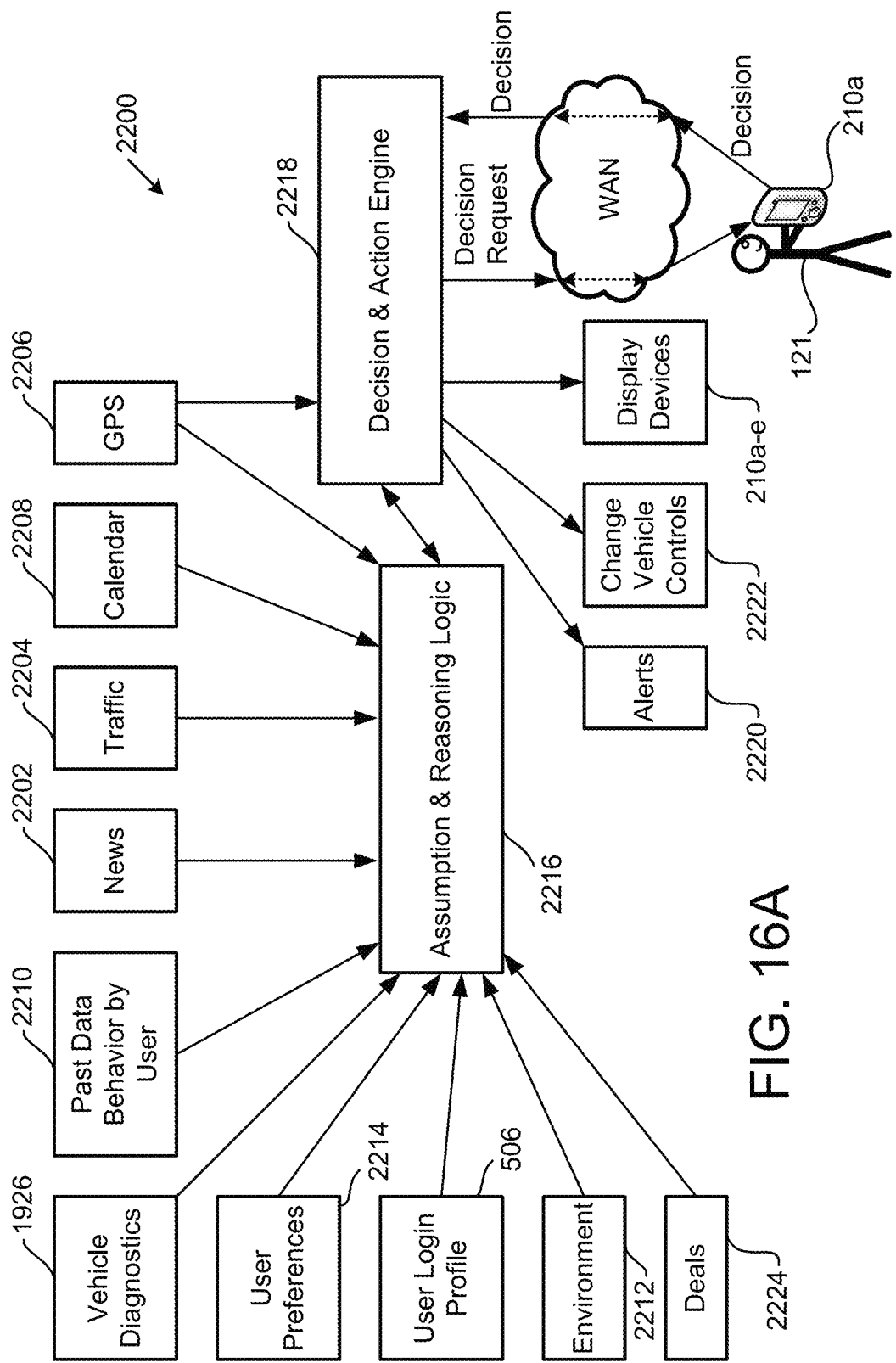
FIG. 16A describes an ecosystem where an APP in conjunction with a vehicle API may work together to make assumptions, make decisions and take actions, in accordance with one embodiment.

FIG. 16A describes an ecosystem where an APP 104 in conjunction with a vehicle API 130 may work together to make assumptions, make decisions and take actions 2200. API and APP code together can be arranged in such a fashion that creates an assumption and reasoning logic module 2216. This Assumption and reasoning logic module can take inputs from various systems and data streams including but not limited to GPS 2206, calendars 2208, traffic conditions 2204, local news 2202, past data of user behavior and interaction 2210, vehicle diagnostics 1926, user preferences 2214, user login profiles 506, environmental interpretations by sensors 2212, marketing deals 2224 among others. These inputs can be local and physical or remote and abstract via a network. The assumption and reasoning logic module 2216 compiles data from these sources to invoke decisions and actions on a decision and action engine 2218.

This decision and action engine 2218 has the ability to execute on what the assumption and reasoning logic module has determined needs to be done. The decision and action engine has the ability to produce alerts, both local, on screen, audibly, visually or remotely on a remote display device 210*a-e* using a data network. The decision and action engine 2218 also has the ability to change vehicle controls automatically on behalf of a user without user action based on assumptions made by the assumption and reasoning logic module 2216. Additionally, the decision and action engine has the ability to request a decision from the user preemptively in order to change vehicle controls.

This may be achieved locally or remotely requiring input from a user to proceed. For instance, the assumption and reasoning logic engine has determined that the user may want to have his or her car automatically started at 7:55 am because the user typically starts the car at 8 am. Starting the car at five minutes early will allow the system to heat the vehicle to the user's typical liking. However, the assumption and reasoning logic may have only reached a level of confidence of 75% where 80% confidence is required to act without user input. Thus, the system, being only 75% sure that the car should be turned on will automatically send the user an alert requesting a decision on whether or not to turn the vehicle on. Once the user 121 provides an decision remotely on their remote device 210*a*, the decision engine 2218 updates the assumption module 2216 so that it can augment its assumptions for an updated level of confidence on the next action trigger. These actions by the user automatically and continually update the assumption and reasoning logic module 2216 in order to fine tune the level of confidence on acting without user input and learn the user's behavior for future decisions.

FIG. 16B describes how one of many types of inputs into an assumption and reasoning logic module 2216 can be compiled over time. Although inputs can come from many sources, this particular example focuses on input into the assumption and reasoning logic module 2216 from past data originating and triggered by user behavior in order for module 2216 to learn. Past actions 2210 are logged into a database either locally on the vehicle computer or remotely which are fed into to module 2216. In this example, data about when the user's actions are stored, along with unique identifiers that will allow assumptions to be made in the future.

These identifiers include times, dates, rates, capacities, temperatures, frequency, degrees, distance, etc. In this example, the system has been keeping track of when the user has been starting his or her engine in the morning on weekday sand weekends. The system harvests all data points associated with given events. These data points 2210 are purely mined data points and no assumptions or reasoning occurs at this point. This data will be used by the assumption and reasoning logic 2216 to determine future actions.

FIG. 16C describes one example of what an assumption and reasoning logic module 2216 may produce using the data points collected on an ongoing basis in FIG. 16B. Over time, using inputs that are continually harvested by a user's action, assumptions are made and refined to aid in making decisions for a user in advance or behalf. Module 2216 has taken the inputs provided by 2210 past data and behavior to determine that before a decision can be made, the user's local or network-stored calendar should be polled to determine how the user's schedule might impact the system's pending actions. For instance, if the system had determined that the user typically starts his vehicle at 8 am but the user's calendar shows a meeting at 730 am located at a location that does not match the current location, the vehicle may assume that the car should be started at 725. They system will determine its level of confidence of the decision and may poll the user for a decision.

The system, by using prior data points has stored assumptions based on conditions, the day it is, the temperature of the environment and historical events, that the user will most likely start the vehicle's engine between 803 am and 805 am, and if the temperature is in the 30s inside the vehicle, the user will most likely set the interior temperature to between 70 and 80 degrees, it is not likely that the user will use the are conditioning unit, if there is ice on the windshield, the user will most likely defrost the windshield for 7 minutes before departure, the user usually drives between 15 and 18 miles at this time of day, the user typically starts the vehicle again in the afternoon between 505 pm and 510 pm, if the temperature is in the mid 70s, the user usually activates the AC and sets the temperature to 65 degrees, typical weekend behavior, the user typically makes frequents stops, does not have a set time the vehicle is started, uses certain APPs at certain times and has a history of certain destinations as recorded by GPS.

FIG. 16D describes an example list of decision the decision and action engine 2218 may take based on information provided by the assumption and reasoning logic module 2216 and sets of assumptions created. The decision and action engine 2218 will attempt, using a degree of confidence to anticipate what the user will want to do in terms of engine start and stop, location destinations, preferences of temperature, driving habits and poll vehicle capacities to ensure the intended path the user usually takes is attainable. For example, the user usually drives a distance in the morning at a certain time, however, the vehicle's fuel supply will not allow for that distance to be traveled. Thus, the decision and action engine polls the user as a reminder that the user should begin their intended travel sooner than usual to allow for refueling time.

The following examples described in FIGS. 17 to 26 will illustrate useful configurations for allowing passengers in vehicles to share or obtain access to controls of the vehicle from their passenger seats. The controls and settings provided to the passengers can be customized so that controls that are local to the passenger can be set by accessing the users mobile device. In one embodiment, when the user enters or desires to connect to a vehicle, the vehicle can ask the user if the user wishes to join the vehicle.

In one embodiment, the vehicle can be set up to allow any number of guests in an open configuration, such that device is detected within the vehicle can be prompted with a question that requests the device owner to confirm if they wish to join the vehicle. In another embodiment, users may be provided with access, passwords, credentials, codes, biometric required check-ins, or other types of rules or access routines to enable connection to the vehicle as a passenger. For example, a passenger can be provided with a temporary password while the passenger is a guest in the vehicle of an owner who wishes to provide the gas passenger with access to vehicle systems and controls.

The vehicle systems and controls and settings provided to the passenger can be customized for the location in which the passenger is within the vehicle, such as customized for the specific seat in the vehicle. The customization made by the user can also be saved to a user account, which may be saved to cloud services (servers and storage connected to the Internet), so that future recall of favorite settings can be made. Additionally, settings can also be analyzed for their context to determine past usage and suggest more accurate settings for the user, depending on the contextual need for the user to set such settings.

As such, settings made by passengers over time can be analyzed to provide learning patterns that can be used for predicting what type of settings a user wishes to implement. In various embodiments, passengers can move from vehicle to vehicle, and each vehicle being knowledgeable of their own systems can provide information that is populated to the passenger's device for allowing access to specific settings in the vehicle. For example, if the passenger enters a sedan where specific settings are provided, as defined by the computing system of the sedan, the shared settings, configurations, and accessed the vehicle electronics will be based on those available by the sedan.

If at a later time the passenger wishes to enter an SUV, that SUV may have additional settings are different settings and configurations from those of the sedan. Nevertheless, the computing system of the SUV will have programming that defines the type of settings available in the SUV and those type of settings that will be shared to specific passengers who may be seated in various seats within the SUV. As such, the settings, configurations, and user interfaces for accessing the settings of the vehicle as provided to passengers can be customized when they are delivered to the passengers, and the passengers can further customize the settings which can be saved for when the passenger returns to the vehicle. The settings can be saved to cloud services for easy recall.

Still further, as will be described below, vehicles can provide access to the settings by way of applications, or by making the electronics of the vehicle a Web server. By providing Web server capabilities to the vehicle, the mobile devices of the passengers would simply be able to navigate the various pages of settings provided to the passengers by way of a web browser. Utilizing the web browser, will avoid the need for passengers to download an application to simply utilize the systems of the specific vehicle. Alternatively, a passenger can download an application for the specific vehicle or for specific types of vehicles.

Figure 17:
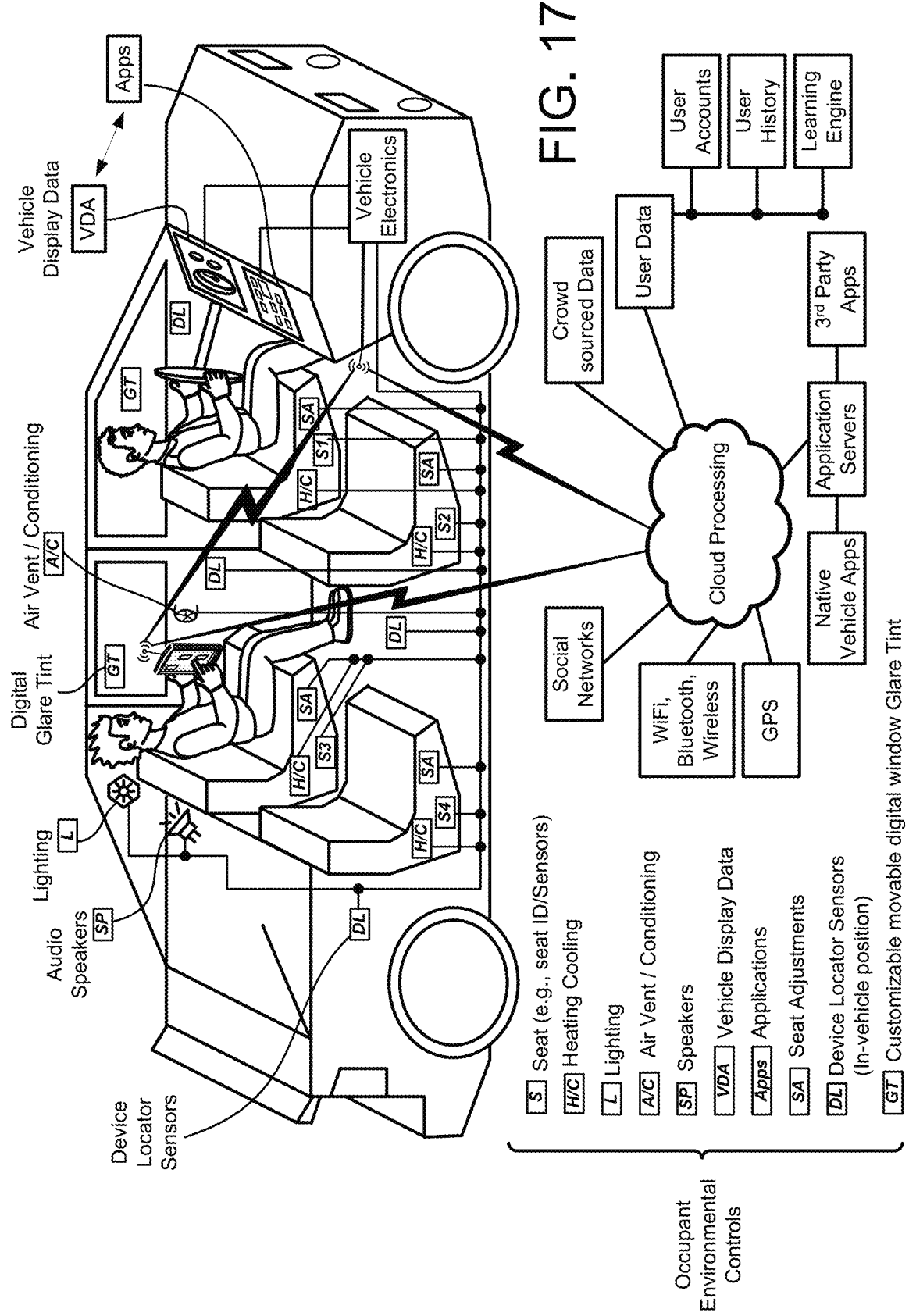
FIG. 17 shows an example cut-out of view of the vehicle, wherein a passenger having a mobile device can connect to the vehicle electronics to enable access to a predefined set of settings; such settings may relate or pertain to the occupant's environmental controls, in accordance with one embodiment of the present invention.

FIG. 17 shows one possible example of a vehicle ecosystem where vehicle systems such as speakers, seats, heating and cooling elements/vents, lighting, digital glare blocking systems among others, all having the ability to be manipulated through the vehicle computer once receiving instructions from a passenger in the vehicle. Any passenger riding in the vehicle may the ability to request access to the vehicle's systems interface which may be served to the user via an in vehicle server using an in vehicle network access point or via a remote web server residing in the cloud.

In some embodiments, a passenger may have the ability to control settings that are made available to them by the administrator or driver. For instance, the passenger can elect to move his or her seat back and set their personal temperature if allowed by the admin or driver. The passenger may request access to vehicle systems, and the allowed operations, settings and controls are presented to the passenger on their device.

The passenger may set changes affecting the area directly surrounding their seating position (e.g., a 2-4 foot volume sphere) or car-wide settings if so allowed by the admin or driver. The vehicle receives change requests from the passenger and translates the actions into signal instructions that the vehicle's hardware can carry out. In one embodiment, when a passenger has accessed the vehicle, a profile may be created for them. This profile is useful for the vehicle to learn usage patterns by the passenger. The patterns and inputs are run through a software-learning engine in the vehicle computer or cloud computer. This learned data is useful for the vehicle to predict what settings the passenger may like upon their next connection to the vehicle computer.

The more the user interacts with the vehicle, the more accurate the prediction. This example uses a personal vehicle but the vehicle may be a mass transit vehicle such as a bus, train, plane or boat, etc. Still further, the learned settings and programming by specific passengers can also be correlated to other passengers. For instance, passengers can be grouped and types of passengers that like certain types of settings, certain types of controls, certain types of entertainment, and the like. Using this information from multiple users can also facilitate the generation of more sophisticated learning patterns and can improve the accuracy of the suggestions and recommendations provided to specific passengers. In one embodiment, if multiple passenger data is analyzed by cloud services, the identity of the person is not needed.

In fact, the learning analysis can be carried out by analyzing setting profiles, setting patterns, conditions associated with when the settings were made, and the identity of the individuals/accounts is not required. For processing, the data is first stripped of account hold information and data sets are assigned to group ID or data sets. By processing the data sets, intersections of likely settings for typical group IDs can be found, and such can be used to compute probability functions to predict similarities and suggest recommendations, or pre-select settings, or the like. As more data is processed, the learning can continue to improve, thus providing more accurate recommendations for users/passengers.

FIG. 17 also includes various examples of systems within the vehicle that can be controlled by passengers, depending on their seat locations within the vehicle. In the illustrated example, features such as the audio speakers located proximate to a passenger can be automatically identified and control of those speakers can be allowed so that the passenger can adjust his or her environment. In that example, if the passenger wishes to have the audio turned down, but others in the vehicle wish to have audio volume, the passenger can simply reduce the speaker sound volume that is most proximate to the passenger, without affecting other passengers.

The same can be controlled for features such as air vents, which can allow users to custom set the temperature of their zone within the vehicle so that comfort can be improved for that particular passenger. Although vehicles are usually not compartmentalized, the temperature can be generally controlled differently for different parts of the vehicle, so that improved comfort can be attained by specific passengers. Additionally, the vehicle controls can include seat positioning controls, which can allow the passenger to change the seat settings for his or her specific seat, by simply selecting the seat settings option in the user interface of his or her mobile device.

Also shown is the ability of the user to control the lighting, which may be proximate or near his zone in which the passenger is seated. In one embodiment, the passenger can identify the seat in which the passenger is seated, such that the controls can be customized for that specific seat. This also provides the ability to control other features of the seat, which may include heat seating or heat cooling functions. Other functions that can be controlled can include vehicle display data, which may be displayed on the main panel of the vehicle.

For instance, the passenger can do navigation by utilizing the navigation maps that are provided by the vehicle or provided by maps of the mobile device. The navigation information being viewed and controlled by the passenger can be shown (and also shared/controlled) on the display of the vehicle. In this embodiment, the passenger is essentially assisting the driver to input navigation data, such as destination information, location data, alternate path and routes, etc. By allowing the passenger to control applications which are then displayed on the vehicle display, distraction by the driver is reduced. In a similar manner, the passenger can also control other features, which are normally controlled by the driver. For instance, instead of having a backseat passenger request the driver to change the audio settings for the vehicle, the passenger can simply change the audio settings.

The passenger can also be provided with access to system information's of the vehicle, such as the speed of the vehicle, the temperature of the engine, the condition of the battery, etc. This information can then be conveyed verbally from the passenger to the driver, so that the driver need not perform the navigation while driving, which can be distracting and dangerous. In another embodiment, the system can also provide access to device locator sensors, which may be placed throughout the vehicle. The device locator sensors can operate to identify the location of a mobile device within the vehicle. The device locator sensors can also locate multiple devices within the vehicle. In one embodiment, the device locator sensors can be programmed to disable certain features on the mobile devices when the mobile devices are located in particular areas within the vehicle.

For example, if the mobile devices are utilized in a communications application, a texting application, a gaming application, a movie application, a streaming application, or other type of application that may be distracting to the driver, such applications or data can be disabled when the device approaches or nears a zone in which the driver is located. As such, the device locator sensors provide for optimal air came in, control, and feature access to passengers who are not engaged in navigation of the vehicle, was still allowing the driver to interface with passengers and not be provided with distracting data from the mobile devices. In the illustrated example, the vehicle is also connected or connectable to cloud processing. Cloud processing can provide access to various sources of data and services. Some services can include social networks, crowd sourced data, native vehicle applications, application servers, and third-party applications.

Cloud processing can also provide access to or communication with global positioning systems (GPS), Wi-Fi, Bluetooth, and other wireless communication devices or communication links, etc. Still further, cloud processing can communicate with user data, which can include data of various passengers in user accounts. The user data can include the user accounts, user history, and learning engine logic and data. In one embodiment, the history associated with specific passengers can be particular to that particular passenger. In other embodiments, the history data can be analyzed to find similarities between passengers in order to generate better recommendations. In other embodiments, the user account can also be saved on the servers or storage of the vehicles themselves. In still other embodiments, the user accounts, user history, and other data can be saved on the user devices. In still other embodiments, data can be saved in various locations, which can include the vehicle, cloud processing, and users personal devices.

As further shown in FIG. 17, the various sensors and connections within a vehicle can be wired to vehicle electronics, which can then allow the vehicle electronics to communicate with one or more mobile devices within the vehicle. In this manner, typical controls that may be placed throughout a vehicle can be eliminated. For example, in conventional vehicles additional controls for radios, air conditioning, etc., are replicated for use by rear passengers. By providing controls of the vehicle wirelessly to the devices that are guests in the vehicle as passengers, these additional controls can be eliminated, which can save substantial cost to the vehicle. In a similar manner, buttons that may be required on seats to control the seat forward, backwards, or to set specific comfort settings, can be eliminated. Eliminating these additional buttons, controls, screens, toggles, etc., can also save additional cost to the vehicle, as such controls will now be provided to the passengers by way of their mobile devices.

Figure 18A:
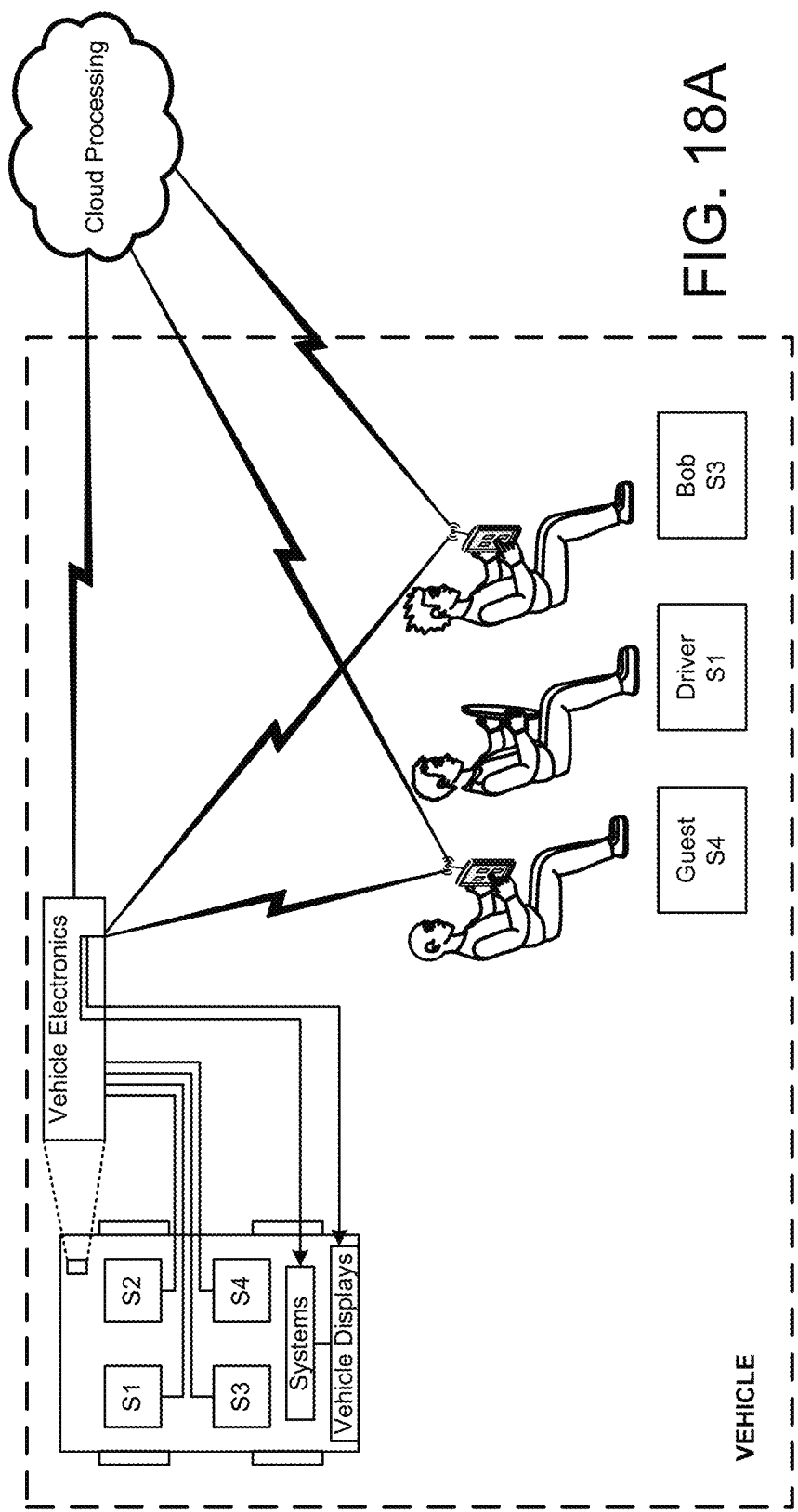
FIG. 18A illustrates an example where several passengers are accessing vehicle electronics of a vehicle, and a driver that is navigating the vehicle, where each passenger or select passengers are provided with access to the vehicle systems for their specific seat or environment, in accordance with one embodiment of the present invention.

FIG. 18A shows an example of vehicle, where a plurality of passengers are seated, and passengers may have their own mobile devices, in accordance with one embodiment of the present invention. As shown, a vehicle can include a plurality of seats, and systems which are part of the vehicle. The system that is part of the vehicle may be integrated by the vehicle manufacturer for use in the vehicle. Some vehicles may have one or more interfaces for providing information regarding the vehicle functionality. In some embodiments, the vehicle may have a main instrument panel display and one or more auxiliary displays. The main instrument panel display can be in the form of a fully digital display, which can change from time to time depending on the features being displayed for use in the vehicle. In some embodiments, certain features remain active during operation of the vehicle, such as the speedometer, and other safety features for operating the vehicle. In some embodiments, other displays can change from time to time, depending on the information that a user wishes to access or the vehicle needs to display.

In the example of FIG. 18A, four vehicle seats S1, S2, S3, and S4 are shown, but any number of seats is possible, depending on the size of the vehicle. In this example, the vehicle as a guest sitting in S4. A passenger is also seated in seat S3. Passenger in seat S3 is Bob, and Bob is a passenger that has been registered with the vehicle or has joined the vehicle's network. Passenger Bob therefore has access to the vehicle electronics by way of his mobile device, and also to cloud services by way of an Internet connection.

In some embodiments, passengers can also access the Internet by way of the vehicle, which can function as a router. In a guest example, the guest passenger may be provided with minimal access to the vehicle systems and settings, such as basic settings to function in and around seat S4. In order to be provided with additional privileges to the vehicle systems, the passenger can simply register, or be provided with a password or access privileges by the driver or administrator. In this example, Bob sitting in seat S3 may be provided with additional access to the functionality of the vehicle, systems, applications, or communication systems.

As such, some embodiments will have situations where some passengers are provided with less access to vehicle systems, settings, and/or operations, while others are provided with more privileges. The example in FIG. 18A illustrates that passengers can be provided different levels of access and services when sitting in the vehicle, depending on whether the passengers register with the vehicle or are provided with guest access.

FIG. 18A further shows wired and wireless connections within a vehicle making passenger manipulation possible. This system shows passengers in a vehicle interacting with vehicle electronics either directly or remotely via the cloud. The cloud may serve as an intermediary where the cloud is connected to both the passenger's mobile device and the vehicle's network connected vehicle computer. Once the connection is established to the vehicle computer, the passenger's device having an interface useful for graphically describing changeable settings for the specific passenger or car wide is displayed.

Figure 18B:
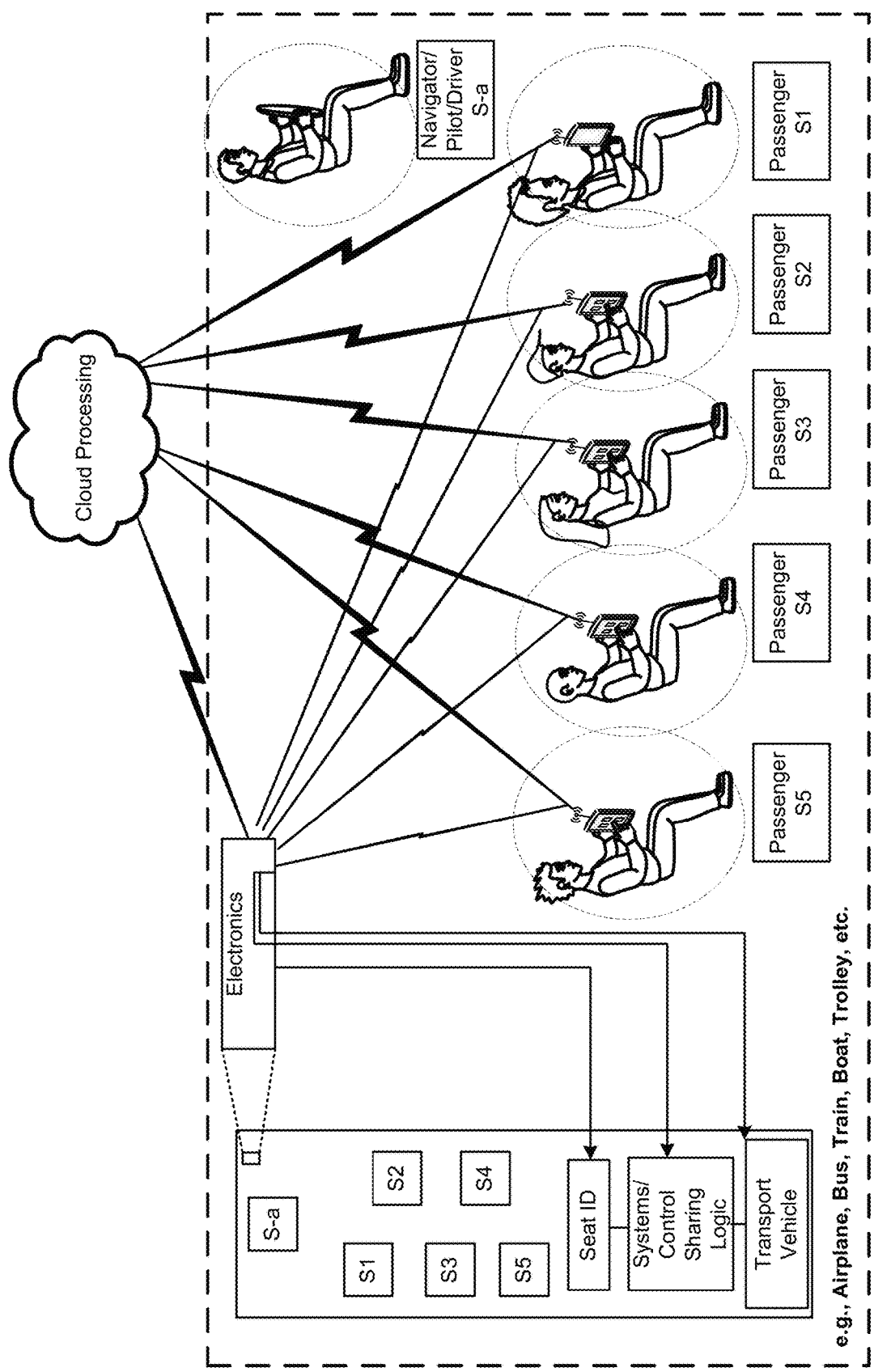
FIG. 18B illustrates an example where several passengers, which may be assigned or seated in particular seats of a vehicle are able to access electronics of the vehicle, and a seat ID is used to provide systems and control for components, features, and settings that may pertain to or may affect the zone in which the passengers are seated or located within the vehicle, in accordance with one embodiment of the present invention.

FIG. 18B shows a configuration adapted to any vehicle such as a mass transit vehicle including but not limited to busses, airplanes, trains, boats etc. Thus, the vehicle can take on various forms, so long as the vehicle provides passengers with access to certain functionalities, systems, and control. The seats disposed within the vehicle can be arranged in various locations, which do not require fixed orientations or relative positioning. The electronics of the vehicle therefore provide local access to certain systems and control to the various passengers, depending on the seat ID of each particular passenger. The seat ID is used to provide each passenger with a unique experience and capabilities to adjust, set, and control features associated with their local environment. As noted above, each passenger can be provided with vehicle functionality to control their environment, zone of influence in the vehicle, or climate controls.

The functionality can include environmental controls for the zone in which the passenger sits, and can also include access to applications, and native systems installed on the vehicle electronics/computer. Depending on the privileges provided to each of the passengers, more or less functionality is enabled for each zone in which the various seats of the vehicle are located. As noted above, example functionalities can include controlling the seat positioning, controlling air-conditioning, controlling speaker volumes, controlling seat heat, controlling cooling functions, controlling audio settings, controlling video settings, and controlling access to applications of the vehicle or system applications or system functions, etc. Based on the privileges provided to each user, their functionality can be provided.

If the vehicle is a larger commercial transportation type vehicle, certain passengers can pay a fee to increase the functionality or access to applications from the specific seats in which they are passengers. The various passengers can also access processing, such as Internet applications that are normally accessible by way of their mobile devices.

In one example, the passengers can access the vehicle electronics, which can provide high-speed Internet access to the passengers. In such examples, the passengers can connect to the vehicle electronics using a wireless protocol, such as a Wi-Fi connection, a Bluetooth connection, or other type of wireless connection. In other embodiments, a wire connection is also possible if the passenger location has a suitable network connection port. In this embodiment, the functionality provided to each of the devices in the specific zones where the passenger seats reside, can be controlled so that when the devices are removed from those zones, the functionalities can be disabled.

For example, if one of the passengers decides to share the mobile device with the navigator, pilot, driver, conductor, etc., safety algorithms can disable the mobile devices from accessing services when the mobile device is detected to be in proximity to the driver or when the vehicle is moving or in drive mode. As passengers' access settings, change settings, customize their environment, these settings can be saved to passengers' user accounts. The passenger user accounts can be saved by cloud processing, so that they recall settings for future instances, e.g., when the user becomes a passenger in either the same vehicle or in other vehicles having similar functionality.

In situations where a passenger moves from one vehicle to another, the functionalities provided by the vehicle can change. However, it is the vehicle that is providing the services (or cloud providing the services for the vehicle or in conjunction with the vehicle) to the mobile devices of the passengers, so the vehicle will know the functionality it can provide to each of the mobile devices of passengers in the vehicle. As noted above, if the user decides to join the vehicle or pair with the vehicle, the network of the vehicle can provide a user interface that is managed by the vehicle, to avoid requiring a passenger to download an application to the device. In other embodiments, each vehicle or each vehicle type, or each manufacturer of vehicle type can provide applications for enabling the sharing of vehicle functions to mobile devices with in a vehicle. In this configuration, mobile devices can download applications which communicate with the vehicle and can communicate with cloud services.

Figure 19:
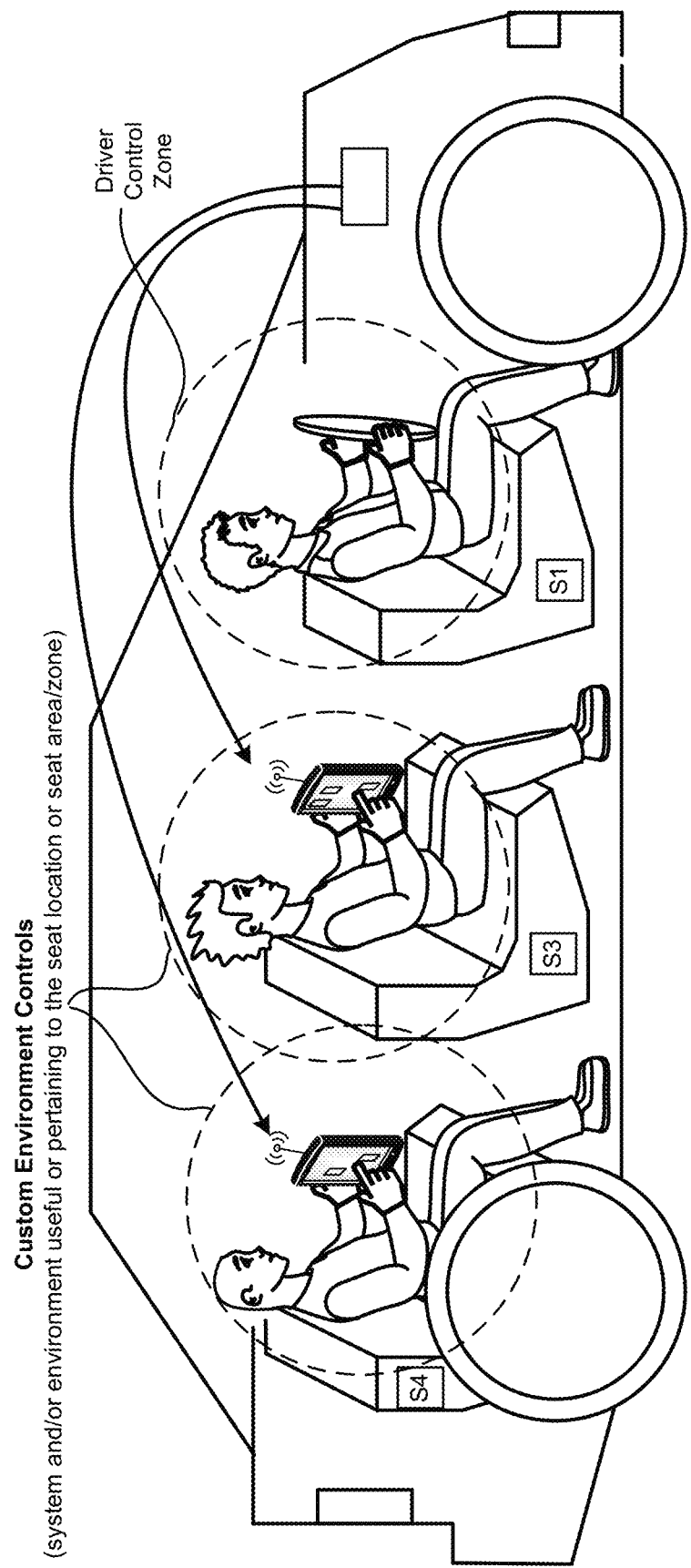
FIG. 19 illustrates an example of a vehicle where in several zones are defined with respect to the passengers and the drivers, and the custom environmental controls are provided for each passenger, based on their current seating location within the vehicle, in accordance with one embodiment of the present invention.

FIG. 19 illustrates one possible representation of custom environmental controls. Each passenger in a given vehicle may have a sphere of influence defined for them by the administrator or the vehicle in which the passenger is only allowed to change vehicle systems that are within their immediate sphere of influence. For instance, a passenger may be able to raise the volume of the speaker next to their seat but may not have the ability to do the same for the passenger in front of them or next to them because they do not have the right to do so.

FIG. 19 further illustrates an example of a vehicle where the driver is sitting in seat 1, a passenger sitting in seat 3, and another passenger is sitting in seat 4. The passengers in seats 3 and seat 4 are shown to be using their mobile devices. In this example, the mobile devices are in communication with vehicle electronics which provide access to some, or a subset of vehicle system settings, metrics, data, and functionalities. As noted above, the vehicle can also provide access to applications that are loaded on the vehicle already, which will prevent having to require users to download custom applications simply to enjoy a ride as a passenger in the vehicle.

As shown, the area and zone around each seat in the vehicle is viewed as a custom environment or area zone in which the vehicle allows the passenger to access certain functions. For example, the vehicle can transfer to the displays of the mobile devices a user interface with functionality for controlling aspects of the vehicle in and around the seat area zone. A passenger can control seat positioning, can control air conditioning, can control audio settings, can control heat for the seat, can control audio settings, can control video feeds, can control applications of the vehicle, can control applications of the vehicle or the mobile device which are then shared to the displays of the vehicle, and other controls that provide a custom environmental control zone for the passengers. When the passengers leave the vehicle, the settings of the seat in which the passenger was sitting can revert back to a standard position or neutral position.

FIG. 20 shows one possible representation of what a passenger mobile application or web page may present to the passenger. In this case, the passenger is presented with metrics the vehicle may or may not supply openly such as the speed the vehicle is traveling and outside temperature. In addition to vehicle metrics, the application or website may give a passenger access to manipulate their seat, their climate settings, their audio settings, their comfort settings etc. The passenger may be given the ability to toggle settings associated with their user profile.

Additionally, the app or website may give pass-through access to applications loaded on the vehicle. The vehicle may have applications already installed on the vehicle computer such as applications useful for finding the nearest bathroom or the nearest gas station. Instead of every passenger downloading the app and storing on his or her personal device, the vehicle may provide pass-through application access to the passenger. The vehicle hosts the application and the user can interact and provide inputs to the app. The vehicle's network connection/GPS or the passenger's network connection/GPS can facilitate application function.

Many apps are only useful when in a vehicle or specific vehicle and to avoid app clutter on a passenger's mobile device, an interface to the apps are provided to the passenger. A "ROADTRIP APP" for instance may allow a passenger to find the nearest bathroom, plan gas station stops, plan vehicle charging stops, and plan dining stops. Passenger planning using the vehicle's on board application can greatly aid the driver and avoid driver distraction.

FIG. 20 further illustrates an example of a passenger Bob, that is sitting in seat S3, and is controlling his mobile device, in accordance with one embodiment of the present invention. As noted above, the mobile device can be provided with functionalities by the vehicle that include features that are normally only presented by manual/physical vehicle displays and/or buttons, knobs, levers, screens. However, the mobile device, no matter what the form factor is, can be provided with custom user interfaces that enable access to customized features associated with the vehicle in which the passenger Bob is present.

In the illustrated example, the screenshot shown in the mobile device held by Bob has a number of useful interfaces. These interfaces are not shown to be exhaustive of the various types of interfaces that are possible and also not limited to the organization, graphics, or presentation. The user interface is simply provide the show the functionality that can be shared to a mobile device of the passenger who may be sitting in the vehicle, where the vehicle has allowed the passenger to share and access certain features. As shown, the user interface may show metrics regarding the car, such as the speed of the vehicle.

Other metrics can include data obtained by sensors of the vehicle, such as the outside temperature. The outside temperature information can also be augmented with graphics or additional data, which may be obtained from another source from cloud resources. For example, the data populated to the mobile device can be a blended data feed that includes data collected from sensors of the vehicle and also data obtained from the Internet.

One function can be to provide a maps function to the mobile device. The passenger, in one embodiment, would be allowed to navigate the maps application so as to help the driver dial in addresses, locations, or search for content or information during a trip. As the passenger accesses the mobile device mapping function, the results of the mapping can also be synchronized to the display of the vehicle, which would allow the driver to see the results of the navigation entry data provided by the passenger. This functionality would allow the driver to be less distracted while driving.

Other settings that can be shared to a passenger can include audio settings. The audio settings may be the settings that are available on the vehicle itself. For instance, instead of requesting that the driver change the audio settings at the main display panel, the main display panel user interface can be replicated to the mobile device of the passenger. As the passenger changes the settings, the changes can also, in one embodiment, be synchronized to the display of the vehicle.

Climate settings can also be accessed for the passenger, in relation to the seat in which the passenger is sitting. The climate settings can also be adjusted for the entire vehicle, if the passenger is provided with such privileges. The passenger is also provided with seat settings for his or her current seat. The passenger can also be provided with other comfort settings for that same specific seat or for an area around the seats. The mobile device can also provide user interfaces for accessing audio and video settings which can allow adjustment, setting, or configuration of audio and video outputs presented on one or more displays of the vehicle.

For example, a passenger sitting in the front seat may select a certain video show to render on a display for the rear seats. This may be useful when a parent wishes to place certain video performances on displays of a rear entertainment system for a child, while the parent is sitting in the front passenger seat. Access to general settings can also be provided to the seat, depending on the privileges provided to the passenger. In some embodiments, passenger Bob can also be provided with an option to change seats, such as when passenger Bob decides to slide over to another seat or the like. The settings for passenger Bob can therefore be immediately transferred to another seat, while the prior seat reverts back to a standard setting, or adjusts for another passenger.

Figure 21:
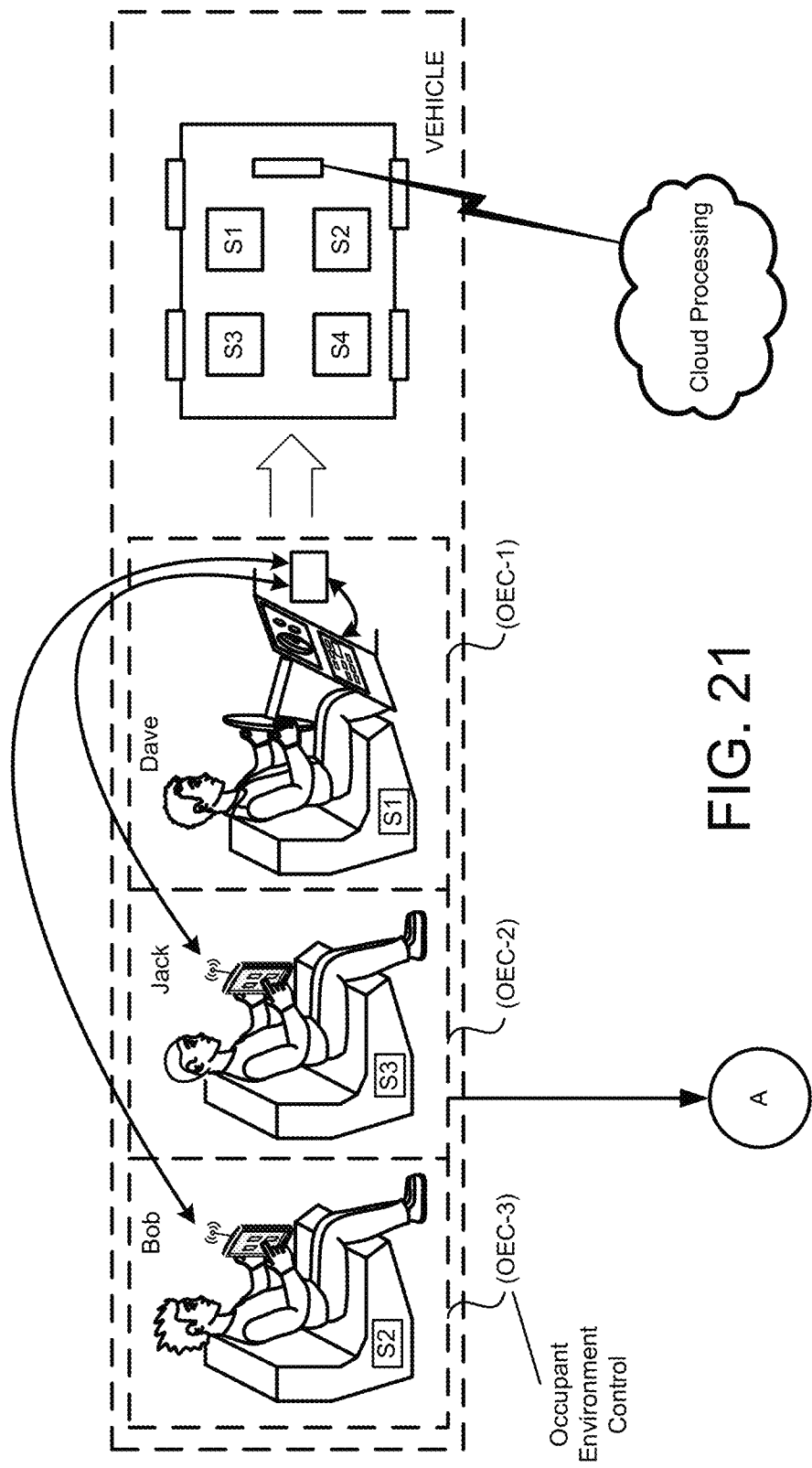
FIG. 21 illustrates an example of passengers utilizing their mobile devices to interact with vehicle electronics and to receive access to occupants' environmental controls, in accordance with one embodiment of the present invention.

FIG. 21 describes one possible flow of events when passenger jack elects to have access to vehicle systems within his sphere of influence or occupant environment controls. This example shows various passengers of the vehicle, who may be accessing vehicle electronics to provide access to their zones or occupant environmental controls (OEC), in accordance with one embodiment of the present invention. In this example, the driver of the vehicle is Dave, who is sitting in seat 1. The passengers are Jack and Bob, who were sitting in seats 3 and 2, respectively. Each of the passengers will have their own occupant environment control, which includes access to environmental controls and settings, and vehicle access settings and network access settings to the network of the vehicle, and access to cloud processing over the Internet. One example of the controls provided to a passenger is illustrated by way of access provided to Jack, as shown in FIG. 22.

Figure 22:
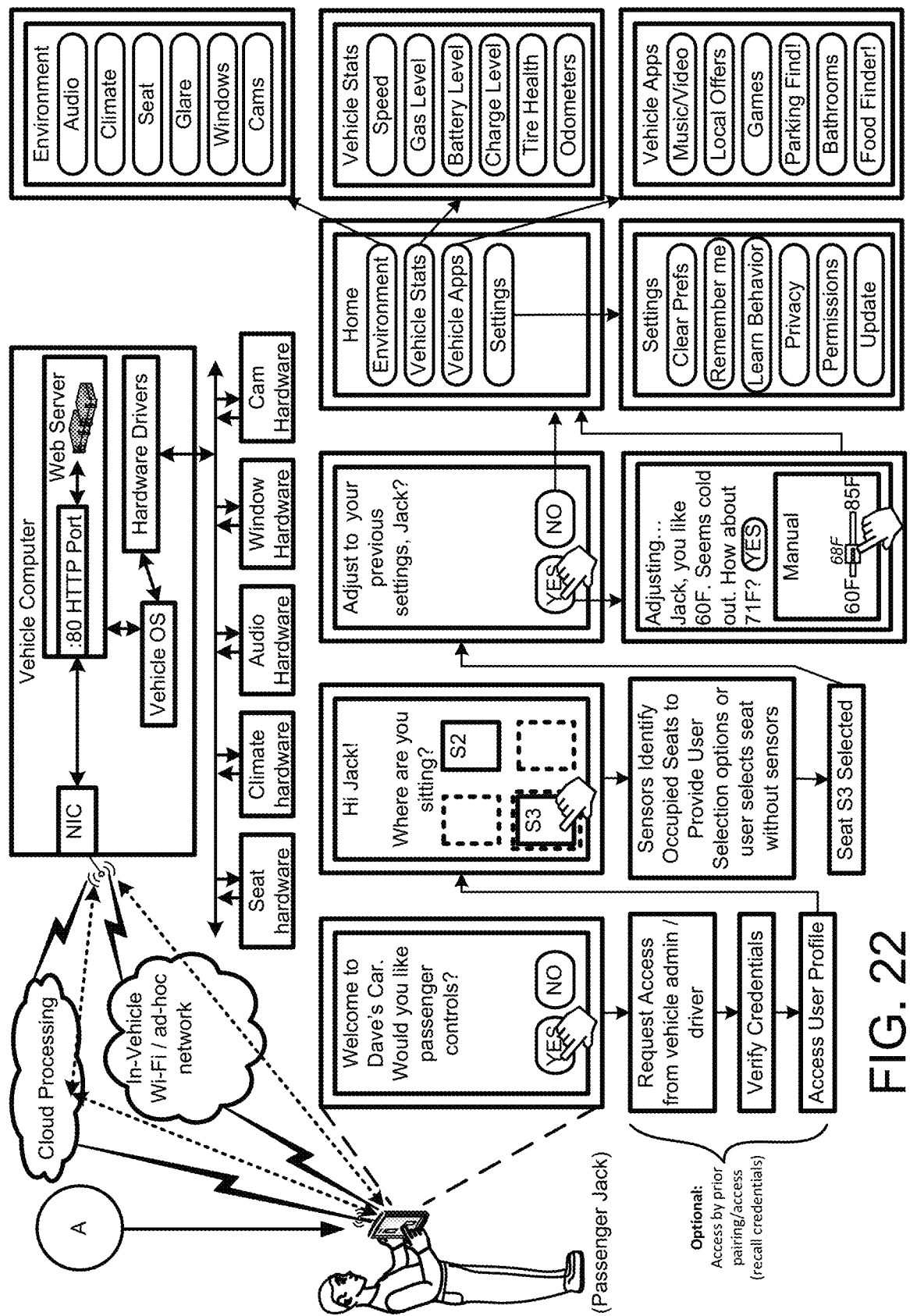
FIG. 22 illustrates an example of a passenger (Jack) which may be accessing the vehicle electronics/computer by way of a network provided by the vehicle and selections to access the vehicle are provided, along with customize settings that may pertain to the seat location of passenger Jack, in accordance with one embodiment of the present invention.

FIG. 22 illustrates an example where Jack, who is a passenger in the vehicle, and has a mobile device can access the in-vehicle network and also accesses cloud processing over the Internet, in accordance with one embodiment of the present invention. The vehicle computer can include any number of electronic systems, such as a processor, memory, logic, networking circuits, hardware, and software.

It this example, the vehicle computer can include a Web server which may communicate using port 80 (or any other port or protocol). Using port 80, the Web server can provide access to a mobile device by way of a network interface card (NIC) of the vehicle computer. As mentioned above, instead of requiring each passenger to download and application, the mobile device can simply join the network of the vehicle. Joining the network of vehicle can include accessing the network by way of credentials, or accessing the network by way of a guest password, or accessing the vehicle if it has an open access setting.

In one embodiment, the vehicle may detect that a mobile device is present in the vehicle. The vehicle can then communicate a notification to the mobile device, a text to the mobile device, and e-mail to the mobile device, or some other communication or signal to the mobile device identifying that the vehicle can allow access to vehicle systems, when the passenger device is present in the vehicle, or substantially near the vehicle.

In some embodiments, detecting whether a mobile device is within the vehicle can be performed by sensors within the vehicle that exclude invitations to mobile devices that are outside of the vehicle. In some embodiments, a user may have previously connected to a vehicle and the vehicle may detect the presence of mobile device even when user has not yet become a passenger in the vehicle. In the illustrated example, the vehicle computer can have communication with seat hardware, climate hardware, audio hardware, windows hardware, camera hardware, and other hardware/software components.

Once the mobile device of Jack has been detected, the vehicle computer may provide a welcome screen to the mobile device of Jack. The welcome screen can request Jack to confirm if he wishes to be a passenger and access controls of Dave's car. As shown in FIG. 21, the car is being driven by Dave, and it is assumed that the car is Dave's car—for this example. It is possible that the car may be simply a shared car, a rental car, or a passenger car or commercial vehicle. In such circumstances, the welcoming notice can be appropriately worded. If Jack has determined that he wishes to join Dave's car, he may be requested for access information, which may be obtained from the vehicle administrator or the driver. Once Jack enters his credentials, his credentials can be verified. After the credentials have been verified, the user profile for Jack is accessed, such as by referring to previously saved profile data on cloud services.

This process initially pairs/connects of the device to the vehicle, and may be omitted if the device has been previously paired/connected to the vehicle. Once jack is seated within the vehicle, one optional screen can request Jack to confirm that he is indeed sitting in seat number 3. Once Jack selects his seat, Jack may be requested to verify if wants to access his previous settings. In other embodiments, sensors within the vehicle can identify occupied seats to provide Jack with an identification of which seats are occupied and which seats are not occupied. For instance, only seats 3 and 2 are presently occupied with passengers. Here, Jack has selected seat 3. If Jack determines that he wishes to adjust settings to his previous settings, additional screens can ask Jack if he wishes to revert to previously set temperature settings, adjust certain temperature settings, or Jack can manually navigate to other settings he wishes to access.

In some embodiments, one of the screens can be a home screen, which provides the basis for more selections of settings that are available for the passenger while seated in the vehicle. Examples can include environment settings, vehicle statistics, vehicle applications, and other settings. The environment settings can include audio settings, climate settings, seat settings, glare settings of windows, window settings, camera settings, and other settings, without limitation. Vehicle statistics can include, for example, vehicle speed, gas level, battery level, charge level, tire health, odometers, etc. Vehicle applications can include applications that are already loaded on the vehicle, such as music and video applications, local offers applications, games applications, parking finding applications, bathroom locator apps, food finding applications, maps/navigation applications, etc.

Still further, other settings can include settings to allow passengers to clear preferences, remember preferences, learn behaviors, privacy settings, and permissions settings, update settings, etc. The various graphical user interface screens that can be provided to the user device can vary, depending on ergonomics, user interface functionalities, type of device, size of device screens, and simple preferences. As noted above the above, these screens can be provided by the vehicle computer by way of a Web server or logic or hardware/software. However, the screens can also be provided by way of applications which are downloaded to the device.

FIG. 22 describes the continuation of FIG. 21 describing the flow of events and systems interacted with when Jack elects to change vehicle settings for his sphere of influence. This example shows one possible connection scheme where a vehicle computer also maintains a web server with a communication port such as port 80 exposed to allow data egress and ingress using a network interface card. This network interface cards collects data and distributes data between the vehicle computer and an on board vehicle network access point such as a switch and/or router. In this example, the passenger makes connection with the vehicle computer after connecting to the vehicle's network. The passenger is displayed with a web page served by the vehicle computer web server.

Jack is asked if he would like to have passenger controls. In this case, Jack elects to have passenger controls. If this is the first time connecting, Jack is provided with credentials and a profile is created. If this is not the first time connecting, Jack is authorized and is asked to tell the computer where he is sitting. The vehicle provides Jack with a diagram of all possible seating positions within that vehicle. Jack choses his seat as seat 3. Sensors verify that Jack is actually sitting in seat 3 and proceeds if true. Jack is given the choice to change all of his settings to his previous elections or to his favorite elections based on matching current environmental circumstances and based on learned behavior the computer has compiled using Jacks interactions with the system. Jack may elect to move all of his settings to his prior choices last time he connected. The computer notices that Jack's favorite temperature is 60 degrees but the computer also notices jack likes 60 degrees when the temperature outside the vehicle is above 79 degrees.

The computer may determine that jack may want a warmer temperature since the exterior temperature is colder than normal and suggests a new temperature. The computer also gives Jack the ability to manually change the temperature. Alternatively, Jack may like a relaxed seat position normally but the computer knows that is usually only when the vehicle is traveling at a steady pace. When there are many starts, stops and accelerations, jack may prefer a sport seating position and may suggest that if the vehicle is moving aggressively. Jack is then shown a home page where Jack can elect to change settings to his environment, view vehicle stats, use vehicle served applications, and change his personal settings. The environment page allows for Jack to manipulate audio, climate, seat, glare, windows and cams.

The vehicle stats page allows Jack to view the vehicle's speed, gas level, battery level, charge level, tire health, odometers etc. The vehicle apps page allows Jack to view apps pertaining to music, local offers based on GPS, games, parking locations, bathrooms and food among other applications. A settings page allows Jack to change all personal profile settings including but not limited to toggling preferences, vehicle assumptions based on learned behavior, privacy, permissions and update. For instance, Jack can view all of the settings the vehicle thinks Jack may like based on learned behavior. This page may allow Jack to manually toggle those assumptions to more accurately reflect what Jack actually wants the vehicle to automatically assume and do.

Figure 23A:
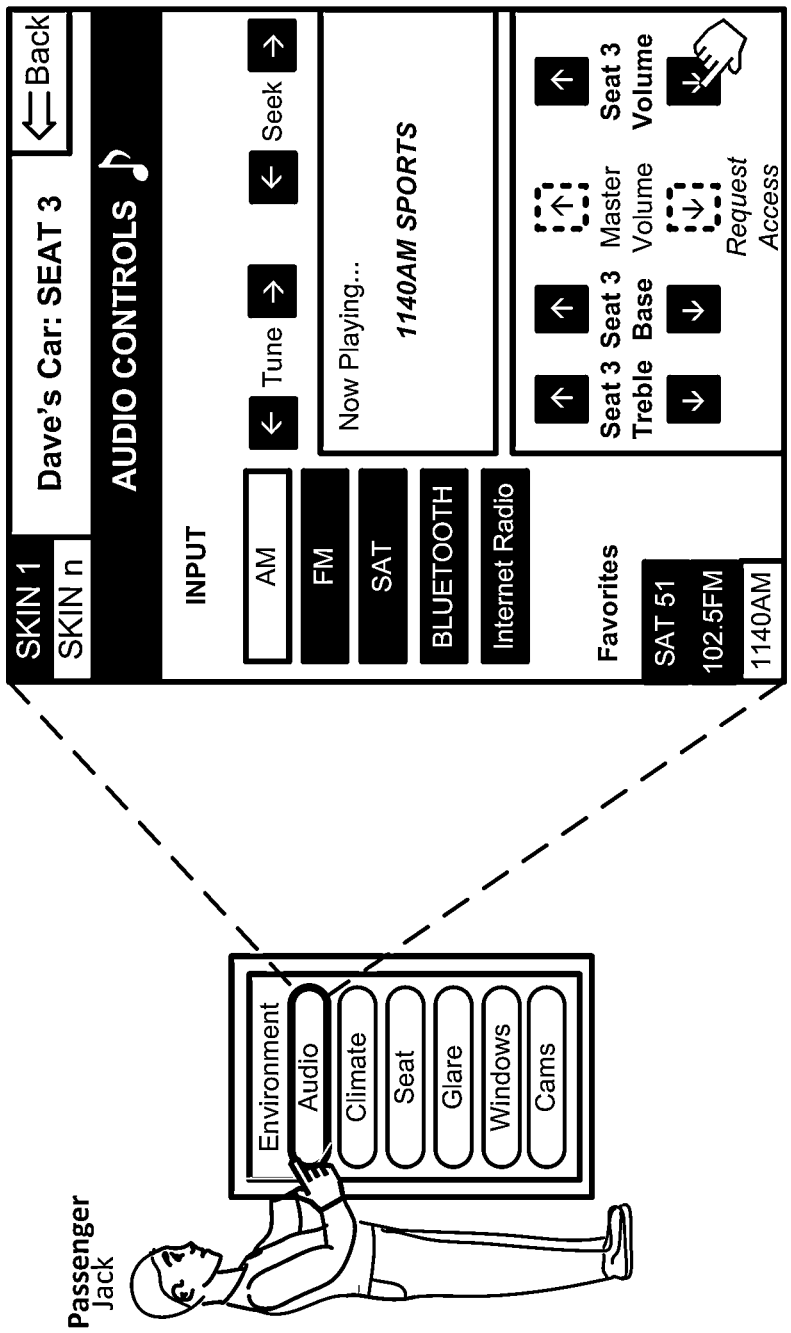
FIG. 23A a passenger navigating through graphical user interfaces that provide controls to the vehicle in which the passenger is a guest, and in particular an example of the passenger accessing controls for the audio system of the vehicle from his seat in the vehicle, in accordance with one embodiment of the present invention.

FIG. 23A illustrates an example interface that may be presented to a passenger accessing audio controls within a vehicle. In this example, the user can toggle settings that are allowed by the admin or deriver to be changed. In this case, the passenger can change most settings except the master volume that would affect the overall volume within the vehicle. In this example, a user interface may be provided when the user, such as Jack selects the audio settings. The audio system provides various controls to Jack, which can be customized and delivered to the vehicle or simply to the area in which Jack is sitting (seat 3). The customizations of settings to the audio controls can vary depending on the preferences.

Certain controls and functions of audio settings can be provided by the vehicle itself. In some embodiments, audio settings can be a hybrid display of settings that can come from applications already loaded onto the mobile device and settings coming from applications of the vehicle. In one embodiment, changes made to the audio control settings of the vehicle can also be synchronized or also shown on displays of the vehicle. In this manner, changes being made by a passenger can be viewed by other passengers or the driver. For example, as a passenger browses through various artists, and the artist music covers are shown on the display, and other passengers can comment and socially interact while a particular passenger selects the settings.

Figure 23B:
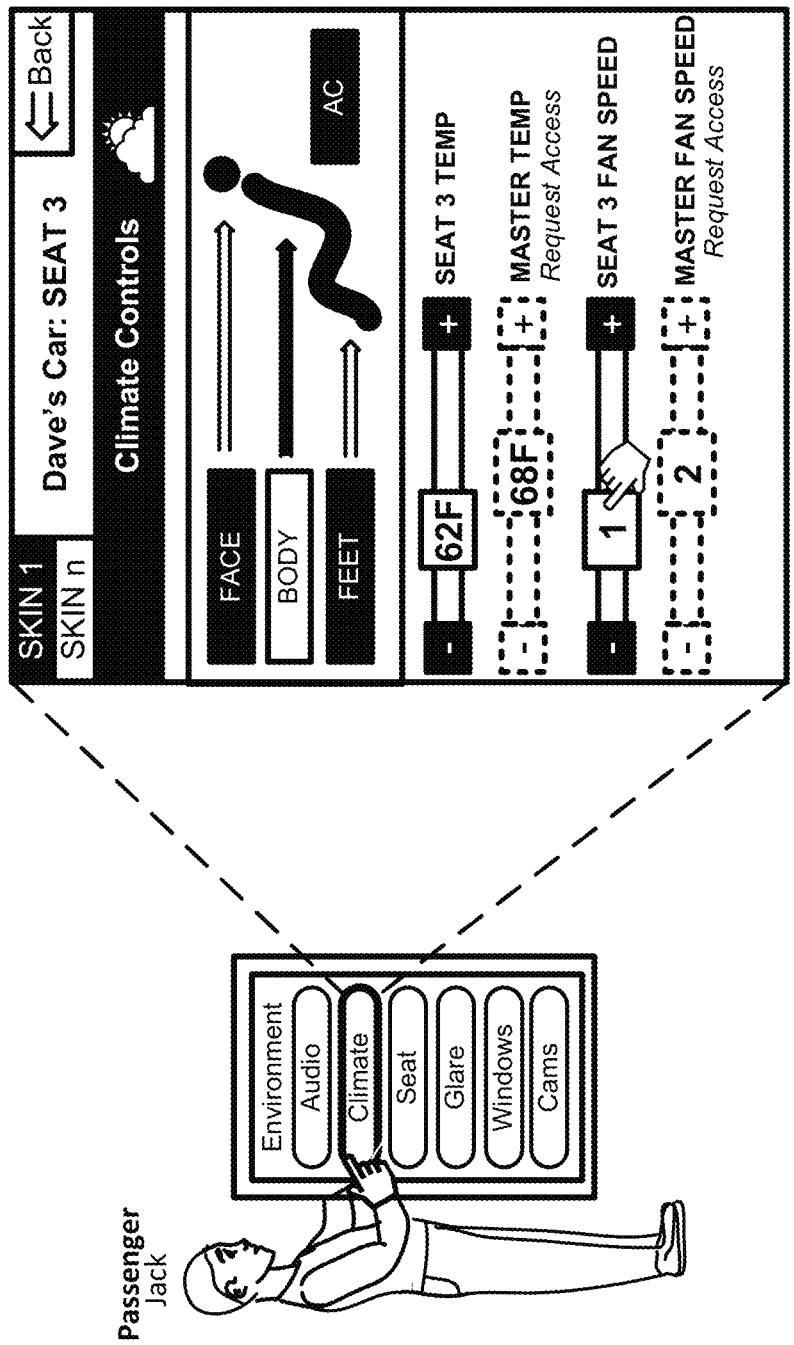
FIG. 23B illustrates an example of the passenger navigating to a climate control interface, which may provide the passenger with access to climate control settings for the seat location in which the passengers located, in accordance with one embodiment of the present invention.

FIG. 23B illustrates an example interface that me be presented to a passenger accessing climate controls within a vehicle. The controls shown include but are not limited to changing the active fan position of the vent system, air conditioning toggle, and temperature for the area directly around the passenger only and the fan speed for the vents directly around the passenger only. In this case, the master temperature toggle is not allowed for passengers. Likewise, the toggle of the vehicle master fan speed is not allowed but the passenger may request access within the application.

The climate settings can provide access to Jack for very specific climate settings that may relate to seat 3. As shown, the climates can be quite specific and can be custom tailored to affect or relate to the zone or area of where Jack is sitting inside of Dave's car. For example, certain functions can be provided with basic privileges as a passenger. Other settings can only be provided to the passenger by way of access provided by the administrator or driver. For instance, Jack may not be allowed to change the master temperature without request from the administrator for access. The same can be true or the master fan speed, which is only accessible once the request for access has been granted.

Figure 23C:
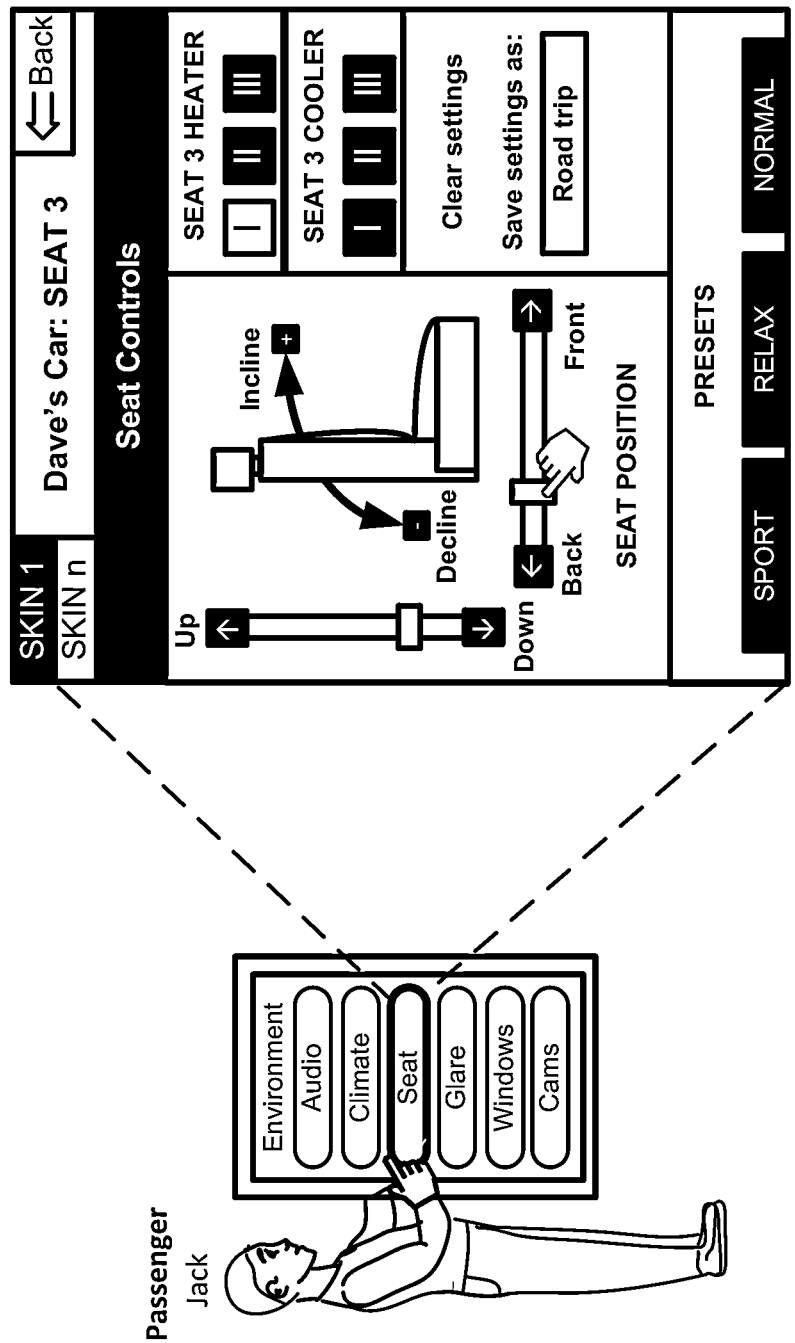
FIG. 23C illustrates an example of the passenger navigating to a seat settings dialog screen, which provides controls for the seat in which the passenger is currently seated (e.g., seat 3), in accordance with one embodiment of the present invention.

FIG. 23C illustrates an example interface that me be presented to a passenger accessing seat controls within a vehicle for the seat the passenger currently is seated in. The passenger may be given the ability to toggle the seat position, the seat pitch, seat heaters, seat coolers etc. and save settings for the next time as a favorite setting. This illustration shows three previous favorite positions the passenger has saved as SPORT, RELAX, and NORMAL. The passenger is about to save a new position named ROAD TRIP. This allows quick access to favorite seating positions when riding in a vehicle on the next occasion. Jack can adjust various settings of the seats to meet his likes and dislikes. Jack can also have one or more preset settings, and the preset settings can be custom labeled and saved.

Figure 23D:
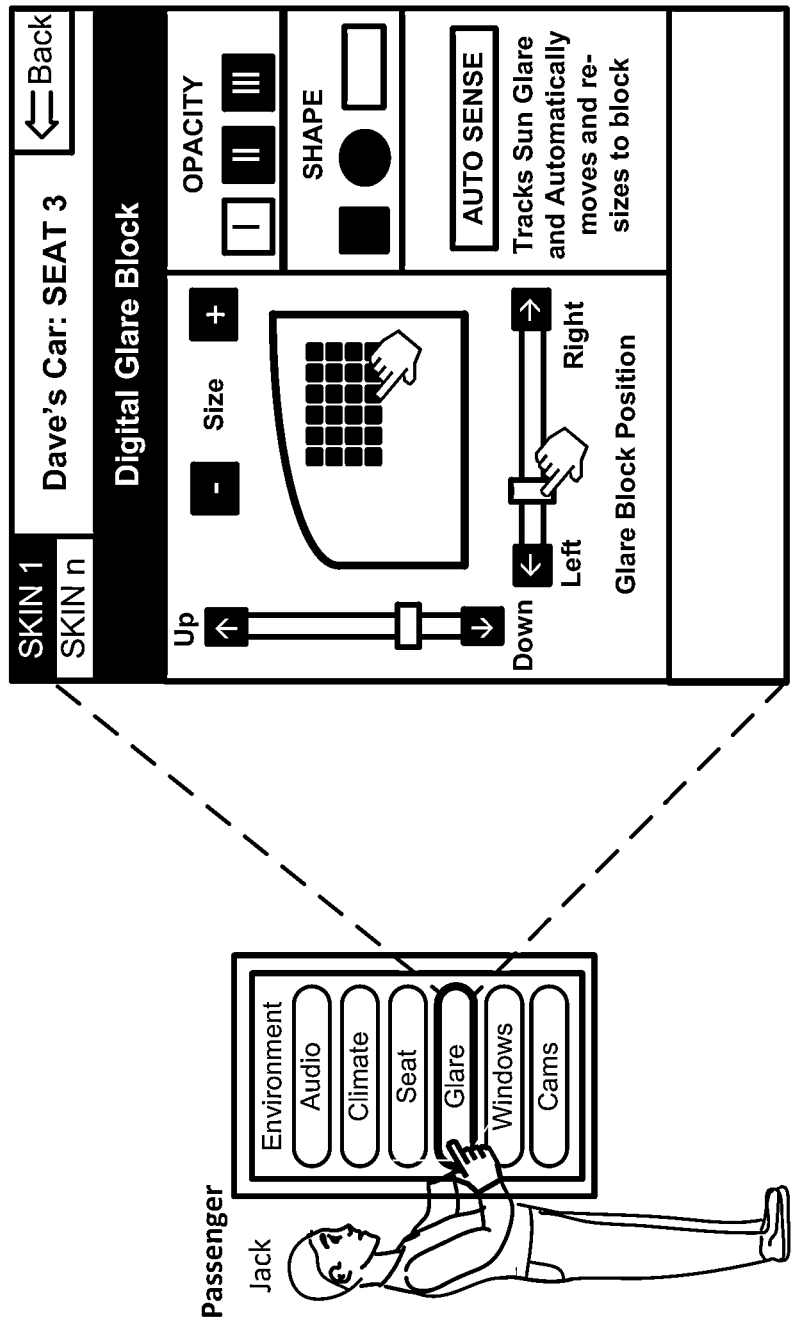
FIG. 23D illustrates an example of the passenger navigating to a glare control screen, where the user can adjust the tinting/shade of the window that may be proximate to the location of seat 3, and controls for adjusting the amount of tinting to prevent glare, and controls for adjusting the configuration of the glare control, in accordance with one embodiment of the present invention.

FIG. 23D illustrates an example interface that me be presented to a passenger accessing window controls within a vehicle for the window the passenger over where the passenger is currently seated. In this example, a digital glare blocking system integrated within the window glass can be manipulated by the passenger. The glare block may be toggled in terms of the size of the blocking surface area, the position to the left, right, up, down. The opacity of the glare blocking area may also be manipulated as well as the shape the glare blocking area is presented on the window. An auto sense option is given to the passenger in case the passenger would like the vehicle to determine the best settings in order to automatically track glare, sun position and other factors to most effectively block sun glare.

Further shown is a window icon, which can be adjusted on the screen of the device. For example, Jack is sitting next to a particular side window, and the glare block functionality for specific window is preset. In other embodiments, a passenger may be provided with an option to glare block other windows, if the administrator allows. The function of digital glare block allows the user to select how dark a particular area, zone, region, or shape of the window should be tinted or darkened. This will allow for the digital glare block to block the sun from hitting the passenger face, or body. The controls can provide a way for the user to move the digital glare block to any location in the window. In another embodiment, an auto sense function is provided, which allows the glare block area to move so that it tracks the sun's movement in relation to where a passenger face or body may be present. In another embodiment, the user may be allowed to shape or custom shape the amount digital glare block for the window.

In this example, the user can simply select the shape function on the mobile device and color in a window icon with his or her finger until the regions that the passenger wishes to block are the highlighted area. In another embodiment, the digital glare block can be configured for the entire window, where in the entire window can be made to tint darker or lighter based on a user setting, or based on a predefined setting that is configured to reduce sun from directly hitting an area where the user face may be located.

In another environment, the face of the user can be tracked, as well as the location of the sun rays through the window. By tracking the sun and users face or head, it is possible to dynamically move the location of the glare blocks so that it covers the sun and prevents direct sunlight toward the passenger face. The digital glare block can also be integrated into any other window of the vehicle. For example, instead of traditional sun visors for the driver and front passengers, the vehicle can utilize digital glare block technology for the windows.

Figure 24:
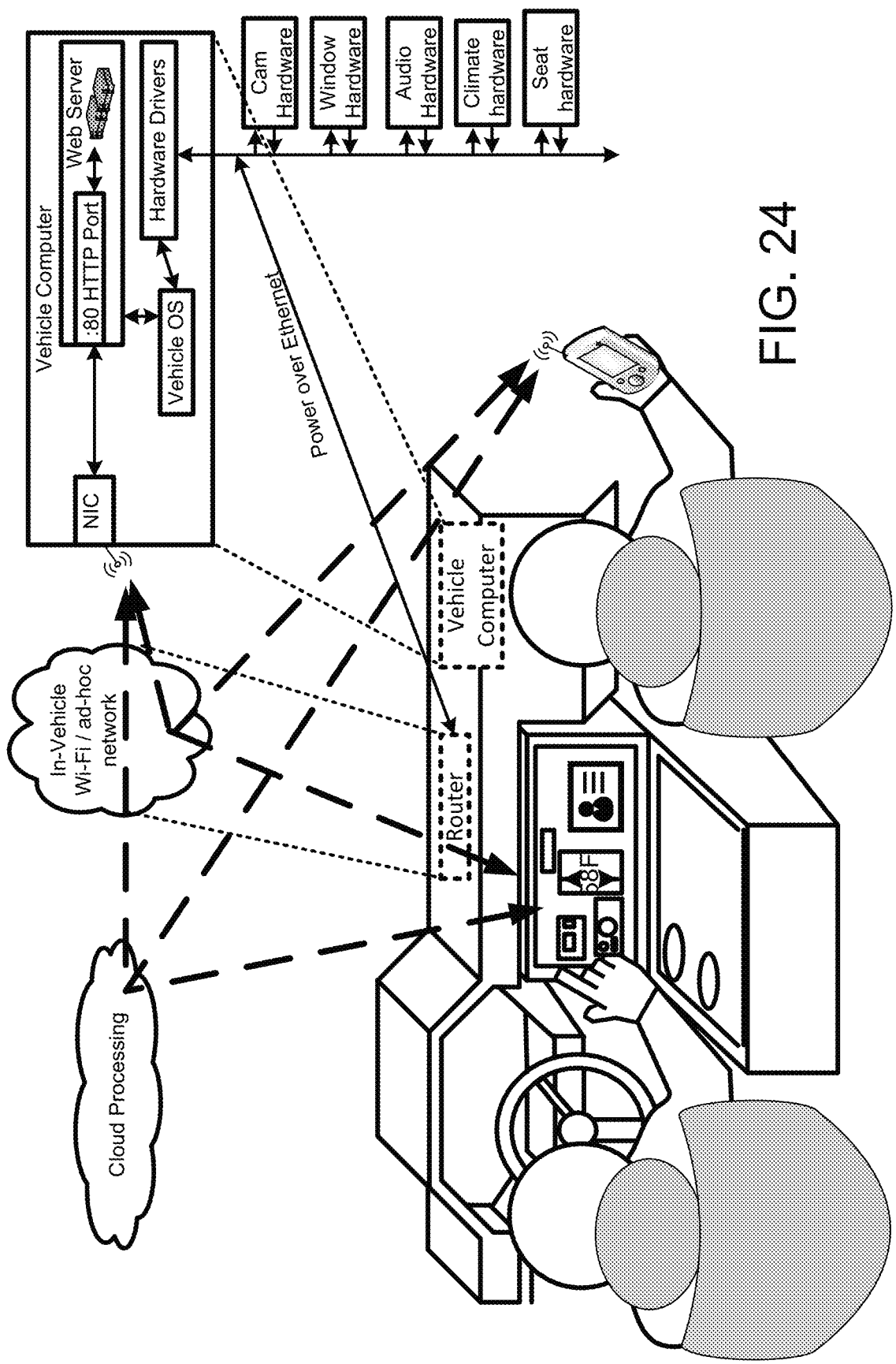
FIG. 24 illustrates an example of a passenger navigating with vehicle electronics/computer to access applications of the vehicle and applications that may be obtained from cloud services or over the Internet, in accordance with one embodiment of the present invention.

FIG. 24 illustrates how changes made by one of the passengers mobile applications or vehicle server web page act as an alternate method of changing settings of a vehicle that may or may not already have a physical button, knob or touch screen. For instance, a vehicle may have buttons for increasing the volume on the radio. The changes to those buttons can be represented on a passenger's mobile device. The mobile device may have any representation of the physical button but the outcome of the manipulation may be the same, similar or even enhanced by granularity. This allows a passenger for instance to turn down the volume on the speaker near their ear not disturbing the driver's volume on the speakers near their ear.

Vehicle systems such as chairs and climate fans, cooling, heating elements may be connected to the vehicle computer either in a wired or wireless fashion. For instance, the vehicle computer may have either an auxiliary or integrated network switch/router. Each interface port on the switch/router may have the ability to not only provide network access to the passenger's seat to execute translation of desired changes in position but also have the ability to be powered using power over Ethernet. Alternatively, each vehicle system may be powered separately and communicate with the vehicle computer using a wireless connection to the in vehicle access point.

Similarly, the passenger may have the need to turn their reading light on. This election on their mobile device is translated by the vehicle computer where the vehicle computer may instruct the switch to provide power over Ethernet to the light above the passenger that requested the lighting. Electronics in the light housing can report back using the Ethernet connection that the light is now on. The vehicle updates the user's device graphical interface to show that the light was turned on.

FIG. 24 further illustrates an example of a driver and a passenger, where in the passenger as a mobile device. The mobile of the passenger is able to communicate with both the vehicle computer and to processing servers over the Internet. In one embodiment, the device communicates with the vehicle computer by way of a router that is integrated with the vehicle computer. The router can provide a network connection/access point for passengers that may be in the vehicle. As noted earlier, user interfaces can be provided to the mobile device of the passenger, and those features and functionalities can provide access to vehicle systems, settings, and controls that pertain, or relate to passenger locations or privilege settings.

Figure 25:
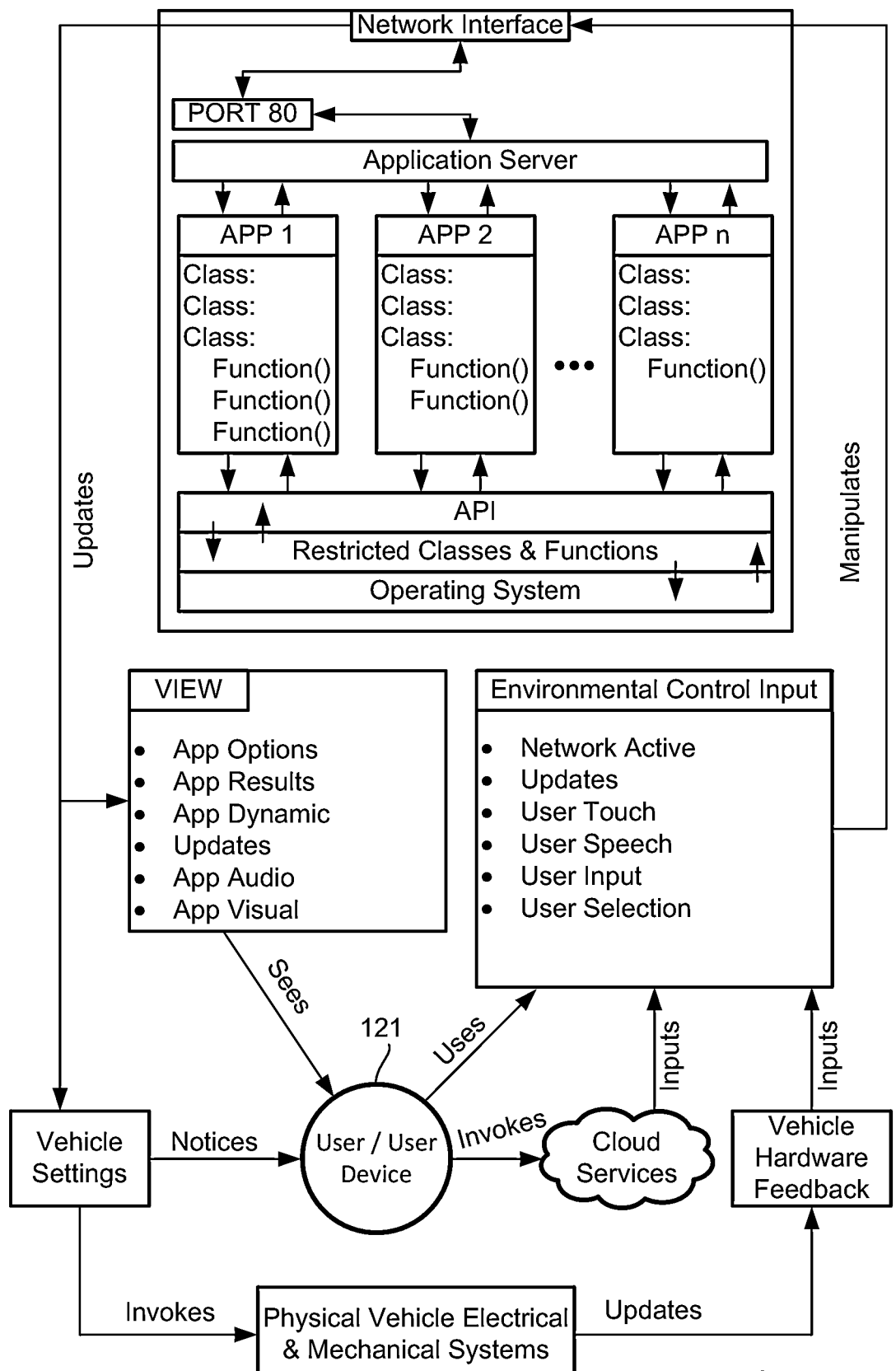
FIG. 25 illustrates an example of system controls for providing network access to applications that are native to the vehicle, accessible to the vehicle, and shareable by the vehicle from a connected device of a passenger, in accordance with one embodiment of the present invention.

FIG. 25 describes one embodiment of a vehicle computer using a software stack to execute instructions from and send instructions to a passenger mobile device. This example software stack includes a network interface card in a vehicle computer that provides the connection layer of the TCP/IP network giving the on-board computer the ability to send packets of data between the embedded and/or upgradable web server software/hardware to clients on the network. The NIC communicates with the application server through available application ports in the next layer of the TCP/IP stack. These ports allows the server to receive and send data out of the software routines interacting with applications loaded in a vehicle, such as a seat, a window, a climate control, and associated apps.

In one example, and without limitation, apps access vehicle software APIs that allow access to kernel level restricted classes and functions that allow direct manipulation of seat, window, climate hardware drivers, etc. These hardware drivers send the intended change signals to the hardware to execute. This illustration shows how a passenger acts as a part of the cycle of interaction between server and client along with the resulting manifestations of the settings/changes requested.

Figure 26:
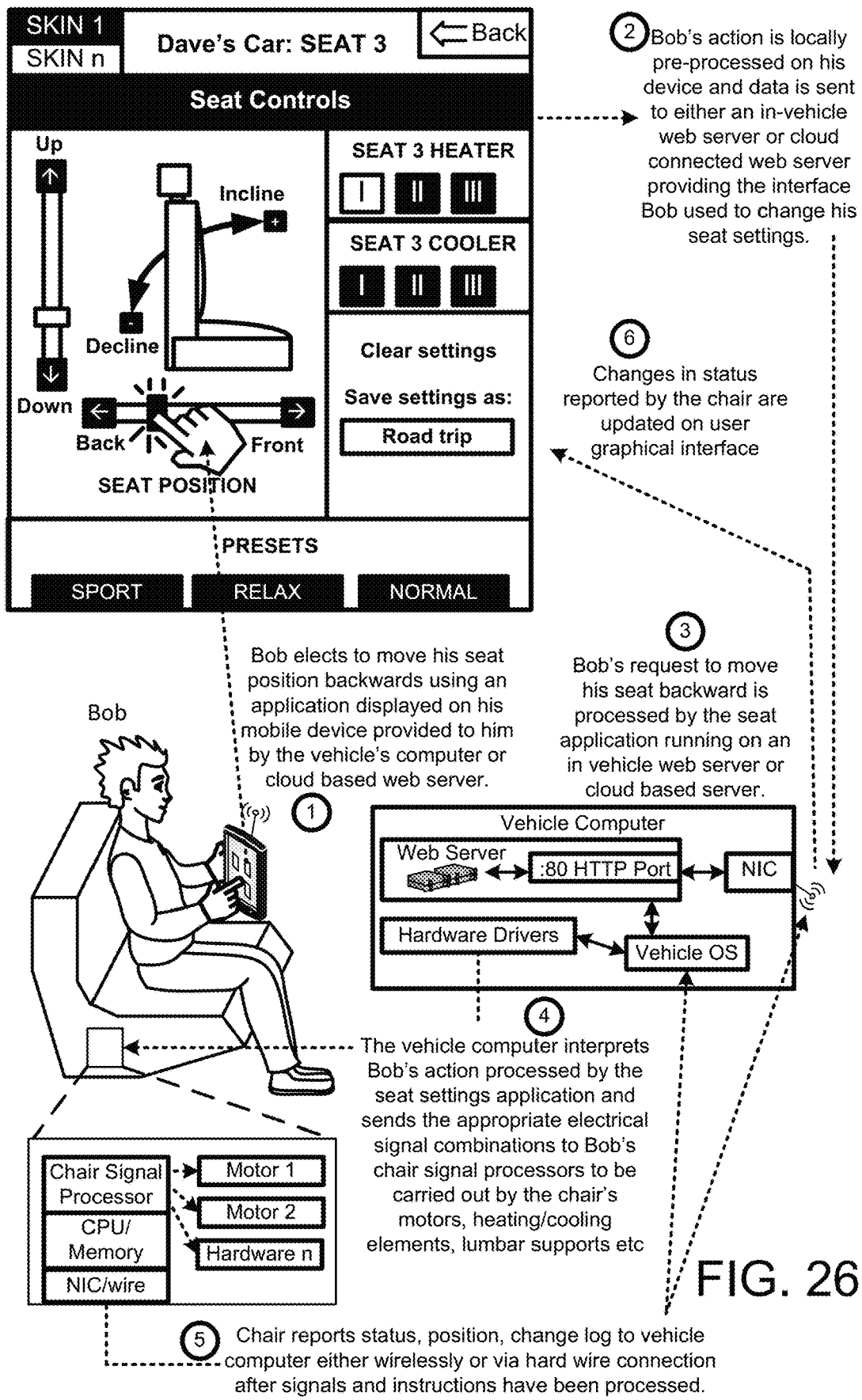
FIG. 26 illustrates a more detailed example of custom settings made by a passenger to the seat settings, by accessing vehicle computer over a network of the vehicle, where in access to controls and systems of the vehicle are provided for that seat location or environment location, in accordance with one embodiment of the present invention.

FIG. 26 illustrates one possible flow of events in which a passenger elects to change the position of their seat backwards using an application hosted on the vehicle or cloud and accessed by a passenger network connected mobile device. The change instruction from the passenger is sent to the server either local or cloud based. The instructions may be sent to the vehicle computer either locally or from the cloud. Instructions are interpreted and processed for translation into electrical signals to be sent and/or data sent in this case to the vehicle seat the passenger is sitting in. The signals are executed by the seat and the results are sent back to the vehicle computer, which serves the mobile application all graphical changes. The graphical changes in real time may be refreshed by the passenger manually, periodically or using any variation of automatically refreshing code. Example code can include HTML code. Other code that may be utilized to facilitate the transfer and presentation of data to and from mobile devices and the vehicle can include, for example only and without limitation, C, C+, C++, HTML, HTML-5, FLASH, JAVA, AJAX, JAVASCRIPT and other programming languages, constructs and data structures.

As noted above, one embodiment may allow use of Power over Ethernet (PoE) systems within the car for network connecting components of a vehicle. Thus, instead of having a vehicle connect its various components with miles of wiring and complicated routing schemes, the system can reduce wiring. For example, the vehicle computer can process all information on the main system, and only one wire or set of wires are connected or terminated to each seat of the vehicle. This wire(s) would be a PoE+ enabled Cat5e or later network cable. This enables sending and receiving all or some of the instructions to the seat hardware. In this configuration, the vehicles' computer is connected to a switch that provides the network connectivity, which is all changeable hardware on the car. A network cable from each cabin light, from each seat, from each fan motor for the AC etc., and they all connect to an on board switch. The computer sends instructions to each component and adjusts the power etc.

In one embodiment, at a remote location, a user is able to access a user interface for an application, which provides users access to user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user.

The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard, etc.

In one embodiment, vehicles can maintain information regarding where they are, where they are heading and their destination maintained which is maintained by GPS and navigation systems on board. The information collected and maintained by every vehicle may be mutually exclusive, meaning that only each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing 120 can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most important information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another.

This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

The various embodiments may be embodied in computer readable media, which is saved in storage. The storage may be saved on cloud storage, data centers, or the like, which are accessible over the Internet. The access may be wired or wireless. In vehicles, the connection to the Internet may be wireless, and the connection can be continuous or non-continuous depending connection. Code on the vehicle electrons can execute at least some of the method operations when not connected and other operations are executed jointly between vehicle electronics (e.g., memory, code and processors of a vehicle) and cloud processing, which may implement one or more servers, either virtual or not.

It will be obvious, however, to one skilled in the art, that the present invention may be practiced without some or all of these specific details. In other instances, well known process operations have not been described in detail in order not to unnecessarily obscure the present invention.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Additional embodiments can include, without limitation, some of the following features. Again, it should be understood that embodiments can be defined from any of the defined feature elements described herein or described in incorporated by reference applications.

In one embodiment, a method is provided that receiving a request to access vehicle systems of a vehicle using a mobile device of a passenger of the vehicle. The method includes identifying a seat for the passenger within the vehicle. The method provides access to a user interface via the mobile device that enables display of metrics for systems of the vehicle. The method also provides access to a set of control functions of the vehicle. The set of control functions including entertainment functions of the vehicle and environment functions that enable changes to settings that pertain to a zone that encompasses the seat of the passenger.

In another embodiment, a method is provided. The method includes identifying presence of a wireless device within a vehicle by a computing system of the vehicle; verifying credentials for the wireless device based on a previous connection of the wireless device with the vehicle; sending data for rendering on a user interface of the wireless device upon successful verification of the credentials associated with a user, the user interface identifying one or more passenger seats of the vehicle that indicate occupancy as determined by a seat sensor of the vehicle, the user interface requesting selection of a passenger seat occupied by the user that is associated with the wireless device; and sending data to the user interface providing access to a subset of vehicle metrics and control settings, the control settings being for an environment associated with the selected passenger seat of the vehicle, wherein the method is executed by a processor.

In some implementations, presence of the wireless device is identified by the computing system by detecting a radio signal of the wireless device, the radio signal including an identifier of the wireless device, the computing system configured to, send the wireless device a notification requesting confirmation of a desire to connect with the vehicle; detect a device type of the wireless device, the device type including one or more of a form factor, an operating system or operating system; wherein the data sent for rendering on the user interface is configured for the device type.

In some implementations provide, verifying credentials based on a previous connection of the wireless device includes receiving of the credentials from memory of the wireless device.

In some implementations, the data sent for rendering on the user interface includes combinations of one or more of graphics, icons, or text that provide information for identifying the passenger seats that indicate occupancy as determined by a seat sensor of the vehicle, the seat sensor including one of a weight detector, a heat detector, a motion detector, a compression detector, or combinations of two or more thereof.

In some implementations, the control settings control one or more of seat positioning controls of the selected passenger seat, or an air conditioning outlet proximate to the selected passenger seat, or a speaker proximate to the selected passenger seat, or a heating or cooling of the selected passenger seat, or a window tinting of the selected passenger seat, or lumbar support of the selected passenger seat, or a video output proximate to the selected passenger seat, or audio settings for the vehicle, or cooling settings for the vehicle, or heating settings for the vehicle, or communication systems of the vehicle, or wireless connections of the vehicle, or combinations thereof.

In some implementations, the subset of vehicle metrics include operational metrics of the vehicle, data from sensors of the vehicle, speed data of the vehicle, fluid levels of the vehicle, tire health data of the vehicle, brakes data of the vehicle, mechanical component data of the vehicle, diagnostics data of the vehicle, data from applications of the vehicle, communications systems data of the vehicle, altitude of the vehicle, temperature of the vehicle, or combinations thereof.

In some implementations, the computing system of the vehicle is configured to identify presence of a second wireless device within the vehicle; wherein upon verifying credentials from the second wireless device, presenting a user interface to the second wireless device to enable identification of a second passenger seat in the vehicle and sending data to the user interface of the second wireless device providing access to a subset of vehicle metrics and control settings, the control settings being for an environment associated with the second passenger seat of the vehicle, wherein the second wireless device and the wireless device communicate with the computer system of the vehicle.

In some implementations, identifying presence of the wireless device within the vehicle includes detecting and processing a wireless signal of the wireless device, the detecting occurring by one or more sensors positioned in the vehicle.

In some implementations, processing the wireless signal of the wireless device includes identifying a distance of the wireless device to the vehicle, or identifying a time of flight of the wireless signal to one of the sensors of the vehicle, or a triangulation detection of the wireless signal of the wireless device by three or more of the sensors of the vehicle, or a strength of the wireless signal as measured by one or more of the sensors of the vehicle.

In some implementations, the credentials associated with the user enable saving of data for control settings to a user account of the user, the saved data for control settings being accessible for implementation in the vehicle from time to time.

In some implementations, the user account includes a history of when the control settings were implemented in the vehicle.

In some implementations, the history of when the control settings were implemented in the vehicle include one or more of a time of day of when the control settings are implemented, or a day of week or month of when the control settings are implemented, or a weather condition or environment condition when the control settings are implemented, or an identification of others in the vehicle when the control settings are implemented, or which one of a plurality of applications or programs are running when the control settings are implemented, or a combination of two or more of the forgoing conditions of when the control setting are implemented.

In some implementations, the history of when the control settings are implemented is accessed to identify patterns learned, the patterns learned usable to identify one or more recommended settings to implement in the vehicle.

In another embodiment, a method is provided, which includes identifying presence of a wireless device within the vehicle; sending a message to the wireless device, the message includes a request for credentials for access to the vehicle; presenting data to populate a user interface of the wireless device upon successful verification of the credentials associated with a user, the user interface identifying one or more passenger seats of the vehicle that indicate occupancy as determined by a seat sensor of the vehicle, the data further requesting selection of an identified passenger seat occupied by the user that is associated with the wireless device; and sending data to the user interface providing filtered access to a subset of vehicle metrics and control settings, the subset of the vehicle metrics and control settings being for an environment associated with the identified passenger seat of the vehicle, wherein the method is executed by a processor.

In yet another embodiment, a method is provided that includes detecting a device within a vehicle, the vehicle including a computing system that monitors and controls vehicle metrics and receives user input for control settings of one or more components of the vehicle; detecting a coordinate location of the device within the vehicle, the coordinate location being associated with a passenger seat of the vehicle; verifying credentials received from the device, the credentials identifying a user account for access to the computing system of the vehicle; and presenting a user interface to the device when the credentials are verified, the user interface providing filtered access to a subset of vehicle metrics and control settings, the subset of the vehicle metrics and control settings affect an environment in and around the passenger seat of the vehicle, wherein the method is executed by a processor.

In some implementations, detecting the coordinate location of the device within the vehicle includes detecting signal strength of a wireless signal of the device using one or more sensors disposed within features of the vehicle.

In some implementations, each of the one or more sensors identify an approximate distance to the device relative to known locations of the one or more sensors, the approximate distance from each of the one or more sensors produce the coordinate location of the device an interior space of the vehicle.

In some implementations, the method further includes accessing a predefined coordinate map of the interior space of the vehicle, the predefined coordinate map includes information that identifies a coordinate space of the passenger seat and other passenger seats of the vehicle; wherein the coordinate location of the device is associated to the passenger seat when the coordinate location is more proximate to the coordinate space of the passenger seat relative to the coordinate space of other passenger seats.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

What is claimed is:

1. A vehicle including a system for sharing vehicle system control of the vehicle with a passenger, comprising:
    the system using an on-board computer and communications circuitry of the vehicle, the communications circuitry is configured to use a wireless network for accessing the Internet, the on-board computer is configured to enable the communications circuitry to provide a wireless connection to a portable device of the passenger of the vehicle,
    the on-board computer has access to one or more vehicle sub-systems, and via the wireless connection, the on-board computer provides the portable device access to at least one graphical user interface, the graphical user interface includes input options that enable control of settings or functions of one or more of said vehicle sub-systems,
    the on-board computer is configured to process data associated with a wireless signal of the portable device, wherein the processing of the data is used to identify the portable device inside the vehicle;
    wherein the identified portable device is utilized to identify a passenger seat of the vehicle and enable said control of settings or functions that relate to an area proximate to the passenger seat that was identified.

2. The vehicle of claim 1, wherein one or more of said functions provided to the user interface of the portable device is or are disabled when the portable device is determined to have moved to be within a proximity of a driver seat of the vehicle.

3. The vehicle of claim 1, wherein processing the wireless signal further includes identifying a distance of the portable device to a vehicle sensor or sensors.

4. The vehicle of claim 1, wherein processing the wireless signal further includes identifying a time of flight of the wireless signal to one or more of sensors of the vehicle.

5. The vehicle of claim 1, wherein processing the wireless signal further includes a triangulation detection of the wireless signal of the portable device by three or more sensors of the vehicle.

6. The vehicle of claim 1, wherein processing the wireless signal further includes processing a strength of the wireless signal as measured by one or more of sensors of the vehicle.

7. The vehicle of claim 1, wherein one of the functions includes entertainment functions of the vehicle.

8. The vehicle of claim 1, wherein one of the functions includes climate functions of the vehicle.

9. The vehicle of claim 1, wherein the on-board computer enables pairing of the portable device and other portable devices with the vehicle, and each paring is associated with one of a privileged pairing, or a guest pairing, and said guest pairing includes a reduced access to or no access to select ones of the vehicle sub-systems.

10. The vehicle of claim 1, wherein the on-board computer is configured to sense output from one or more sensors of the vehicle to identify presence of a passenger at said passenger seat.

11. The vehicle of claim 10, wherein said sensing of output is from a sensor of the passenger seat or a sensor proximate to the passenger seat.

12. The vehicle of claim 1, wherein the wireless signal includes an identifier of the portable device, the on-board computer is configured to, send the portable device a notification requesting confirmation of a desire to pair with the vehicle and detect a device type of the portable device, the device type including one or more of a form-factor or an operating system;
    wherein data sent for rendering the user interface is configured for the device type.

13. The vehicle of claim 1, wherein data sent for rendering the user interface includes combinations of one or more of graphics, icons, or text that provide information for identifying passenger seat and occupancy as additionally determined by a seat sensor of the vehicle, the seat sensor including one of a weight detector, a heat detector, a motion detector, a compression detector, or combinations of two or more thereof.

14. The vehicle of claim 1, wherein the settings control one or more of seat positioning controls of the passenger seat, or an air conditioning outlet proximate to the passenger seat, or a speaker proximate to the passenger seat, or a heating or cooling near or of the passenger seat, or a window tinting near the passenger seat, or lumbar support of the passenger seat, or a video output proximate to the passenger seat, or audio settings for the vehicle, or cooling settings for the vehicle, or heating settings for the vehicle, or communication systems of the vehicle, or wireless connections of the vehicle, or combinations thereof.

15. The vehicle of claim 1, wherein said settings include access to vehicle metrics that include operational metrics of the vehicle, data from sensors of the vehicle, speed data of the vehicle, fluid levels of the vehicle, tire health data of the vehicle, brakes data of the vehicle, mechanical component data of the vehicle, diagnostics data of the vehicle, data from applications of the vehicle, communications systems data of the vehicle, altitude of the vehicle, temperature of the vehicle, or combination of two or more thereof.

16. The vehicle of claim 1, wherein the on-board computer is configured to identify presence of a second portable device in the vehicle and a second location in the vehicle for the second portable device.

17. The vehicle of claim 1, wherein the on-board computer is configured to save a history of when settings were implemented in the vehicle and process machine learning to identify preferred settings for recommendations to passengers of the vehicle.

18. The vehicle of claim 1, wherein program instructions are executed by a program of the on-board computer to enable said control of settings or functions for the passenger seat, the settings or functions are personalized based on preferences associated with a user account or profile of a cloud system.

19. A vehicle including a system for sharing vehicle system control of the vehicle with a passenger, comprising:
    the system using an on-board computer and communications circuitry of the vehicle, the communications circuitry is configured to use a wireless network for accessing the Internet, the on-board computer is configured to enable the communications circuitry to provide a wireless connection to a portable device of the passenger of the vehicle, the on-board computer has access to one or more vehicle sub-systems, and via the wireless connection, the on-board computer provides the portable device access to at least one graphical user interface, the graphical user interface includes input options that enable control of settings or functions of one or more of said vehicle sub-systems, the on-board computer is configured to process data associated with a wireless signal of the portable device, wherein the processing of the data is used to identify the portable device inside the vehicle;

wherein the identified portable device is utilized to identify a passenger seat of the vehicle and enable said control of settings or functions that relate to an area proximate to the passenger seat that was identified;

wherein in addition to enabling said control of settings or functions that relate to the area proximate to the passenger seat that was identified, enabling control of one or more settings or functions in other parts of the vehicle that are not proximate to the passenger seat that was identified;

wherein processing the wireless signal further includes processing a strength of the wireless signal as measured by one or more of sensors of the vehicle.

20. A vehicle including a system for sharing vehicle system control of the vehicle with a passenger, comprising: the system using an on-board computer and communications circuitry of the vehicle, the communications circuitry is configured to use a wireless network for accessing the Internet, the on-board computer is configured to enable the communications circuitry to provide a wireless connection to a portable device of the passenger of the vehicle, the on-board computer has access to one or more vehicle sub-systems, and via the wireless connection, the on-board computer provides the portable device access to at least one graphical user interface, the graphical user interface includes input options that enable control of settings or functions of one or more of said vehicle sub-systems, the on-board computer is configured to process data associated with a wireless signal of the portable device, wherein the processing of the data is used to identify the portable device inside the vehicle;

wherein the identified portable device is utilized to identify a passenger seat of the vehicle and enable said control of settings or functions that relate to an area proximate to the passenger seat that was identified;

wherein the on-board computer is configured to identify presence of a second portable device in the vehicle and a second location in the vehicle for the second portable device;

wherein processing the wireless signal further includes processing a strength of the wireless signal as measured by one or more of sensors of the vehicle.

* * * * *